(12) United States Patent
McCall et al.

(10) Patent No.: US 12,741,382 B2
(45) **Date of Patent: *Sep. 22, 2026**

(54) HEAD AND NECK ASSEMBLY OF A ROBOT

(71) Applicant: Figure AI Inc., Sunnyvale, CA (US)

(72) Inventors: David McCall, Sunnyvale, CA (US); Sydney Hardy, Sunnyvale, CA (US); Katarina Rodak, Sunnyvale, CA (US)

(73) Assignee: FIGURE AI INC., San Jose, CA (US)

( * ) Notice: Subject to any disclaimer, the term of this patent is extended or adjusted under 35 U.S.C. 154(b) by 67 days.

This patent is subject to a terminal disclaimer.

(21) Appl. No.: 19/033,973

(22) Filed: Jan. 22, 2025

(65) Prior Publication Data

US 2025/0187202 A1 Jun. 12, 2025

Related U.S. Application Data

(63) Continuation-in-part of application No. 29/935,680, filed on Apr. 3, 2024, which is a continuation-in-part of application No. 29/928,748, filed on Feb. 15, 2024, now Pat. No. Des. 1,118,726, which is a continuation-in-part of application No. 29/889,764, filed on Apr. 17, 2023, application No. 19/033,973 is a continuation-in-part of application No. 18/919,263, filed on Oct. 17, 2024, now Pat. No. 12,365,094.

(60) Provisional application No. 63/708,003, filed on Oct. 16, 2024, provisional application No. 63/707,897, filed on Oct. 16, 2024, provisional application No.
(Continued)

(51) Int. Cl.

| | |
|---|---|
| ***B25J 9/00*** | (2006.01) |
| ***B25J 11/00*** | (2006.01) |
| ***B25J 19/02*** | (2006.01) |

(52) U.S. Cl.
CPC .......... *B25J 11/001* (2013.01); *B25J 9/0009* (2013.01); *B25J 19/023* (2013.01)

(58) Field of Classification Search
CPC ...... B25J 9/0009; B25J 19/023; B25J 11/001; B25J 9/163; B25J 9/1661; B25J 9/1646; B25J 9/1674; B62D 57/032
See application file for complete search history.

(56) References Cited

U.S. PATENT DOCUMENTS

| | | | |
|---|---|---|---|
| 552,557 | A | 1/1896 | Weber |
| 1,290,140 | A | 1/1919 | Elleby |

(Continued)

FOREIGN PATENT DOCUMENTS

| | | |
|---|---|---|
| AU | 202413544 | 7/2024 |
| CA | 137209 | 5/2011 |

(Continued)

OTHER PUBLICATIONS

Haddadin et al., The "DLR crash report": Towards a standard crash-testing protocol for robot safety—Part II: Discussions, 2009, IEEE, p. 280-287 (Year: 2009).*

(Continued)

*Primary Examiner* — Mcdieunel Marc

(57) ABSTRACT

A humanoid robot includes an upper region includes a head and neck assembly having a neck portion and a head portion coupled to the neck portion. Said head portion includes: a frontal shell having a rear edge, a rear shell having a frontal edge, and an electronics assembly. The electronics assembly includes various components and devices used in the operation of the humanoid robot.

30 Claims, 50 Drawing Sheets

Related U.S. Application Data

63/707,949, filed on Oct. 16, 2024, provisional application No. 63/707,547, filed on Oct. 15, 2024, provisional application No. 63/626,037, filed on May 28, 2024, provisional application No. 63/634,697, filed on Apr. 16, 2024, provisional application No. 63/573,528, filed on Apr. 3, 2024, provisional application No. 63/573,226, filed on Apr. 2, 2024, provisional application No. 63/566,595, filed on Mar. 18, 2024, provisional application No. 63/626,034, filed on Mar. 13, 2024, provisional application No. 63/564,741, filed on Mar. 13, 2024, provisional application No. 63/561,316, filed on Mar. 5, 2024, provisional application No. 63/626,035, filed on Feb. 27, 2024, provisional application No. 63/626,028, filed on Feb. 27, 2024, provisional application No. 63/626,030, filed on Feb. 21, 2024, provisional application No. 63/626,105, filed on Jan. 29, 2024.

(56) References Cited

U.S. PATENT DOCUMENTS 2,362,597 A 11/1944 Vince
3,060,445 A 10/1962 Brockman
3,458,864 A 8/1969 Austin
D246,201 S 10/1977 Ogawa
D251,627 S 4/1979 McQuarrie
D255,283 S 6/1980 Piche
4,678,952 A 7/1987 Peterson
4,804,220 A 2/1989 Rosheim
4,834,761 A 5/1989 Walters
4,986,723 A 1/1991 Maeda
5,394,766 A 3/1995 Johnson
5,447,403 A 9/1995 Engler, Jr.
5,673,367 A 9/1997 Buckley
5,985,483 A 11/1999 Verhoog
6,477,058 B1 11/2002 Luebs
D476,404 S 6/2003 Chen
6,732,015 B2 5/2004 Maeda
6,901,313 B2 5/2005 Mori
6,980,889 B2 12/2005 Ito
7,024,276 B2 4/2006 Ito
7,031,806 B2 4/2006 Kuroki
7,054,718 B2 5/2006 Miyamoto
7,072,741 B2 7/2006 Nagashima
7,099,747 B2 8/2006 Mikami
7,113,849 B2 9/2006 Kuroki
7,230,402 B2 6/2007 Kumagai
7,308,336 B2 12/2007 Takenaka
7,319,918 B2 1/2008 Takenaka
7,330,775 B2 2/2008 Orita
7,337,040 B2 2/2008 Takenaka
7,379,789 B2 5/2008 Takenaka
7,386,364 B2 6/2008 Mikami
7,386,366 B2 6/2008 Dariush
7,664,569 B2 2/2010 Shimizu
D622,332 S 8/2010 Pence
D631,612 S 1/2011 Tajima
7,864,159 B2 1/2011 Sweetser
D641,808 S 7/2011 Matsuda
8,224,652 B2 7/2012 Wang
D668,758 S 10/2012 Hall
D677,743 S 3/2013 Koshiishi
D687,908 S 8/2013 Hoang
8,511,964 B2 8/2013 Linn
D689,566 S 9/2013 Wong
8,600,550 B2 * 12/2013 Kurzweil ................. B25J 13/00 700/78
8,660,695 B2 2/2014 De La Rosa Tames
8,706,299 B2 4/2014 Sanders
8,770,749 B2 7/2014 Mccabe
D712,598 S 9/2014 Mehra
8,942,849 B2 1/2015 Maisonnier
D732,999 S 6/2015 Siegel
9,134,547 B2 9/2015 Mccabe
9,180,595 B2 11/2015 Inada
9,205,556 B1 12/2015 Magnusson
9,205,560 B1 12/2015 Edsinger
9,302,393 B1 4/2016 Rosen
9,346,165 B1 5/2016 Metzger
9,494,415 B2 11/2016 Sweetser
D774,148 S 12/2016 Hong
9,569,976 B2 2/2017 Krauss
9,574,646 B1 2/2017 Edsinger
9,575,335 B1 2/2017 Mccabe
9,592,603 B2 3/2017 Hardouin
9,669,280 B2 6/2017 Hua
D794,692 S 8/2017 Haranaka
D795,320 S 8/2017 Liu
D795,321 S 8/2017 Liu
D800,229 S 10/2017 Baker
9,789,607 B1 10/2017 Whitman
9,789,612 B2 10/2017 Hoffman
9,796,078 B2 10/2017 Angle
9,821,466 B2 11/2017 Bingham
9,842,585 B2 12/2017 Huang
9,868,210 B1 1/2018 Whitman
9,975,248 B2 5/2018 Stephens, Jr.
9,992,474 B2 6/2018 Grunnet-Jepsen
10,007,994 B2 6/2018 Grunnet-Jepsen
10,018,256 B1 7/2018 Magnusson
D831,308 S 10/2018 Lu
D835,214 S 12/2018 Xiong
D838,759 S 1/2019 Kowalski
10,189,158 B2 1/2019 Edsinger
D841,708 S 2/2019 Koshiishi
10,203,209 B2 2/2019 Roumeliotis
10,310,362 B2 6/2019 Grunnet-Jepsen
10,349,245 B2 7/2019 Tokuchi
D856,593 S 8/2019 Burke
10,369,071 B2 8/2019 Klassen
10,399,238 B2 9/2019 Waita
D866,684 S 11/2019 Früh
D868,866 S 12/2019 Gable
D872,152 S 1/2020 Xiong
D873,320 S 1/2020 Clerc
10,532,464 B1 1/2020 Guzman
10,537,998 B2 1/2020 Salisbury
10,545,497 B1 1/2020 Cui
10,571,896 B2 2/2020 Benaim
D885,451 S 5/2020 Chen
D888,120 S 6/2020 Hurst
D892,886 S 8/2020 Klassen
D892,887 S 8/2020 Klassen
D893,573 S 8/2020 Yan
10,780,578 B2 9/2020 Blankespoor
D898,789 S 10/2020 Nazarikhorram
D900,251 S 10/2020 Ouyang
D901,608 S 11/2020 Okabe
10,890,921 B2 1/2021 Gillett
D911,459 S 2/2021 Xiong
10,921,558 B2 2/2021 Yao
10,924,638 B2 2/2021 Swaminathan
10,946,528 B2 3/2021 Gupta
10,960,539 B1 3/2021 Kalakrishnan
10,988,192 B1 4/2021 Thorne
D918,979 S 5/2021 Mullan
D921,081 S 6/2021 Laplante
D932,531 S 10/2021 Xu
11,179,848 B2 11/2021 Hume
11,180,205 B2 11/2021 Amino
11,188,821 B1 11/2021 Kalakrishnan
11,200,816 B2 12/2021 Wang
11,247,738 B2 2/2022 Lavalley
11,279,041 B2 * 3/2022 Mahoor ............... B25J 11/0015
11,292,126 B2 4/2022 Christensen
11,333,954 B2 5/2022 Bull
11,347,030 B2 5/2022 Yao
11,416,003 B2 8/2022 Whitman
11,435,745 B2 9/2022 Lee
11,498,223 B2 11/2022 Williams
D972,815 S 12/2022 Wang

(56) References Cited

U.S. PATENT DOCUMENTS

| | | | | |
|---|---|---|---|---|
| D975,363 | S | 1/2023 | Paulson | |
| 11,546,504 | B2 | 1/2023 | Kim | |
| 11,554,484 | B2 | 1/2023 | Jung | |
| 11,600,010 | B2 | 3/2023 | Doutre | |
| 11,602,853 | B2 | 3/2023 | Stoianovici | |
| 11,623,354 | B2 | 4/2023 | Caron L'Ecuyer | |
| 11,632,991 | B2 | 4/2023 | Hull | |
| D985,643 | S | 5/2023 | Li | |
| 11,645,444 | B2 | 5/2023 | Scheutz | |
| 11,686,884 | B2 | 6/2023 | Shinohara | |
| D991,347 | S | 7/2023 | Ding | |
| 11,699,884 | B2 | 7/2023 | Braun | |
| 11,707,852 | B1 | 7/2023 | Hurst | |
| 11,736,677 | B2 | 8/2023 | Grunnet-Jepsen | |
| 11,807,067 | B2 | 11/2023 | Mancini | |
| 11,833,680 | B2 | 12/2023 | Deits | |
| 11,850,738 | B2 | 12/2023 | Chernyak | |
| 11,851,120 | B2 | 12/2023 | Fay | |
| 11,924,023 | B1 | 3/2024 | Smith | |
| D1,024,427 | S | 4/2024 | Li | |
| 11,999,423 | B2 | 6/2024 | Whitman | |
| 12,036,670 | B2 | 7/2024 | Geating | |
| 12,054,208 | B2 | 8/2024 | Swilling | |
| 12,070,863 | B2 | 8/2024 | Whitman | |
| 12,077,229 | B2 | 9/2024 | Whitman | |
| 12,097,626 | B2 | 9/2024 | Ikeda | |
| 12,122,044 | B2 | 10/2024 | Webb | |
| D1,051,193 | S | 11/2024 | Mahoor | |
| 12,134,181 | B2 | 11/2024 | Klingensmith | |
| 12,172,537 | B2 | 12/2024 | Gonano | |
| 12,205,214 | B2 | 1/2025 | Starke | |
| 12,214,497 | B2 | 2/2025 | Whitman | |
| 12,235,652 | B2 | 2/2025 | Whitman | |
| 12,240,117 | B2 | 3/2025 | Chebotar | |
| 12,246,441 | B1 | 3/2025 | Abate | |
| 12,251,831 | B2 | 3/2025 | Murphy | |
| D1,069,875 | S | 4/2025 | Belon | |
| D1,082,878 | S | 7/2025 | Grummas | |
| D1,082,881 | S | 7/2025 | Wang | |
| D1,085,192 | S | 7/2025 | Abroff | |
| 12,365,094 | B2 | 7/2025 | Mccall | |
| D1,089,451 | S | 8/2025 | Lin | |
| 12,403,611 | B2 | 9/2025 | Mccall | |
| 12,420,434 | B1 | 9/2025 | Goldsmith | |
| 12,472,648 | B1 | 11/2025 | Hadas | |
| D1,107,770 | S | 12/2025 | Wang | |
| D1,114,356 | S | 2/2026 | Dau | |
| D1,114,898 | S | 2/2026 | Feldman | |
| 12,539,618 | B1 * | 2/2026 | McCall | B25J 11/001 |
| 12,558,791 | B1 | 2/2026 | Bernards | |
| 12,558,801 | B2 | 2/2026 | Shannon | |
| D1,115,887 | S | 3/2026 | Wang | |
| D1,117,383 | S | 3/2026 | Wang | |
| D1,118,726 | S | 3/2026 | Mccall | |
| 2002/0157167 | A1 | 10/2002 | Paul | |
| 2003/0070202 | A1 | 4/2003 | Paul | |
| 2003/0173926 | A1 | 9/2003 | Hattori | |
| 2004/0003950 | A1 | 1/2004 | Ogawa | |
| 2004/0044417 | A1 | 3/2004 | Finn | |
| 2004/0075168 | A1 | 4/2004 | Azuma | |
| 2004/0103740 | A1 | 6/2004 | Townsend | |
| 2004/0176875 | A1 | 9/2004 | Iribe | |
| 2005/0072558 | A1 | 4/2005 | Whitney | |
| 2006/0128261 | A1 | 6/2006 | Kawabe | |
| 2006/0217838 | A1 | 9/2006 | Sugino | |
| 2007/0035143 | A1 | 2/2007 | Blackwell | |
| 2008/0239678 | A1 | 10/2008 | Ploeg | |
| 2008/0240889 | A1 | 10/2008 | Yokoyama | |
| 2009/0059033 | A1 | 3/2009 | Shimada | |
| 2009/0321150 | A1 | 12/2009 | Kwon | |
| 2010/0061835 | A1 * | 3/2010 | Sim | B25J 5/00 414/732 |
| 2010/0116566 | A1 * | 5/2010 | Ohm | B62D 37/04 901/1 |
| 2010/0229663 | A1 | 9/2010 | Wang | |
| 2010/0280662 | A1 | 11/2010 | Abdallah | |
| 2011/0058800 | A1 | 3/2011 | Lee | |
| 2011/0067517 | A1 | 3/2011 | Ihrke | |
| 2011/0067520 | A1 | 3/2011 | Ihrke | |
| 2011/0068595 | A1 | 3/2011 | Ihrke | |
| 2011/0071671 | A1 | 3/2011 | Ihrke | |
| 2011/0071673 | A1 | 3/2011 | Ihrke | |
| 2011/0071678 | A1 | 3/2011 | Ihrke | |
| 2011/0178636 | A1 | 7/2011 | Kwon | |
| 2011/0186362 | A1 | 8/2011 | Alfayad | |
| 2012/0072215 | A1 | 3/2012 | Yu | |
| 2012/0078419 | A1 | 3/2012 | Kim | |
| 2012/0155775 | A1 | 6/2012 | Ahn | |
| 2012/0215539 | A1 | 8/2012 | Juneja | |
| 2012/0310412 | A1 | 12/2012 | Seo | |
| 2013/0175816 | A1 | 7/2013 | Kawasaki | |
| 2013/0345863 | A1 | 12/2013 | Linder | |
| 2014/0039675 | A1 | 2/2014 | Ead | |
| 2014/0132210 | A1 | 5/2014 | Partovi | |
| 2014/0217762 | A1 | 8/2014 | Ihrke | |
| 2014/0265401 | A1 | 9/2014 | Allen Demers | |
| 2014/0279432 | A1 | 9/2014 | Holman | |
| 2015/0192399 | A1 | 7/2015 | Raab | |
| 2015/0290795 | A1 | 10/2015 | Oleynik | |
| 2016/0008988 | A1 | 1/2016 | Kennedy | |
| 2016/0052574 | A1 | 2/2016 | Khripin | |
| 2016/0064263 | A1 | 3/2016 | Hosek | |
| 2016/0167222 | A1 | 6/2016 | Ead | |
| 2017/0028551 | A1 | 2/2017 | Hemken | |
| 2017/0028563 | A1 | 2/2017 | Hemken | |
| 2017/0032035 | A1 | 2/2017 | Gao | |
| 2017/0075143 | A1 | 3/2017 | Saylor | |
| 2017/0080582 | A1 | 3/2017 | Mugnier | |
| 2017/0106738 | A1 | 4/2017 | Gillett | |
| 2017/0125008 | A1 | 5/2017 | Maisonnier | |
| 2017/0299898 | A1 | 10/2017 | Gallina | |
| 2017/0326736 | A1 | 11/2017 | Nagatsuka | |
| 2018/0104823 | A1 | 4/2018 | Kaku | |
| 2018/0136912 | A1 | 5/2018 | Venkataramani | |
| 2018/0182260 | A1 | 6/2018 | Ciniello | |
| 2018/0186015 | A1 | 7/2018 | Xiong | |
| 2018/0232201 | A1 | 8/2018 | Holtmann | |
| 2018/0281179 | A1 | 10/2018 | Michalakis | |
| 2018/0293517 | A1 | 10/2018 | Browne | |
| 2018/0357552 | A1 | 12/2018 | Campos | |
| 2019/0005374 | A1 | 1/2019 | Shankar | |
| 2019/0025611 | A1 | 1/2019 | Saylor | |
| 2019/0079924 | A1 | 3/2019 | Sugiura | |
| 2019/0082811 | A1 | 3/2019 | Gray | |
| 2019/0105783 | A1 | 4/2019 | Al Moubayed | |
| 2019/0278079 | A1 | 9/2019 | Mccabe | |
| 2019/0329413 | A1 | 10/2019 | Johnson | |
| 2019/0337166 | A1 | 11/2019 | Keeney-Ritchie | |
| 2019/0371307 | A1 | 12/2019 | Zhao | |
| 2019/0374161 | A1 | 12/2019 | Ly | |
| 2020/0003256 | A1 | 1/2020 | Koroyasu | |
| 2020/0009739 | A1 | 1/2020 | Moon | |
| 2020/0086479 | A1 | 3/2020 | Messier | |
| 2020/0180145 | A1 | 6/2020 | Xiong | |
| 2020/0180146 | A1 | 6/2020 | Xiong | |
| 2020/0180167 | A1 | 6/2020 | Xiong | |
| 2020/0182336 | A1 | 6/2020 | Xiong | |
| 2020/0182337 | A1 | 6/2020 | Xiong | |
| 2020/0330246 | A1 | 10/2020 | Tognetti | |
| 2020/0409183 | A1 | 12/2020 | Saylor | |
| 2021/0146214 | A1 | 5/2021 | Lim | |
| 2021/0162602 | A1 | 6/2021 | Kawaguchi | |
| 2021/0387346 | A1 | 12/2021 | Gillett | |
| 2022/0226996 | A1 | 7/2022 | Ishizuka | |
| 2022/0227010 | A1 | 7/2022 | Takabu | |
| 2022/0287853 | A1 | 9/2022 | Ren | |
| 2022/0294062 | A1 | 9/2022 | Kamon | |
| 2022/0307581 | A1 | 9/2022 | Johansen | |
| 2022/0388174 | A1 | 12/2022 | Stathis | |
| 2022/0390952 | A1 | 12/2022 | Yu | |
| 2022/0395974 | A1 | 12/2022 | Balasubramanian | |
| 2022/0410380 | A1 | 12/2022 | Lu | |
| 2023/0033779 | A1 | 2/2023 | Gazeau | |
| 2023/0048725 | A1 | 2/2023 | Barbour | |

(56) References Cited

U.S. PATENT DOCUMENTS

2023/0112596 A1 4/2023 Yang
2023/0143315 A1 5/2023 Whitman
2023/0154055 A1 5/2023 Besenbruch
2023/0173683 A1 6/2023 Gomez
2023/0182296 A1 6/2023 Sermanet
2023/0287941 A1 9/2023 Dellon
2023/0347514 A1 11/2023 Xiao
2023/0390948 A1 12/2023 Hsu
2024/0003380 A1 1/2024 Vyas
2024/0044331 A1 2/2024 Sterling
2024/0091964 A1 3/2024 Smith
2024/0181637 A1 6/2024 Gillett
2024/0217096 A1 7/2024 Maleki
2024/0217104 A1 7/2024 Neville
2024/0228191 A1 7/2024 Kumar
2024/0289606 A1 8/2024 Wang
2024/0294219 A1 9/2024 Gildert
2024/0299195 A1 9/2024 Perry
2024/0300109 A1 9/2024 Shaw
2024/0430464 A1 12/2024 Kalva
2025/0042020 A1 2/2025 Fleury
2025/0042024 A1 2/2025 Dijkman
2025/0050507 A1 2/2025 Camasmie
2025/0131347 A1 4/2025 Wells
2025/0147517 A1 5/2025 Swilling
2025/0187202 A1 6/2025 Mccall
2025/0196326 A1 6/2025 Katz
2025/0196327 A1 6/2025 Geating
2025/0205908 A1 6/2025 Goldsmith
2025/0242500 A1 7/2025 Mccall
2025/0322372 A1 10/2025 Berlin
2025/0375905 A1 12/2025 Goldsmith
2026/0027736 A1 1/2026 Yeganeh
2026/0034678 A1 2/2026 Mccall

FOREIGN PATENT DOCUMENTS

CN 102357889 2/2012
CN 302064216 S 9/2012
CN 302255798 12/2012
CN 302255798 S 12/2012
CN 303298408 7/2015
CN 304998646 S 1/2019
CN 305154358 S 5/2019
CN 209615545 11/2019
CN 210998685 7/2020
CN 306231734 12/2020
CN 212287717 1/2021
CN 112959343 6/2021
CN 306894068 S 10/2021
CN 114147745 A 3/2022
CN 307563528 9/2022
CN 307563528 S 9/2022
CN 115503013 12/2022
CN 115649316 1/2023
CN 218802294 4/2023
CN 116714698 9/2023
CN 117047810 11/2023
CN 117301022 12/2023
CN 117462367 1/2024
CN 308675468 S 6/2024
CN 308157136 S 8/2024
CN 309180560 S 3/2025
DE 3345607 A1 6/1985
DE 10217020 11/2003
DE 10217020 B4 2/2004
DE 112018003604 T5 5/2020
DE 402020100743 2/2021
DE 102022107533 10/2023
DE 102022107553 A1 10/2023
DE 112018003604 11/2023
EP 2186552 A1 5/2010
ES 59639 U 6/1957
FR 2595950 A1 9/1987
GB 2446885 A 8/2008
GB 2472046 4/2013
GB 2496335 5/2013
GB 90038381840001 11/2017
GB 6367851 6/2024
GB 6420068 2/2025
GB 6420070 2/2025
JP 1162349 1/2003
JP 2003266362 A 9/2003
JP 1301180 5/2007
JP 1412554 5/2011
JP D1638014 7/2019
JP 6775862 B1 10/2020
JP 1698172 10/2021
KR 20180107353 10/2018
KR 300994127 2/2021
SU 1734994 5/1992
TW 105306360 2/2018
WO 2009030922 3/2009
WO 2017103682 A2 6/2017
WO 2019234706 12/2019
WO 2020190594 A1 9/2020
WO 2022207106 10/2022
WO 2023110778 6/2023
WO D224613 10/2023
WO 2023246994 12/2023
WO 2023246995 12/2023
WO 2024072966 4/2024
WO 2024085904 4/2024
WO 2024111509 A1 5/2024
WO 2024112350 5/2024
WO 2024112351 5/2024
WO 2024123766 6/2024
WO 2024163992 8/2024
WO 2025019583 1/2025
WO 2025042802 2/2025
WO 2025072321 4/2025
WO 2025103557 A1 5/2025

OTHER PUBLICATIONS

Pateromichelakis et al., Head-eyes system and gaze analysis of the humanoid robot Romeo, 2014, IEEE, p. 1374-1379 (Year: 2014).*

Netzev et al., Many Faced Robot—Design and Manufacturing of a Parametric, Modular and Open Source Robot Head, 2019, IEEE, p. 342-348 (Year: 2019).*

Cilmi et al., Design and Implementation of Real Time Face Tracking Humanoid Robot, 2018, IEEE, p. 1-6 (Year: 2018).*

Available online at https://www.youtube.com/watch?v=a-R4H8-8074, at least as early as Jun. 6, 2015.

Available online at https://www.youtube.com/watch?v=1fC7b2LjVW4, at least as early as Jul. 12, 2016.

Ophaswongse et al., Optimal Design of a Novel 3-DOF Orientational Parallel Mechanism for Pelvic Assistance on a Wheelchair: An Approach Based on Kinematic Geometry and Screw Theory, 2020, IEEE, p. 3315-3322 (Year: 2020).

Shafti et al., Real-time Robot-assisted Ergonomics, 2019, IEEE, p. 1975-1981 (Year: 2019).

Luo et al., Human body trajectory generation using point cloud data for robotics massage applications, 2014, IEEE, p. 5612-5617 (Year: 2014).

Cheng et al., Human posture estimation using voxel data for "smart" airbag systems: issues and framework, 2004, IEEE, p. 84-89 (Year: 2004).

Or, Humanoids Grow a Spine: The Effect of Lateral Spinal Motion on the Mechanical Energy Efficiency, 2012, IEEE, p. 1-11 (Year : 2012).

Souissi et al., Influence of the No. of humanoid vertebral column pitch joints in flexion movements, 2011, IEEE, p. 227-282 ( Year: 2011).

Han et al., Mechanical design of robot lower body based on four-bar linkage structure for energy efficient bipedal walking, 2016, IEEE, p. 402-407 (Year: 2016).

Park et al., Design of a lower limb exoskeleton including roll actuation to assist walking and standing up, 2015, IEEE, p. 359-354 ( Year: 2015).

(56) References Cited

OTHER PUBLICATIONS

Tsagarakis et al., Lower body realization of the baby humanoid 'iCub', 2007, IEEE, p. 3616-3622 (Year: 2007).
Machine translation of CN-114147745-A (Year: 2022).
Machine translation of DE-112018003604-T5 (Year: 2020).
Machine translation of WO-2020190594-A1. (Year: 2020).
"A lightweight robotic leg prosthesis replicating the biomechanics of the knee, ankle, and toe joint", published Nov. 23, 2022 retrieved from Wayback machine URLhttps://www.science.org/doi/10.1126/scirobotics.abo3996 on Feb. 22, 2026 (Year: 2022).
https://web.archive.org/web/20220702203427/https://singularityhub.com/2010/01/20/ iwalk-presents-worlds-first-actively-powered-foot-and-ankle/ (Year: 2010).
https://www.hola.com/us/celebrities/20221003337667/elon-musk-unveils-robot/ Oct. 3, 2022 (Year: 2022).
https://robotsguide.com/robots/figure (Year: 2023).
https://startup-weekly.com/Figure-announces-70m-Seres-A-to-support-commercialization-of-Figure-01-humanoid-obot5/312/2023 ( Year: 2023).
https://www.cnn.com/2022/09/30/business/tesla-bot-robot Oct. 1, 2022 (Year: 2022).
https://electrek.co/2023/05/16/tesla-bot-sideshow-new-footage-robots/ 5/16/2023 (Year: 2023).
https://www.humanoidsdaily.com/news/figure-reveals-fgure-03-in-new-teaser-full-unveling-set-for-october-10 (Oct. 7, 2025) (Year: 2025).
htp://www.analyticsinsight.net/artificial-inteligence/xiaomis-cyberone-a-new-humanoid-obot-to-fight-teslabot(Sep. 8, 2022) (Year: 2022).
ttps/startu-wey.com/Figure-announces-70m-Seres-A-to-suppor-commercialzaton-of-Figure-01-humanoid-robot/531/2023(Year: 2023).
Available online at https://www.youtube.com/watch?v=Fb_R6IDDU4A, at least as early as Oct. 9, 2020.
Available online at https://www.youtube.com/watch?v=_mQJw8VhZ7w, at least as early as Oct. 5, 2022.
https://lifearchitect.ai/humanoids/ (Year: 2023).
https://robotsguide.com/robots/optimus (Year: 2022).
https://www.economist.com/science-and-technology/2024/06/05/he-uesto-buld-obots-that-look-and-behavelike-humans(Year 2024).
https://robotsguide.com/robots/hrp4 (Year: 2010).
https://supercarblondie.com/unitree-humanoid-robot-word-speed-record/(Year 2024).
Available online at https://www.youtube.com/watch?v=q8ldbodRG14, at least as early as May 22, 2019.
Available online at https://youtu.be/GtPs_ygfaEA?si=7lv6MEFvFoaacKfa, at least as early as Aug. 15, 2023.
Available online at https://youtu.be/_MBd_XfXy9M?si=PbEHUJpRUFqaxS3J, at least as early as Jun. 26, 2023.
Available online at https://youtu.be/SHPxcRBIXN0?si=VbJqbK7jzUqtZGmn, at least as early as Sep. 26, 2023.
Available online at https://youtu.be/BvFxD-8AhJA?si=Vx1F4a76tbQDUX48, at least as early as Nov. 16, 2023.
Available online at https://youtu.be/XiQkeWOFwmk?si=1qOPC8gXgmmGvXRT, at least as early as May 16, 2023.
Available online at https://youtu.be/cpraXaw7dyc?si=JvPaT6eMA18psrmU, at least as early as Dec. 13, 2023.
Available online at https://youtu.be/BNSZ8Fwcd20?si=_YnVgjYblVuhASk1, at least as early as Oct. 27, 2023.
Available online at https://youtu.be/SS3Ga2HQQ0s?si=Dwr3sJuCsOeUoSLj, at least as early as Nov. 20, 2023.
Available online at https://youtu.be/sihlDeJ4Hmk?si=fJsKpvRFPzFejmS6, at least as early as Dec. 27, 2023.
Available online at https://www.youtube.com/watch?v=zkBnFPBV3f0, at least as early as Jul. 11, 2013.
Available online at https://www.youtube.com/watch?v=oXBYZxa25vc&t=1s, at least as early as Apr. 3, 2013.
Available online at https://www.youtube.com/watch?v=LBeml9AmTT4, at least as early as Apr. 7, 2015.
Available online at https://www.youtube.com/watch?v=IE-YBaYjbqY, at least as early as Dec. 10, 2013.
Available online at https://www.youtube.com/watch?v=y-j4dixQQml&t=222s, at least as early as May 22, 2012.
Available online at https://www.youtube.com/watch?v=Bmglbk_Op64&t=1s, at least as early as Nov. 10, 2011.
Available online at https://www.youtube.com/watch?v=20GHG-R9eFI, at least as early as Mar. 6, 2023.
Available online at https://www.youtube.com/watch?v=67CUudkjEG4, at least as early as Oct. 26, 2009.
Available online at https://www.youtube.com/watch?v=yBmatGQ0giY&t=1s, at least as early as Aug. 11, 2022.
Available online at https://www.youtube.com/watch?v=_mQJw8VhZ7w&t=111s, as least as early as Oct. 5, 2022.
Available online at https://www.youtube.com/watch?v=UPOLcE1vwA0, at least as early as Apr. 28, 2016.
Available online at https://www.youtube.com/watch?v=ioOkbUQqmZO, at least as early as Nov. 9, 2022.
Available online at https://www.youtube.com/watch?v=CUhuhleQNos, at least as early as May 22, 2019.
Available online at https://www.youtube.com/watch?v=dY57qnD_O7U, at least as early as Jul. 27, 2021.
Jeung et al., Realization of human neck motion with novel robotic mechanism, 2016, IEEE, p. 482-486 (Year: 2016).
Barker et al., Natural head movement for HRI with a muscular-skeletal head and neck robot, 2017, IEEE, p. 587-592 (Year: 2017).
Gao et al., Development of a low motion-noise humanoid neck: Statics analysis and experimental validation, 2010, IEEE, p. 1203-1208 (Year: 2010).
Keselman et al., "Intel RealSense stereoscopic depth cameras," in Proceedings of the IEEE Conference on Computer Vision and Pattern Recognition Workshops, pp. 1-10, 2017.
Nakada et al., Deep Learning of Neuromuscular and Visuomotor Control of a Biomimetic Simulated Humanoid, 2020, IEEE, p. 3952-3959 (Year: 2020).
Lim et al., Basic emotional walking using a biped humanoid robot, 1999, IEEE, p. 954-959 (Year: 1999).
Albers et al., Upper Body of a new Humanoid Robot—the Design of ARMAR III, 2006, IEEE, p. 308-309 (Year: 2006).
Park et al., Mechanical Design of Humanoid Robot Platform KHR-3 (Kaist Humanoid Robot 3: HUBO), 2005, IEEE, pgl., 321-3226 (2005).
Englsberger et al., "Overview of the Torque-Controlled Humanoid Robot TORO," 2014 14th IEEE-RAS International Conference on Humanoid Robots (Humanoids), Nov. 18-20, 2014. Madrid, Spain.
Cheng et al., "Human Posture Estimation Using Voxel Data for "Smart" Airbag Systems: Issues and Framework," IEEE, p. 84-89 (2004).
Droeschel et al., "Learning to Interpret Pointing Gestures with a Time-of-Flight Camera," IEEE, p. 481-488 (2011).
Frohlich et al., "Design and Impementation of a Spherical Joint for Mobile Manipulators," IEEE, p. 251-258 (2016).
Netzev et al., "Many Faced Robot—Design and Manufacturing of a parametric, Modular and Open Source Robot Head," IEEE, p. 342-348 (2019).
Netzev et al., Design and implementation of a spherical joint for mobile manipulators, 2019, IEEE, p. 342-348 (Year: 2019).
Yaghoubi et al., Region-Based CNNs for Pedestrian Gender Recognition in Visual Surveillance Environments, 2019, IEEE, p. 1-5 (Year: 2019).
Pateromichelakis et al., Head-eyes system and gaze analysis of the humanoid robot Romeo, 2014, IEEE, p. 1374-131379 (Year: 2014).
Mokhtari et al., Taban:A Retro-Projected Social Robotic—Head for Human-Robot Interaction, 2019, IEEE, p. 46-51 (Year: 2019).
Merged original document with English translation (CN 112959343); Paragraphs added for citation purposes. (Year: 2021).
Merged original document (KR 20180107353) with English Translation (Year: 2018).
Duran-Hernandez et al., "Control Implementation in a Low-cost Designed Biped Robot to Reproduce Squats," The 10th International Conference on Control, Mechatronics and Automation, Nov. 9, 2022.
Hao et al., Design and kinematics analysis of a 4-DOF articulated steering mechanism, 2015, IEEE, p. 5875-5880 (Year: 2015).

(56) References Cited

OTHER PUBLICATIONS

Or, Computer Simulations of a Humanoid Robot Capable of Walking Like Fashion Models, 2012, IEEE, p. 241-248 (Year: 2012).
Asano et al., Achievement of twist squat by musculoskeletal humanoid with screw-home mechanism, 2013, IEEE, p. 4649-4654 ( Year: 2013).
Bridgwater et al., The Robonaut 2 hand—designed to do work with tools, 2012, IEEE, p. 3425-3430 (Year: 2012).
CyberOne Robots_ Your Guide to the World of Robotics (Year: 2022).
Dalley et al., Design of a Multifunctional Anthropomorphic Prosthetic Hand With Extrinsic Actuation, 2009, IEEE, p. 1-8 (Year: 2009).
English translation of DE-102022107553-A1 (Year: 2023).
English translation of DE-10217020-B4 (Year: 2004).
Hand et al., FAS A flexible antagonistic spring element for a high performance over, 2011, IEEE, p. 1366-1372 (Year: 2011).
Haywood et al., A novel 3D printed leg design for a biped robot, 2017, IEEE, p. 1-6 (Year: 2006).
htp/ww.usatoday.com/story/tech/gaming/2021/08/20/tesla-bot-elon-musk-humanoid-robots/8208107002/(Year: 2021).
https://www.analyticsinsight.net/artificial-inteligence/xiaomis-cyberone-a-new-humanoid-obot-to-fight-teslabot (Sep. 8, 2022) (Year: 2022).
https:/www.humanoidsdaily.com/news/figure-reveals-figure-03-in-new-teeser-full-unveiling-set-for-october-10 (Oct. 7, 2025) (Year: 2025).
Kamogawa et al., Development of tendon-driven robotic hand for biped humanoid robot, 2014. IEEE, p. 914-917 (Year: 2014).
Kawamura et al., One-leg Jumping with Virtual Spring Principle, 2008, IEEE, p. 34-39 (Year: 2008).
Lohmeier et al., Modular joint design for performance enhanced humanoid robot LOLA, 2006, IEEE, p. 88-93 (Year: 2006).
Mike, (date published Dec. 18, 2023), Tesla Optimus Gen 2 Humanoid Robot, Mikeshouts.com, URL: (https://mikeshouts.com/tesla-optimus-gen-2-humanoid-robot/, (Year: 2023).
Mizuuchi et al., Design and development of a compressor-embedded pneumatic-driven musculoskeletal humanoid Publisher: IEEE, 2012, p. (Year: 2012).
Park et al., Whole-body walking pattern using pelvis-rotation for long stride and arm swing for yaw angular momentum compensation, 2021, IEEE, p. 47-52 (Year: 2021).
Scarcia et al., Towards simplicity: On the design of a 2-DOFs wrist mechanism for tendon-driven robotic hands, 2015. OEEE, p. 1317-1322 (Year: 2015).
Toedtheide et al., An Integrated, Force-Sensitive, Impedance Controlled, Tendon-Driven Wrist: Design, Modeling, and Control, 2020, IEEE, p. 25-32 (Year: 2020).
Tsagarakis et al., Lower Body Design of the 'iCub' a Human-baby like Crawling Robot, 2006, IEEE., p. 450-455 (Year: 2006).
Tsagarakis et al., The design of the lower body of the compliant humanoid robot "cCub", 2011, IEEE, p. 2035-2040 (Year: 2011).
https://gagadget.com/en/announce/156738- xiaomi-presenteda-robot-humanoid-cyberone-it-can-communicate-recognize-emotions-and-give-fowers/(Nov. 8, 2022) (Year: 2022).

* cited by examiner 3264
3900
3388
3386
3382
3380
3902

3234
3806
3262

3228
3300

11202
11202a
11301
11264a
11228
11300

11202a
11264b
11300
11301

13300
13301

13202a
13202
13300
13302
13202b

HEAD AND NECK ASSEMBLY OF A ROBOT

PRIORITY CLAIM AND CROSS-REFERENCE TO RELATED APPLICATIONS

This application is: (i) a continuation in part of U.S. Design patent application Ser. No. 29/935,680, which is a continuation in part of U.S. Design patent application Ser. No. 29/928,748, which is a continuation in part of U.S. Design patent application Ser. No. 29/889,764, (ii) a continuation in part of U.S. patent application Ser. No. 18/919,263, and (iii) claims priority under 35 U.S.C. § 119(e) to U.S. Provisional Patent Application Nos. 63/626,035, 63/564,741, 63/626,034, 63/626,037, 63/626,030, 63/566,595, 63/626,028, 63/573,528, 63/561,316, 63/634,697, 63/573,226, 63/707,949, 63/707,897, 63/707,547, 63/708,003, and 63/626,105, each of which is expressly incorporated by reference herein in its entirety.

Reference is hereby made to: (i) U.S. patent application Ser. Nos. 19/000,626, 19/006,191, 18/919,274, 18/919,263, (ii) PCT Application Nos. US/2025/10425, US/2025/11450, and (iii) U.S. Provisional Patent Application Nos. 63/557,874, 63/626,040, 63/625,362, 63/625,370, 63/625,381, 63/625,384, 63/625,389, 63/625,405, 63/625,423, 63/625,431, 63/685,856, 63/696,507, 63/696,533, 63/700,749, 63/614,499, 63/617,762, 63/561,315, 63/615,766, 63/620,633, and 63/706,768, each of which is expressly incorporated by reference herein in its entirety.

TECHNICAL FIELD

This disclosure relates to a head of a robot, specifically a head of a humanoid robot. The head of the humanoid robot includes a plurality of components configured to provide the robot with the ability to communicate with nearby humans using a display that is protected by a frontal shell.

BACKGROUND

The current labor market within the United States is confronting an unprecedented labor shortage, characterized by over 10 million unfilled positions. A significant proportion of these vacancies pertain to occupations that are deemed unsafe, undesirable, or involve hazardous working conditions. This persistent and escalating shortage of available labor has created an urgent imperative for the development and deployment of advanced robotic systems capable of performing tasks that are unattractive or pose risks to human workers. To effectively address this widening gap in the workforce, it has become critical to design and engineer robots that can operate with high efficiency and reliability within human-centric environments. These environments often demand capabilities such as physical dexterity, sustained endurance, precise manipulation, and the ability to navigate complex spaces designed for humans.

Advanced general-purpose humanoid robots have emerged as a promising solution to meet these challenges. These robots are meticulously engineered to replicate the human form and emulate human functionality, typically featuring bipedal locomotion with two legs, bilateral manipulation abilities with two arms, and a display to facilitate interaction with human users. The anthropomorphic design enables these robots to seamlessly integrate into environments originally designed for humans, thereby minimizing the need for extensive modifications to existing infrastructures. As these robots endeavor to mimic the human body, it becomes essential to equip them with a head design that not only meets functional requirements but also enhances aesthetic appeal and durability. The head is a critical component for human-robot interaction, serving as the primary interface through which the robot communicates and engages with nearby humans. A well-designed head can significantly improve the robot's ability to convey information, express intentions, and respond to human cues, thereby fostering a more intuitive and natural interaction experience.

To meet these requirements, the present disclosure introduces an innovative head design that incorporates a versatile display system. This display is capable of adapting its visual output to suit a wide range of operational tasks by rendering icons, graphics, expressive animations, and informative text. The adaptability of the display allows the robot to present contextually relevant information and provide visual feedback, all of which enhance the robot's ability to interact effectively with human users. By making the robot's appearance more relatable and intuitive, the display fosters improved engagement and facilitates smoother human-robot collaboration.

Considering the sensitive and fragile nature of display technologies, and acknowledging the often challenging and harsh environments in which humanoid robots are deployed, it is advantageous to position the display behind a protective shield. This strategic placement serves multiple purposes. Firstly, the shield safeguards the display from potential contaminants such as dust, moisture, chemicals, and particulate matter that could adversely affect its performance and longevity. Secondly, the shield provides protection against physical impacts, vibrations, and mechanical stresses that may occur during operation, especially in industrial or outdoor settings. By mitigating the risks of damage to the display, the shield contributes to the overall robustness and reliability of the robot. Moreover, the integration of the display behind a shield contributes to a sleek and futuristic aesthetic, enhancing the robot's visual appeal.

In summary, the disclosed head design addresses the critical need for a durable, adaptable, and aesthetically pleasing interface for a general-purpose humanoid robot. By combining a versatile display with the frontal shell, the design ensures that the robot can effectively communicate and interact with humans while withstanding the rigors of diverse operational environments. This innovation not only enhances the functionality and user experience but also extends the operational lifespan of the robot, thereby providing a more sustainable and cost-effective solution for addressing the current labor market challenges.

SUMMARY

A need exists for a humanoid robot with an upper region including: (i) a torso, (ii) a pair of arm assemblies coupled to the torso, and (iii) a head and neck assembly coupled to the torso and having a neck portion and a head portion coupled to the neck portion. Said head portion includes: a frontal shell having a rear edge, a rear shell having a frontal edge, and an illumination assembly. The illumination assembly is configured to illuminate a region that: (i) extends between a rear edge of the frontal shell and an extent of the frontal edge of the rear shell, (ii) is positioned adjacent to the extent of the rear edge of the frontal shell, and (iii) is positioned adjacent to the extent of the frontal edge of the rear shell. The humanoid robot also includes: (i) a central region coupled to the upper region, and (ii) a lower region coupled to the central region and spaced apart from the upper region, the lower region including a pair of legs.

There is also a need for a humanoid robot with an upper region including: (i) a torso, (ii) a pair of arm assemblies coupled to the torso, and (iii) a head and neck assembly coupled to the torso and having a neck portion and a head portion coupled to the neck portion. Said head portion includes a frontal shell having a curvilinear periphery, and an outer surface having a nasal region and an orbital region that is not recessed in comparison to said nasal region. The head portion also includes an illumination assembly configured to emit light in a location that is adjacent to the periphery of the frontal shell. Finally, the humanoid robot also includes: (i) a central region coupled to the upper region, and (ii) a lower region coupled to the central region and spaced apart from the upper region, the lower region including a pair of legs.

BRIEF DESCRIPTION OF THE DRAWINGS

The drawing FIGURES depict one or more implementations in accord with the present teachings, by way of example only, not by way of limitation. In the FIGURES, like reference numerals refer to the same or similar elements shown across various other FIGURES.

DETAILED DESCRIPTION

Figure 1:
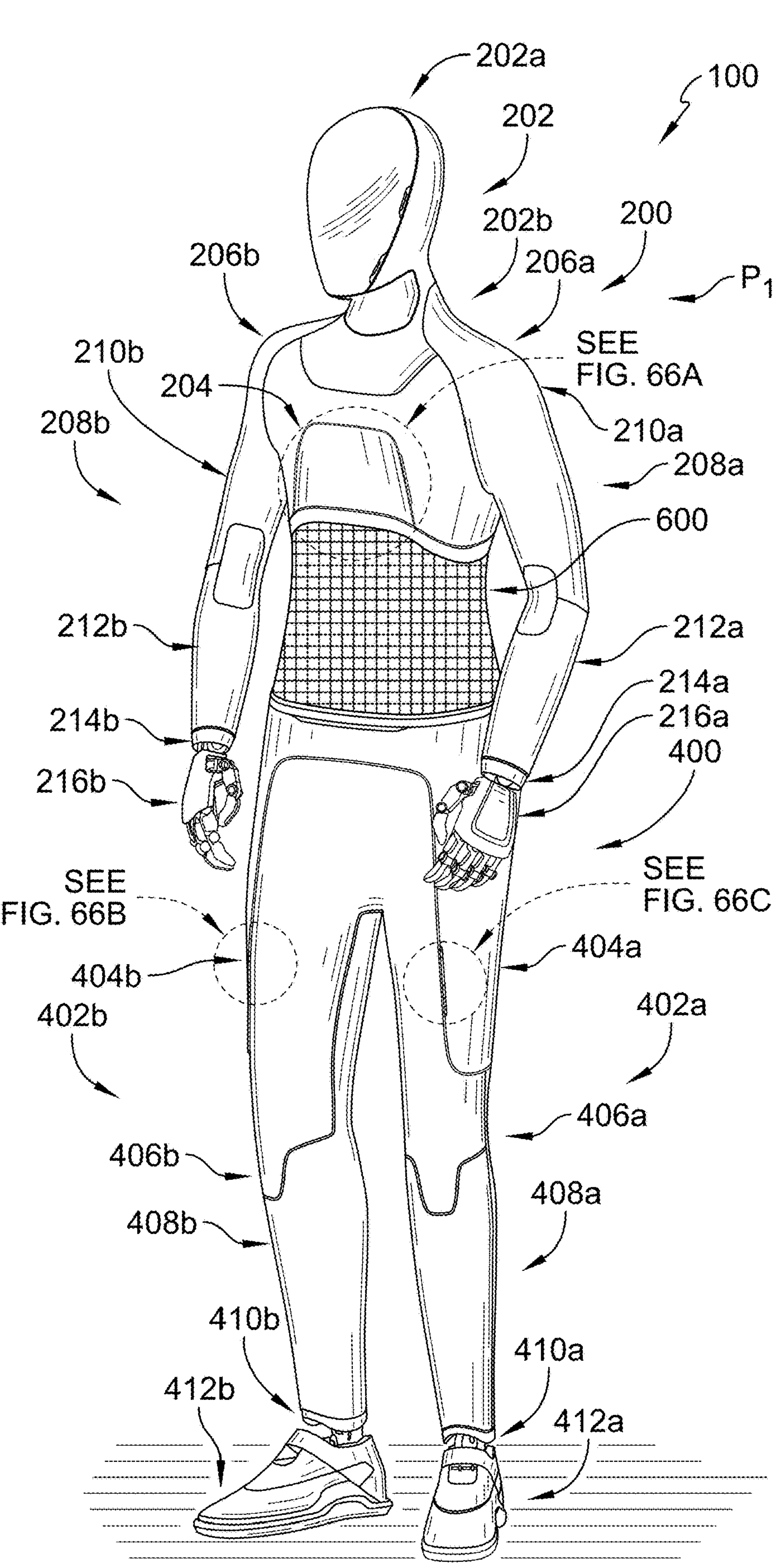
FIG. 1 is a front perspective view of a humanoid robot in an upright, standing position P1 and including: (i) an upper region having the following parts: (a) a head and neck assembly, (b) a torso, (c) left and right shoulders, (d) and left and right arm assemblies each including: (e) a humerus, (f) a forearm, (g) a wrist, and (h) a hand; (ii) a lower region having left and right leg assemblies each including: (a) a thigh, (b) a knee, (c) a shin, (d) an ankle, and (e) a foot; and (iii) a central region connecting the upper region and the lower region to one another and configured to allow movement of the upper and lower regions relative to one another.

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present disclosure.

While this disclosure includes several embodiments in many different forms, there is shown in the drawings and will herein be described in detail embodiments with the understanding that the present disclosure is to be considered as an exemplification of the principles of the disclosed methods and systems, and is not intended to limit the broad aspects of the disclosed concepts to the embodiments illustrated. As will be realized, the disclosed methods and systems are capable of other and different configurations and several details are capable of being modified all without departing from the scope of the disclosed methods and systems. For example, one or more of the following embodiments, in part or whole, may be combined consistent with the disclosed methods and systems. As such, one or more steps from the flow charts or components in the FIGURES may be selectively omitted and/or combined consistent with the disclosed methods and systems. Additionally, one or more steps from the flow charts or the method of assembling the shoulder and upper arm may be performed in a different order. Accordingly, the drawings, flow charts and detailed description are to be regarded as illustrative in nature, not restrictive or limiting.

A. Introduction

Unlike conventional robots, and as described in greater detail below, the disclosed humanoid robot 100 includes an upper region 200 having a head and neck assembly 202. The head and neck assembly 202 is coupled to a torso 204 and has an overall shape that generally resembles a human head. As such, the head and neck assembly (e.g., 202) includes a head portion (e.g. 202*a*, etc.) that does not include large flat surfaces (e.g., opposed sides of a head, or is not in the shape of: (a) a cube, (b) a hexagonal prism, or (c) a pentagonal prism). Instead, almost all the surfaces of the head portion 202*a* are curvilinear or have substantial curvilinear aspects or segments. However, as shown in the FIGURES, some embodiments of the head portion 2202*a* includes a recess with a small flat sensor cover or lens, which is recessed in a top portion of the head portion 202*a* and is designed to decrease sensor signal distortion that may be caused if the sensor signals are required to travel through a curvilinear shell, cover, shield, or lens. Additionally, while the overall head shape is designed to be human-like, the disclosed head lacks pronounced human facial structures (cheeks, eye light emitter housings, a mouth, or other moving structures).

Figures 31, 32:
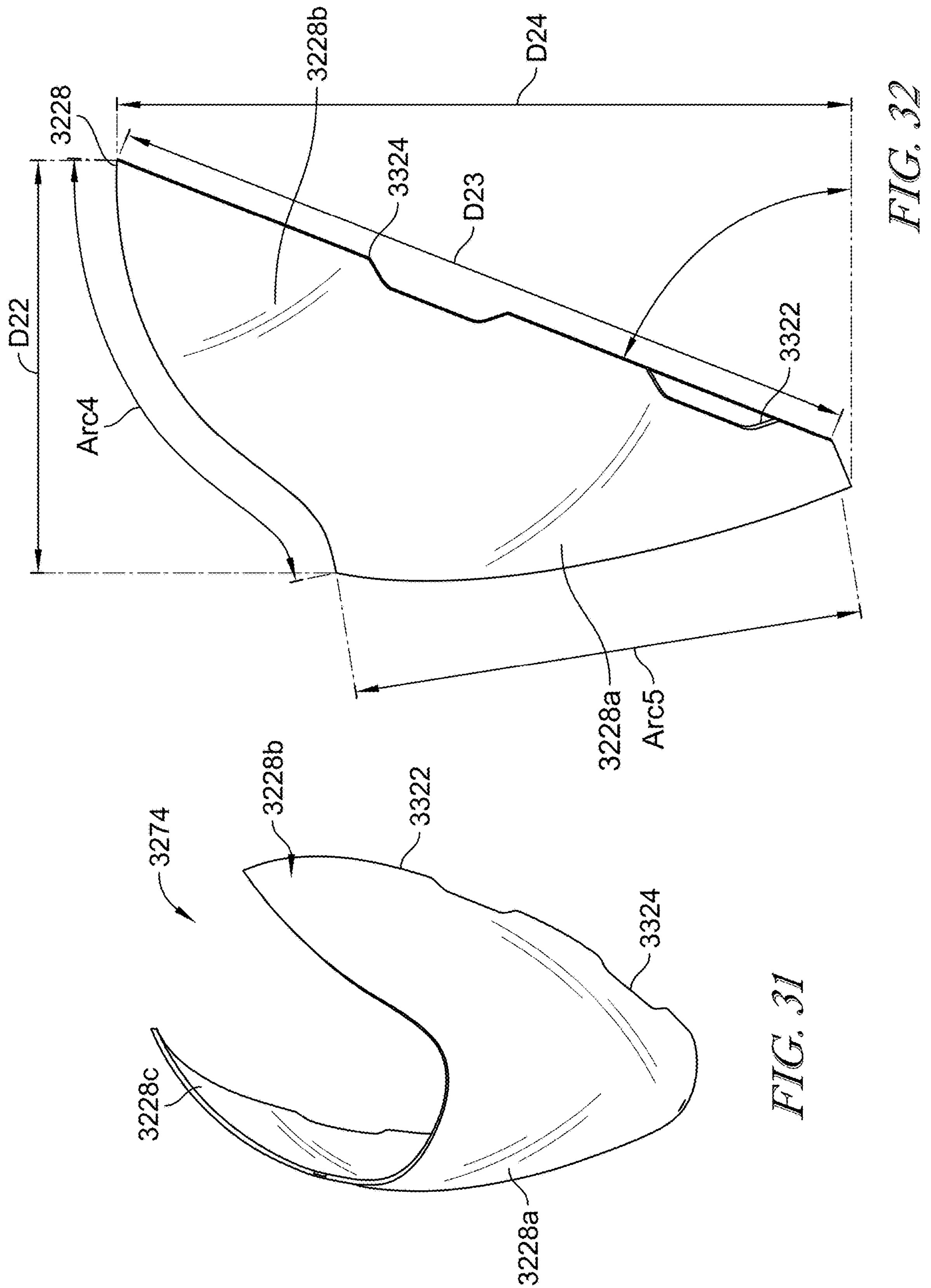
FIG. 31 is a perspective view of the frontal shell of the head and neck assembly of FIG. 22, wherein the frontal shell includes: (i) a main body, (ii) a plurality of wings that extend upward from the main body, (iii) an outer periphery with a rear edge having a plurality of recesses formed therein.
FIG. 32 is a side view of the frontal shell of the head and neck assembly of FIG. 22 showing various dimensions of the frontal shell.

The frontal region of the head portion 202*a* is covered by a large freeform frontal shell, frontal head shell, or frontal shield (e.g. 228, etc.) wherein the curvature of the frontal shell varies horizontally and laterally across the head portion 202*a*. The freeform nature of the frontal shell (e.g., 228, etc.) causes it to be separate and distinct from the display(s) (e.g., 300) that is positioned behind such frontal shell. This positional relationship allows the frontal shell 228 to protect the display (e.g., 300, etc.) and electronics contained in the head portion 202*a* from damage, which provides a substantial benefit over conventional robot heads that lack this protective feature. For example, certain tasks (e.g., moving and cutting sheet metal) that the humanoid robot 100 may perform on a factory floor may damage or break a display that is not protected behind such a frontal shell 228. As shown in the FIGURES, the frontal shell 228 does not extend over the entirety of an upper head shell, behind an ear region, nor does it extend into the rear region of the head portion 202*a*. However, the frontal shell 228 extends to the chin region (e.g., 355, etc.) and, in some embodiments, includes a substantial opening or recess formed along the upper extent of such frontal shell 2228. The opening or recess formed along the upper edge allows for the inclusion of a small flat sensor cover or a secondary lens. Due to the formation of this opening or recess, the frontal shell (e.g., 2228 as shown in FIG. 31) includes two wing-shaped structures that extend upwards from a main body and surround lateral extents of sensors positioned behind the small flat sensor cover.

Unlike conventional robot heads, the disclosed head portion 202*a* includes a display 300 that is preferably curved in a single direction, or at least one direction, and is positioned at an angle relative to a coronal plane and a horizontal reference plane. The curved nature of the display 300 allows for the inclusion of a larger display with a larger surface area within the head portion 202*a*, which increases the amount of information that can be displayed thereon. The larger display 300 provides a benefit over conventional robot heads that lack this feature because those conventional robots must either forgo displaying as much information (while not altering the size of the information) or increase the size of their head (which causes a number of other issues, including increased material costs and assembly costs). Additionally, being able to display more information on the disclosed display 300 is beneficial because the disclosed humanoid robot 100 does not include any other internal displays. Further, including only a single display 300 within the humanoid robot 100 is beneficial because it: (i) reduces space needed for displays, (ii) reduces battery usage of the displays, and (iii) at least reduces, and typically eliminates, the inclusion of fragile components within the humanoid robot 100. The display 300 may be configured to display robot status, sensor data, and/or other relevant information to nearby human beings. However, the display is not configured to display human-like facial features (eyes, nose, mouth, etc.) or expressions, but instead is designed to use generic blocks or shapes.

Unlike conventional robot heads, in some embodiments, the disclosed head portion 3202*a* may include two separate sensor assemblies (e.g., an upper sensor assembly 3301*a* and a lower sensor assembly 3301*b*). The first sensor assembly 3301*a* may be positioned within an upper shell or the robot's forehead region, while the second sensor assembly 3301*b* may be positioned within the neck assembly or the robot's chin region. The strategic position of the first sensor assembly 3301*a* offers at least two distinct advantages, as it: (i) enables a larger display 3300 to be utilized within the head portion 3202*a*, and (ii) allows the humanoid robot 3100 to see into a bin that is placed on a high shelf or rack. Including the second sensor assembly 3301*b* enables the humanoid robot 3100 to look downward (e.g., to see what it is carrying or looking into a storage bin) without using the first sensor assembly 3301*a*. These are significantly beneficial features over conventional robots that lack a second sensor assembly 3301*b* because such conventional robots must bend and articulate their neck to a greater degree to obtain the data that would otherwise be captured by the second sensor assembly 3301*b*. Also, neither sensor assembly 3301*a*, 3301*b* in the disclosed head portion 202*a* is positioned where a human's eyes would typically be located, nor above the crown of the head, nor on either side of the robot's head portion 3202*a*. It should be understood that: (i) both the first and second sensor assemblies 3301*a*, 3301*b* may be omitted, (ii) the first or upper sensor assembly 3301*a* may be omitted while the second or lower sensor assembly 3301*b* is retained, or (iii) the second or lower sensor assembly 3301*b* may be omitted while the first or upper sensor assembly 3301*a* is retained.

The electronics assembly 222 of the disclosed head portion 202*a* may include an illumination assembly 223 having at least one light emitter 902, and preferably a plurality of light emitting assemblies (e.g. 264.2*a*-264.2*d*, etc.) are positioned adjacent to a rear edge 322 of the frontal shell 228. The light emitters 902 enable the humanoid robot 100 to communicate with humans without using the display 300 that is disposed behind the frontal shell 228, wherein said light emitters 902 act as or are configured to act as an indicator light. Typically, the light emitters 902 (and in this configuration, indicator lights) can communicate information about the humanoid robot 100 to nearby humans by: (i) emitting light having different wavelengths, wherein said emitted light may be perceived by a nearby human as having different colored light, and/or (ii) utilizing illumination sequences, durations, and/or brightness levels. For example, the indicator lights may be used to communicate the working state (e.g., yellow light—600 nm), idle state (e.g., green light—550 nm), charging state (e.g., blinking or white light), error state (e.g., red light 665 nm), thinking state (e.g., blue light 470 nm), or other general states. This configuration is beneficial because it can limit the information that needs to be displayed on the display 300 and allows a human, another robot, or a machine to receive information from the humanoid robot 100, even when the human, other robot, or machine is positioned directly to one side of the humanoid robot 100 (where the human, other robot, or machine could not see the display 300). Also, the light emitters 902 use less battery power than the display 300 and may be able to relay information more quickly to the human, other robot, or machine. Alternatively, the indicator lights can signal an operator to immediately take note of a more complex condition or information that is comprehensively displayed on the display 300 to ensure that an operator properly assesses that complex condition or information for the humanoid robot 100. It should be understood that in other embodiments, the illumination assembly 223 may: (i) emit a light that surrounds the periphery of the frontal shell 228, (ii) emit a light that surrounds the rear edge 322 of the frontal shell 228, or (iii) include one or more emitters 902 positioned in other robot parts (e.g., torso 204, knee 406*a*/406*b*, leg assembly 402*a*/402*b*, arm assembly 208*a*/208*b*, hand 216*a*/216*b*, etc.).

B. Robot Architecture

Figure 8:
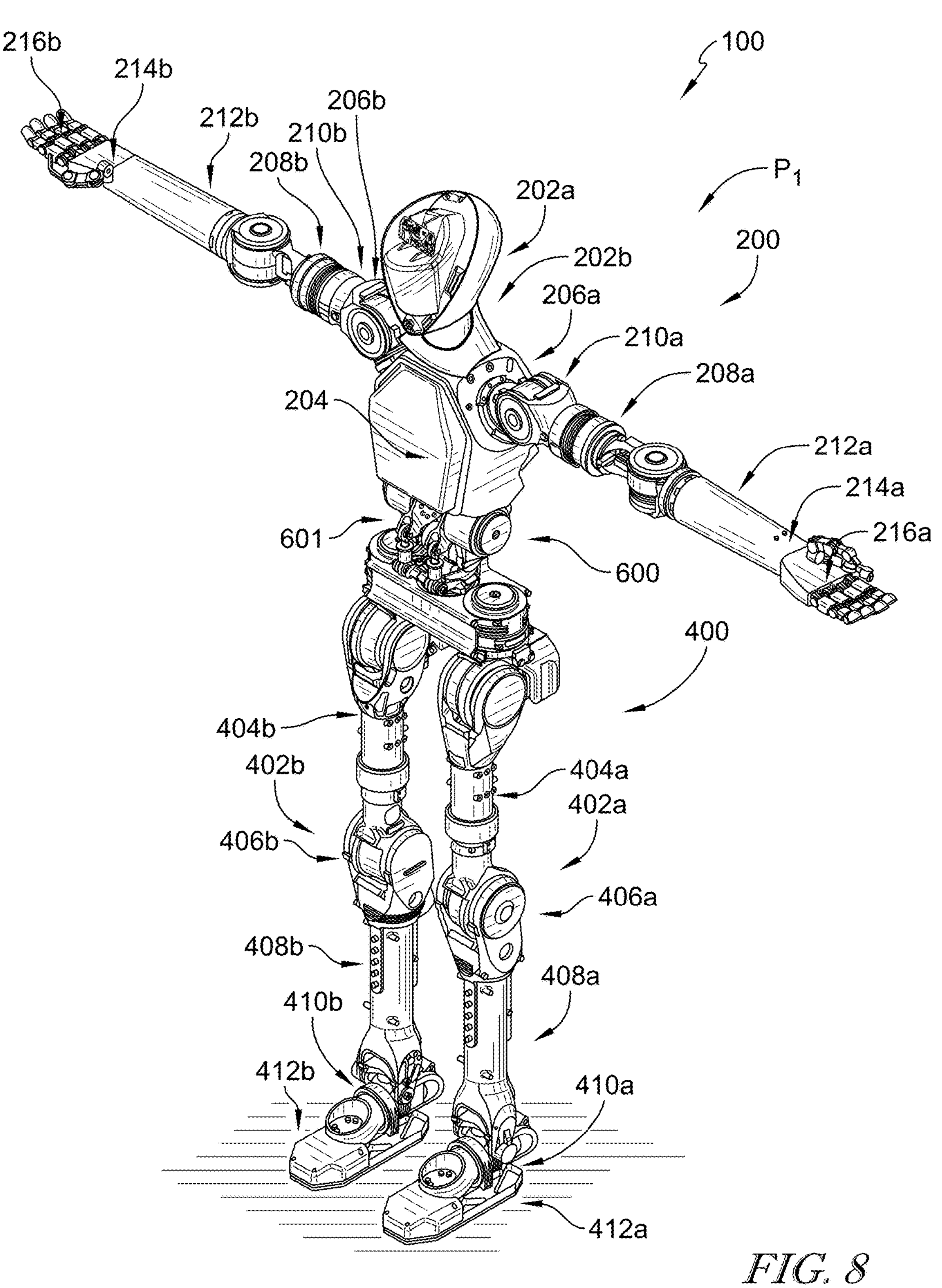
FIG. 8 is a perspective view of a second embodiment of a humanoid robot in an upright standing position P1 with outer covers of the robot removed to expose various actuators and components included in the robot.

The humanoid robot 100 is designed to have substantial similarities in form factor and anatomy to human beings, including many of the same major appendages that human beings have. The humanoid robot 100 includes an upper region 200, a lower region 400 spaced apart from the upper region 200, and a central region 600 interconnecting the upper region 200 and the lower region 400. The humanoid robot 100 is shown in FIGS. 1 and 8 in an upright, standing position P1 where a pair of feet 412*a*, 412*b* of the lower region 400 are standing on a floor or ground surface G such that the lower region 400 supports the upper region 200 and the central region 600 above said floor or ground surface G.

The upper region 200 includes the following parts: (a) a head and neck assembly 202, (b) a torso 204, (c) left and right shoulders 206*a*, 206*b*, and (d) left and right arm assemblies 208*a*, 208*b*, each arm assembly 208*a*, 208*b* including: (e) a humerus 210*a*, 210*b*, (f) a forearm 212*a*, 212*b*, (g) a wrist 214*a*, 214*b*, and (h) a hand 216*a*, 216*b*. The lower region 400 includes left and right leg assemblies 402*a*, 402*b*, each leg assembly 402*a*, 402*b* including: (a) a thigh 404*a*, 404*b*, (b) a knee 406*a*, 406*b*, (c) a shin 408*a*, 408*b*, (d) an ankle 410*a*, 410*b*, and (e) a foot 412*a*, 412*b*. The central region 600 is located generally in, or provides, a pelvis region 601 of the humanoid robot 100. Each of the components of the upper region 200 and the lower region 400 noted above includes at least one actuator configured to move the respective components relative to one another. The central region 600 is also configured to allow movement of the upper and lower regions 200, 400 relative to one another in a three-dimensional manner.

C. Head and Neck Assembly

As shown in FIG. 1, it can be seen that the head and neck assembly 202 of the humanoid robot 100 extends from the torso 204 and is designed to: (i) provide the humanoid robot

100 with a humanoid shape, (ii) house and protect one or more electronic components (e.g., a display 300, light emitters 902, sensors, and/or head actuators), and (iii) provide information to a nearby human using said display 300 and/or indicator lights. As shown in FIGS. 2 and 8-11, the head and neck assembly 202 includes: (i) a head portion 202*a*, and (ii) a neck portion 202*b* coupled to a lower end or extent of said head portion 202*a*.

1. Exterior Head Shape

Figure 2:
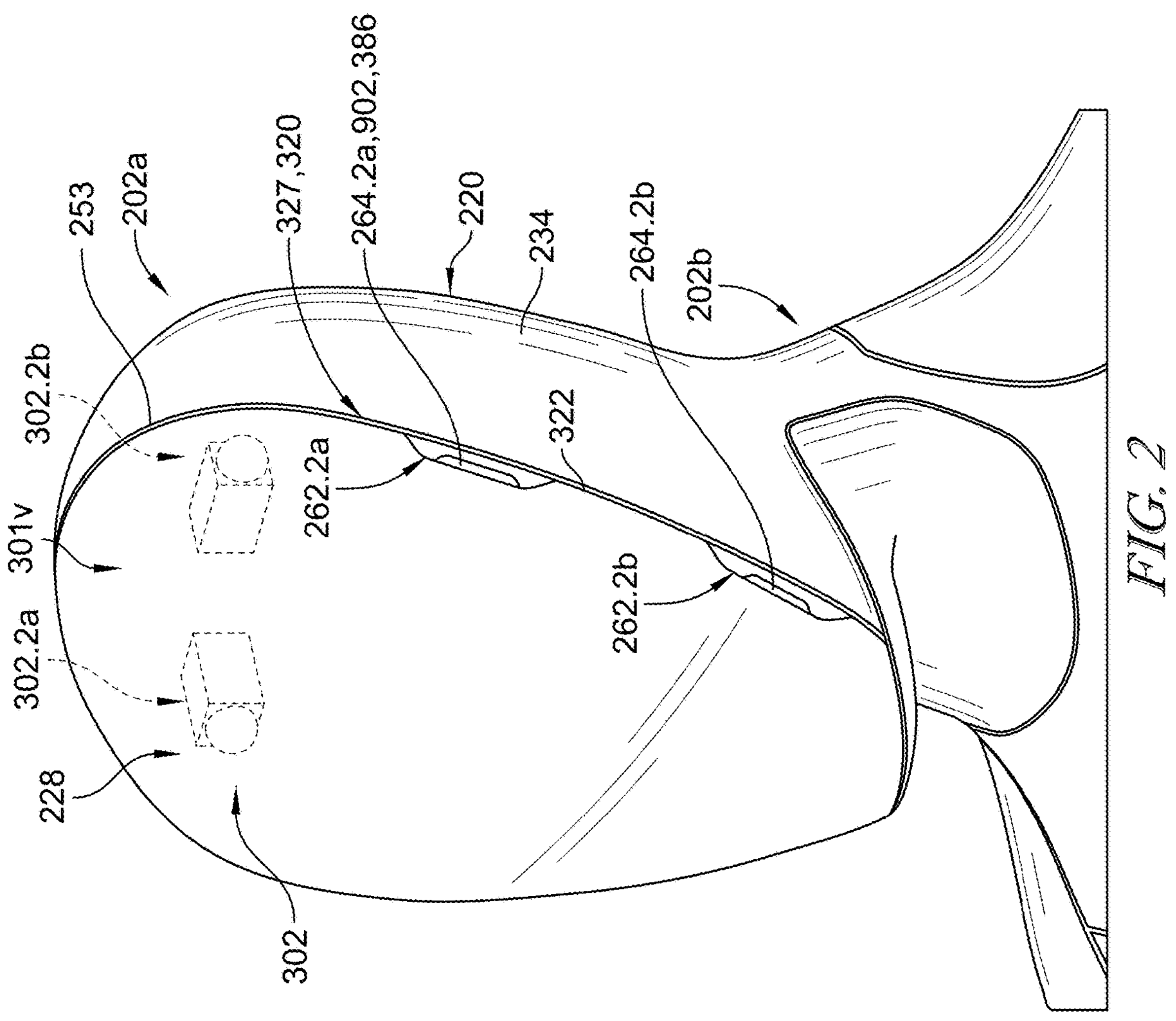
FIG. 2 is a perspective view of the head and neck assembly of the humanoid robot of FIG. 1 showing the head and neck assembly including: (i) a head portion having: (a) a head housing assembly with a frontal shell and a rear shell, (b) a head electronics assembly with an illumination assembly having at least one light emitter configured to emit light between an extent of the frontal shell and rear shell, and (ii) a neck portion having: (a) a neck housing assembly with a cover, and (b) a neck electronics assembly.
Figure 3:
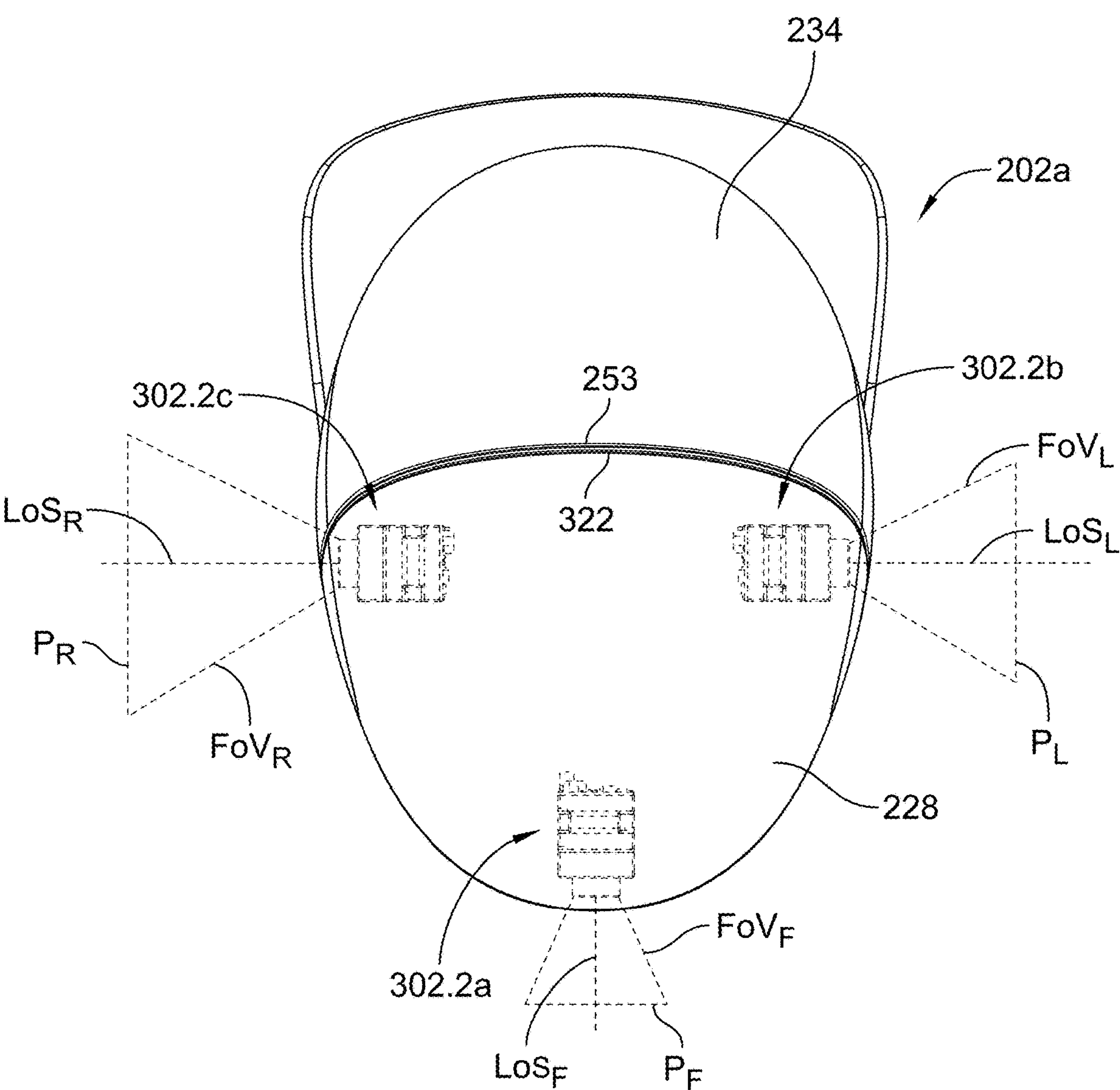
FIG. 3 is a top view of the head and neck assembly of FIG. 1 showing portions of the head electronics assembly including three cameras located within a head space formed by the head housing assembly and each camera oriented to face in a different direction from one another to provide the humanoid robot with a viewing range of at least 180 degrees around the humanoid robot.
Figure 4:
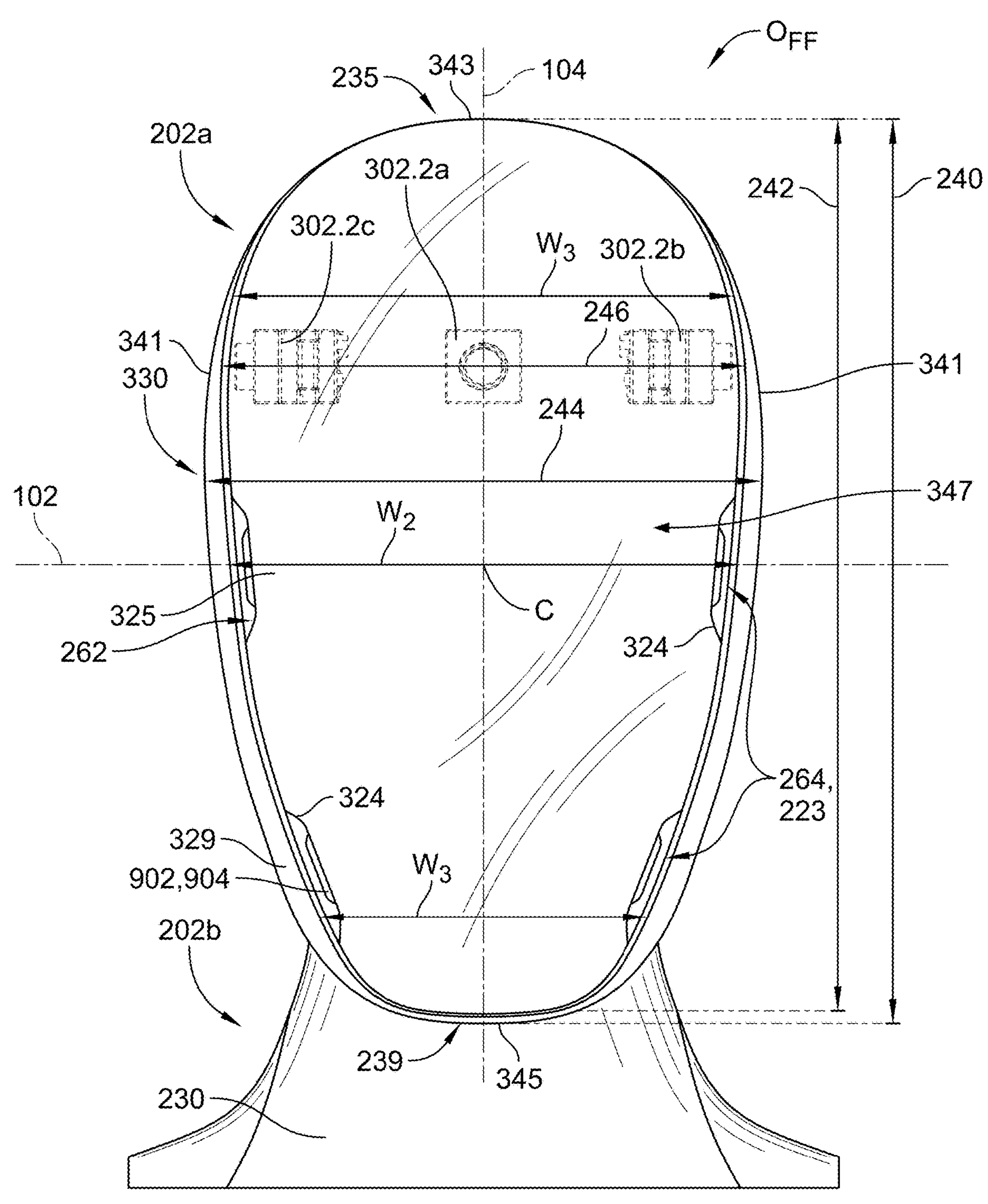
FIG. 4 is a front view of the head and neck assembly of FIG. 3 showing the head housing assembly including the rear shell and a frontal shell coupled to the rear shell, and showing a plurality of light emitters of the illumination assembly located at a junction between the frontal shell and the rear shell and the cameras located behind the frontal shell showing: (i) a first camera facing in a forward direction through the frontal shell, (ii) a second camera facing in a first lateral direction through the frontal shell, and (iii) a third camera facing in an opposed second lateral direction through the frontal shell.

As shown in FIGS. 1-9, the head portion 202*a* of the humanoid robot 100 has one or more exterior surfaces 325, 329 that provide said head portion 202*a* with an overall shape that is similar to a shape of a human head. The overall shape of the head portion 202*a* is defined by a head housing assembly 220 that includes: (i) a rear shell, rear head covering, or rear cover 234, and (ii) a frontal shell, frontal shield, frontal head covering, or frontal cover 228. In some embodiments, the head portion 202*a* is formed with no flat surfaces and is generally egg-shaped when viewed from the front, as shown in FIG. 4, and from the top, as shown in FIG. 3. The head portion 202*a* of the humanoid robot 100 changes constantly in width from top to bottom, wherein the width of the head portion 202*a* increases from a top or scalp end 235 to a temple region 350 where the head portion 202*a* is widest. The temple region 350 generally corresponds to an eye level of a human, or at a location that is about 30-50% of a height 240 of the head portion 202*a* from the top end 235. The width of the head portion 202*a* then decreases from the temple region 350 to a lower or chin end 239. In this way, the head portion 202*a* of the humanoid robot 100 is asymmetrical about a first plane 102 passing through a center or centroid C of the head portion 202*a* and is parallel with the transverse plane, equidistant from the top end 235 and the lower end 239. The head portion 202*a* of the humanoid robot 100 is symmetrical about a second plane 104 perpendicular to the first plane 102 passes through the center or centroid C of the head portion 202*a* and is parallel with the sagittal plane. In other embodiments, the head may be symmetrical about a first plane 102 and asymmetrical about a second plane 104.

As shown in FIG. 4, the rear shell 234 of the head housing assembly 220 has a first maximum height 240, and the frontal shell 228 of the head housing assembly 220 has a second height 242 that is less than the first maximum height 240. The rear shell 234 also has a first maximum width 244, and the frontal shell 228 has a second width 246 that is less than the first maximum width 244. The configuration of the head portion 202*a* of the humanoid robot 100 causes the maximum height 240 to be greater than the maximum width 244. The maximum height 240 and maximum width 244 are both provided by the rear shell 234, while second width 246 (i.e., the maximum width of the frontal shell 228) is located above the maximum width 244 of the head portion 202*a*.

Figure 5A:
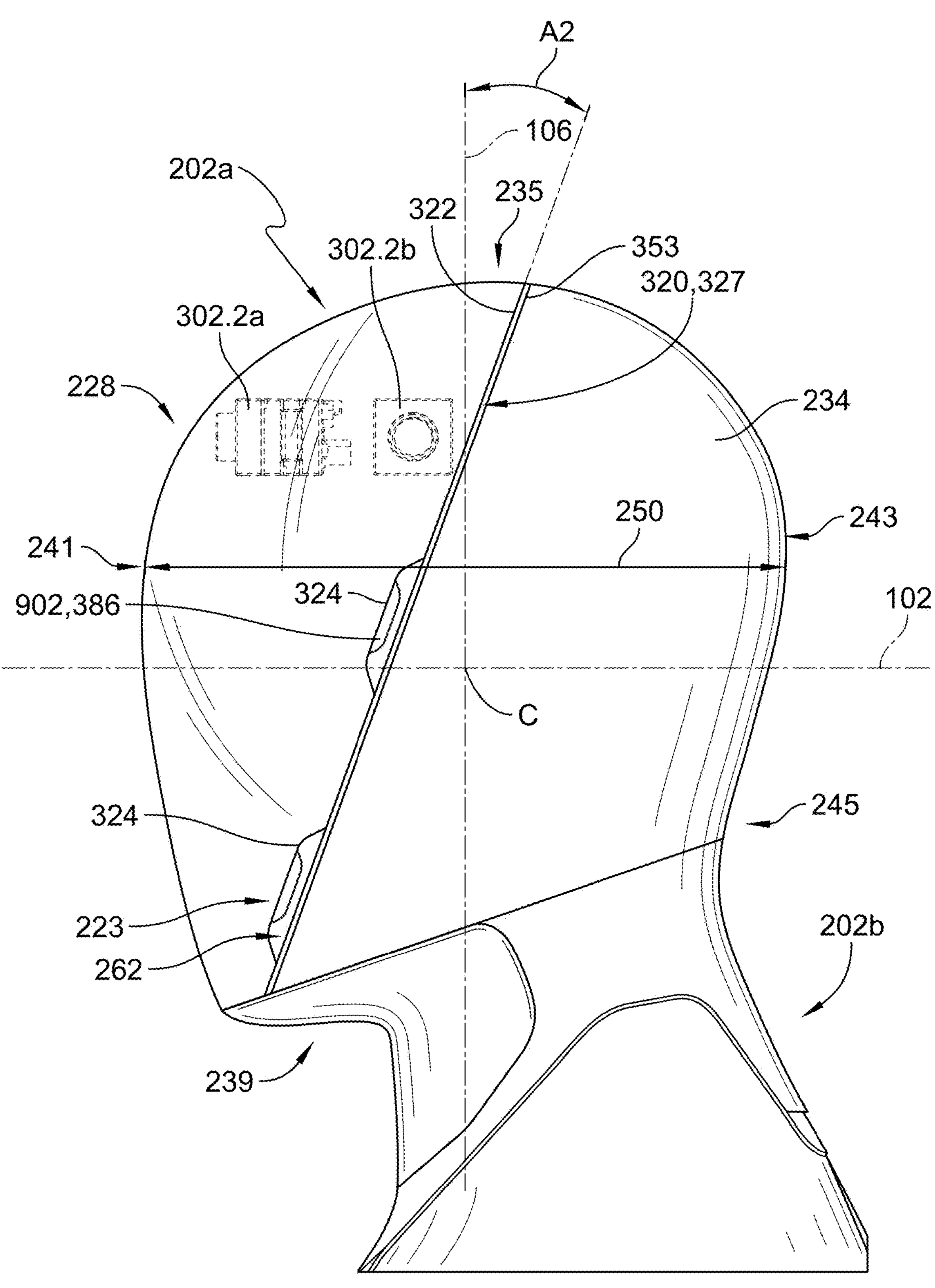
FIG. 5A is a side view of the head and neck assembly of FIG. 3 showing the first and second cameras within the head space and facing directions orthogonal to one another.

As shown in FIG. 5A, a depth of the head portion 202*a* of the humanoid robot 100 is defined by a combination of both the rear shell 234 and the frontal shell 228. The depth includes a maximum depth 250 at a location that is approximately equal to the temple region 350 and that extends between a front or facial region 241 of the head portion 202*a* to an occipital region 359 of the head portion 202*a*. The front end 241 is provided by the frontal shell 228, and a rear end 243 is provided by the rear shell 234. The depth of the head portion 202*a* changes constantly from the top end 235 to the lower end 239. The depth increases from the top end 235 to the maximum depth 250 and then decreases from the maximum depth 250 to the lower end 239. The head portion 202*a* of the humanoid robot 100 is asymmetrical about a third plane 106 extends through the center or centroid C of the head portion 202*a*, is perpendicular to the first plane 102, and is parallel with the coronal plane. The head portion 202*a* of the humanoid robot 100 is also asymmetrical about the first plane 102. In other words, the head portion 202*a* of the humanoid robot 100 is only symmetrical about the second plane 104. The center C is defined as being spaced at equal distances from: (i) the top end 235 and the bottom end 239, (ii) the front end 241 and the rear end 243, and (iii) lateral sides 247, 249 of the head portion 202*a*. In other embodiments, the head portion 202*a* may be symmetrical about the first plane 102 and/or symmetrical about the third plane 106. Stated another way, other embodiments of the head portion 202*a* may be symmetrical about: (i) all planes 102, 104, and 106, (ii) two of the three planes 102, 104, and 106, (iii) one of the three planes 102, 104, and 106, or (v) none of the three planes 102, 104, and 106.

The exterior surfaces 325, 329 of both the rear shell 234 and the frontal shell 228 are designed with a concave shape relative to the interior of the head portion 202*a*. This concave configuration contributes to the overall streamlined and ergonomic form of the robot's head portion 202*a*. In contrast, a nape region 245, located at the rear of the head portion 202*a* below the occipital region 359 and adjacent to the neck portion 202*b*, features a unique convex exterior surface 349. This convex surface 349 is oriented outward relative to the center C of the head portion 202*a*, creating a subtle protrusion that may mimic natural curvature found in human anatomy. Notably, the nape region 245 may stand as the sole area of the head portion 202*a* exhibiting this convex characteristic. This deliberate design choice not only enhances the anthropomorphic appearance of the humanoid robot 100 but also potentially serves functional purposes, such as housing specific components or facilitating the connection between the head portion 202*a* and neck portion 202*b*. In other embodiments, the exterior surfaces 325, 329 of both the rear shell 234 and the frontal shell 228 may: (i) include or incorporate ridges, channels, or textured patterns to enhance heat dissipation, improve structural rigidity, or serve as mounting points for additional sensors or components, (ii) be a modular component bay that is designed to allow for access to internal components, and/or (iii) have larger flat or substantially flat surfaces. Additionally, the nape region 245 and/or other aspects or regions of the rear shell 234 may not be convex and instead, it may be linear, substantially linear, concave, curvilinear, straight, angled, arc-shaped, wave-shaped, parabolic, elliptical, cylindrical, tapered, segmented linear, multilinear, undulating, hyperbolic, nonlinear, lobed, irregularly curved, bowed, U-shaped, V-shaped, crescent-shaped, radial, spiral, rectilinear, polygonal, a triangular curve, a circular arc, an inflection curve, an inclined linear segment, a fractal-like curve, a disjointed linear segment, a hyperbolic arc, an S-shaped curve, a compound linear segment, and/or any combination thereof.

Figure 9:
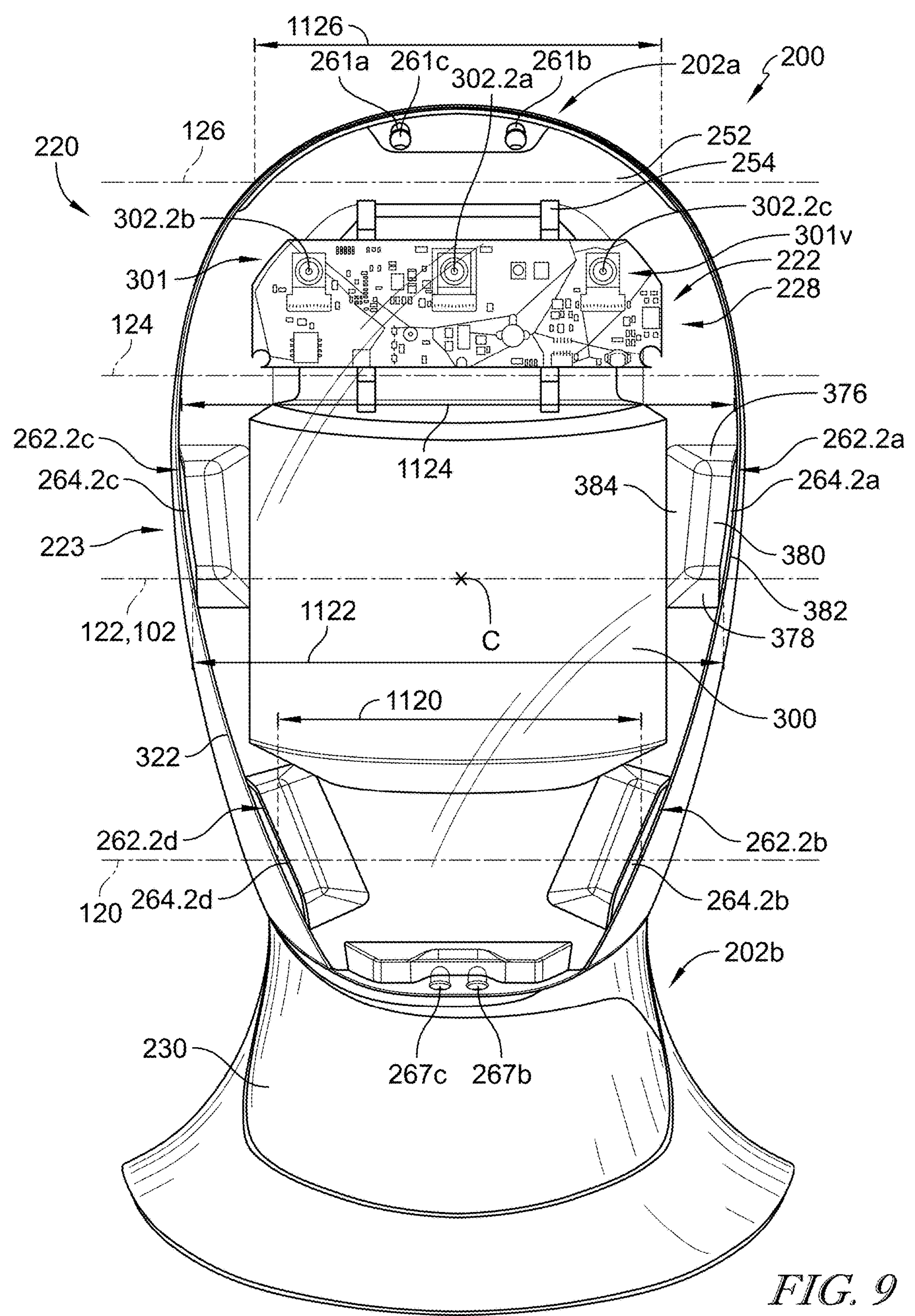
FIG. 9 is a front view of the head and neck assembly of FIG. 8 showing the electronics assembly including: (i) a display located behind the frontal shell, (ii) a plurality of light emitters of the illumination assembly that are positioned to emit light on the lateral sides of the head portion and adjacent to a rear edge of the frontal shell, and (iii) a sensor assembly having at least one of the cameras mounted to an electronics support included in the head housing assembly and located above the display.

When viewed from the front as shown in FIGS. 4 and 9, (i) the lateral sides of the head portion 202*a* may have a first vertical curvature or middle curvature 341 generally extending about the center or centroid C and from a third point 221.2 to a second point 221.4, (ii) the top extent 235 of the head portion 202*a* may have a second vertical curvature or upper curvature 343 generally extending about the center or centroid C and from a second point 221.4 to a first point 221.6, and (iii) the bottom end 239 may have a third vertical curvature 345 or lower curvature generally extending about the center or centroid C and from third point 221.2 to fourth point 221.8. In some aspects, the second curvature 343 may be less than, or have a lesser degree of curvature than, the first curvature 341. The second curvature 343 may be greater than, or have a greater degree of curvature than, the third curvature 345 in some cases. The first curvature or middle curvature 341 may be defined between a third point 22.1 located at an upper extent of the buccal region 352 and the second point 221.4 located at a lower extent of the crown region 270 of the head portion 202*a*. The second curvature 343 may be primarily defined by the crown region 270, wherein said curvature extends from the second point 221.4 located at a lower extent of the crown region 270 and the first or top point 221.6 located at the apex of the housing assembly 220. The third curvature 345 may be defined between the third point 221.2 at the uppermost extent of the buccal region 352 and fourth point 221.8 at the lowermost extent of the buccal region 352.

In some implementations, the head portion 202*a* may have a substantially oval shape when viewed from above, as shown in FIG. 3, and may taper inwardly slightly in the frontal shell 228 toward a facial region 347 provided by the frontal shell 228 in some cases. This design enables the head portion 202*a* to have varying degrees of curvature in different regions to optimize visibility, sensor placement, or aesthetics. For example, the curvature of the frontal shell 228 could be more pronounced in the facial region 347 to accommodate a larger display 300, while tapering to a shallower curve towards a rear edge 322 of the frontal shell 228. In other embodiments, the head portion 202*a* may have angular geometries like hexagonal, octagonal, pentagonal, triangular, square, rectangular, trapezoidal, rhomboidal, parallelogram-shaped, diamond-shaped, oval, elliptical, circular, semicircular, crescent-shaped, star-shaped, heart-shaped, teardrop-shaped, or may have surfaces/edges that are linear, substantially linear, concave, curvilinear, straight, angled, arc-shaped, wave-shaped, parabolic, elliptical, cylindrical, tapered, segmented linear, multilinear, undulating, hyperbolic, nonlinear, lobed, irregularly curved, bowed, U-shaped, V-shaped, crescent-shaped, radial, spiral, rectilinear, polygonal, triangular curve, circular arc, inflection curve, inclined linear, fractal-like curve, disjointed linear, hyperbolic arc, S-shaped, compound linear, and/or any combination thereof.

2. Head Housing Assembly

The head housing assembly 220 of the head and neck assembly 202 is configured to contain and protect other assemblies contained within the head portion 202*a*. As discussed above, the head housing assembly 220 is configured to have a form resembling the general shape of a human head and includes: (i) the frontal shell, frontal shield, frontal head covering, or frontal cover 228, (ii) the rear shell, rear head covering, or rear cover 234, (iii) an intermediate cover, intermediate support, or intermediate member 252, and (iv) an electronics support or frame 254. As discussed below, the intermediate cover 252 and the electronics support 254 may be combined into a single structure. Additionally, in other embodiments, the intermediate cover 252 may be omitted, and the electronics support 254 may be directly coupled to an extent of the rear shell 234. In further embodiments, the electronics support 254 may be omitted, and the intermediate cover 252 may be retained. Also, the rear shell 234 may be omitted or substantially omitted and replaced by a substantially larger frontal shell 228. Moreover, the frontal shell 228 may be omitted or substantially omitted and replaced by a substantially larger rear shell 234. Finally, the intermediate cover 252 and electronics support 254 may be integrally formed as a single component, or said components may be integrally formed with one or more of the frontal shell 228 or the rear shell 234.

The intermediate cover 252 and the rear shell 234 mount to one another and define a first head sub-volume 236 within the head housing assembly 220. The first head sub-volume 236 is configured to contain and protect one or more components used in the operation of the humanoid robot 100, such as electronics, batteries, computing components, etc. The frontal shell 228 provides a front end of the head housing assembly 220 and defines a second sub-volume 238 between the intermediate cover 252 and the frontal shell 228 within the head housing assembly 220. The second sub-volume 238 is separated from the first sub-volume 236 via the intermediate cover 252 and is configured to contain and protect one or more components included in an electronics assembly 222, such as a display 300, light emitters 902, cameras 302, etc. The frontal shell 228 and/or the intermediate cover 252 can be removed from the rest of the head housing assembly 220 to service components within the sub-volumes 236, 238 or to upgrade components in said sub-volumes 236, 238. This modular design allows for individual components to be replaced without requiring replacement of the entire head housing assembly 220.

i. Intermediate Cover

The intermediate cover 252 includes structures that are used to mount components of the electronics assembly 222 to the head portion 202*a*. The intermediate cover 252 is configured to couple with the rear shell 234 and is located between the first and second sub-volumes 236, 238 to separate said first and second sub-volumes 236, 238. In other words, the intermediate cover 252 is designed to split or divide the first sub-volume 236 from the second sub-volume 238. In other embodiments, the intermediate cover 252 may be omitted, and the first and second sub-volumes 236, 238 may be converted into a single sub-volume. Alternatively, the intermediate cover 252 may be combined or integrally formed with other structures disclosed herein (e.g., the electronics support 254, the rear shell 234, and/or the frontal shell 228), whereby the first and second sub-volumes 236, 238 may remain separated or may be combined into a single sub-volume. Further, it should be understood that other mounting structures, dividers, covers, and/or plates may be included within the head portion 202*a* to further sub-divide the housing into additional sub-volumes (e.g., 3-10 sub-volumes).

The intermediate cover 252 has an outer perimeter 256 that is sized to fit within an inset rim 258 of the rear shell 234. In this manner, the outer perimeter 256 is slightly less than an inner perimeter 251 of an extent of the rear shell 234 that is positioned between a ledge 257 and a forward edge 253 of an outer perimeter 259 of the rear shell 234. As such, the outer perimeter 256 of the intermediate cover 252 has a length that is less than the length of the outer perimeter 259 of the rear shell 234. In other embodiments, the outer perimeter 256 of the intermediate cover 252 may not be sized to fit within an inset rim 258 of the rear shell 234. Instead, said outer perimeter 256 of the intermediate cover 252 may be substantially equal to the outer perimeter 259 of the rear shell 234, wherein said intermediate cover 252 may be coupled to, positioned adjacent to, and/or abutting said forward edge 253 of the rear shell 234. In other words, a rear extent of the intermediate cover 252 may be configured to abut the forwardmost surface of said forward edge 253 of the rear shell 234. In other embodiments, the outer perimeter 256 of the intermediate cover 252 may only extend along an extent that is less than substantially all, or even less than a majority (e.g., along only a minority), of the inner perimeter 251 of an extent of the rear shell 234 that is positioned between a ledge 257 and a forward edge 253 of the outer perimeter 259.

The outer perimeter 256 of the intermediate cover 252 may be slightly less than an outer perimeter 260 of the frontal shell 228. As such, the outer perimeter 256 of the intermediate cover 252 may have a length that is less than the length of the outer perimeter 260 of the frontal shell 228. This difference in length between the two perimeters may facilitate ease of assembly by allowing the intermediate cover 252 to be more easily positioned relative to the frontal shell 228 without interference. In some aspects, the difference in perimeter dimensions may account for variations in material expansion, tolerances in manufacturing processes, or specific sealing requirements to ensure a secure fit between the components. In some aspects, the outer perimeter 256 of the intermediate cover 252 may be substantially equal to the outer perimeter 260 of the frontal shell 228. In other embodiments, the outer perimeter 256 of the intermediate cover 252 may extend along only a portion of a rear edge 322 of the frontal shell 228, such as less than 75%, less than 50%, or less than 25% of said rear edge 322. The selective extension of the outer perimeter 256 may be implemented to accommodate specific functional or design considerations, such as providing access to internal components, creating ventilation pathways, or facilitating maintenance procedures. For example, an intermediate cover 252 that extends along only 50% of the rear edge 322 may allow for partial disassembly without the need to remove the entire cover, thus enhancing serviceability. The intermediate cover 252 may also have an outer perimeter 256 that is larger than the outer perimeter 260 of the frontal shell 228 in some implementations. This configuration may be utilized in cases where the intermediate cover 252 is intended to provide additional protective overhang or where the intermediate cover 252 includes integrated features such as gaskets, flanges, or attachment points that extend beyond the frontal shell 228. For instance, an enlarged intermediate cover 252 may help prevent ingress of dust or moisture, especially in environments where the device is exposed to harsh conditions. Additionally, the intermediate cover 252 may have an irregular or non-circular outer perimeter 256 that corresponds to specific internal component layouts or mounting requirements. The shape of the perimeter 256 may be dictated by the need to accommodate uniquely shaped components, such as lights, sensors, wiring harnesses, or power modules. In certain aspects, the intermediate cover 252 may comprise multiple separate sections with individual outer perimeters that collectively form the overall outer perimeter 256. This modular approach may allow for more flexible assembly and disassembly processes, where only certain sections of the intermediate cover 252 need to be removed to access specific internal components. Furthermore, the use of multiple sections may enable customization of the intermediate cover 252 to suit different use cases or to accommodate future upgrades.

Figure 11:
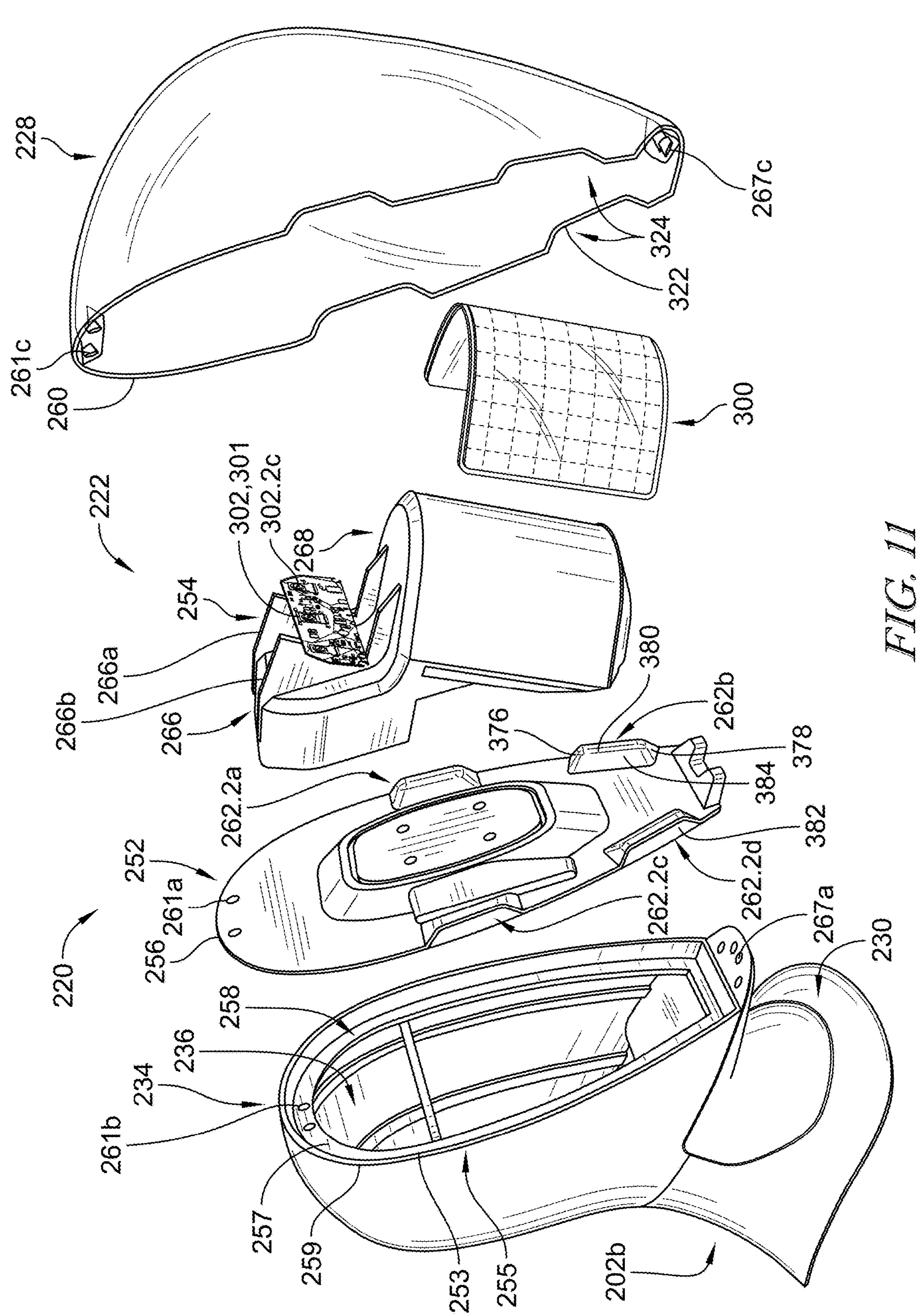
FIG. 11 is an exploded assembly view of the head and neck assembly of FIG. 9.

The intermediate cover 252 further includes a plurality of light emitter housings 262 (and individually, 262.2*a*, 262.2*b*, 262.2*c*, 262.2*d*) spaced around the outer perimeter 256 of the intermediate cover 252. Specifically, each of the light emitter housing 262 may be configured to house a respective light emitting assembly 264 of the illumination assembly 223. As best shown in FIGS. 9 and 11, each light emitter housing 262 has five primary walls that are comprised of: (i) two end walls 376, 378, wherein said end walls 376, 378 are angled (e.g., at an obtuse angle) relative to a frontal surface 252F of the intermediate cover 252, (ii) a top wall 380, (iii) a bottom wall 382, wherein said bottom wall 382 is angled relative to the frontal surface 252F of the intermediate cover 252, and (iv) an interior wall 384, wherein said interior wall 384 is angled (e.g., at an obtuse angle) relative to the frontal surface 252F of the intermediate cover 252. This wall assembly primarily forms a trapezoidal body, comprised of opposed end walls 376, 378, a top wall 380 with an exterior edge and an internal edge 380*a*, and with a sloped interior wall 384 that extends inward and towards the center of the head portion 202*a* from the internal edge 380*a*. The angled configuration of the two end walls 376, 378, the bottom wall 382, and the interior wall 384 is designed to: (i) direct light out of the housing 262, and (ii) ensure that the light emitted radiates through a diffuser or lens 386 in a manner that does not let the light scatter broadly, nor does it overly restrict the scattering of the light.

In other embodiments, the walls 376, 378, 382, 384 may not be angled relative to the frontal surface 252F of the intermediate cover 252, the top wall 380 may be angled relative to the frontal surface 252F of the intermediate cover 252, and/or the angles between the walls and the frontal surface 252F of the intermediate cover 252 may be an acute angle. And in further embodiments, the size and shape of the light emitter housings 262.2*a*, 262.2*b*, 262.2*c*, 262.2*d* may vary. For example, said housing 262 may be in the shape of a cube, cuboid, sphere, cylinder, cone, pyramid, tetrahedron, prism, torus, ellipsoid, octahedron, dodecahedron, icosahedron, hemisphere, triangular prism, pentagonal prism, hexagonal prism, or any combination thereof. The housing 262 may be customized to accommodate different types of light emitting assemblies 264.2*a*-264.2*d* or to achieve particular illumination effects. In some cases, each light emitter housing 262 may incorporate lenses, or reflective or diffusive surfaces to shape the light output. Each housing 262 may also include features to facilitate heat dissipation from the light emitting assemblies 264.2*a*-264.2*d* in certain embodiments. For example, the housings 262.2*a*, 262.2*b*, 262.2*c*, 262.2*d* could include fins, channels, or other structures to increase surface area for heat transfer. Each housing 262 may also be made of thermally conductive materials like aluminum or copper alloys to enhance heat dissipation. Each housing 262 may also incorporate electromagnetic shielding materials or structures to prevent interference between the light emitting assemblies 264.2*a*-264.2*d* and other electronic components in the head portion 202*a*. This could include conductive coatings, metal mesh layers, or other EMI shielding techniques integrated into the housing design. Further, the housings 262 may be omitted, and the illumination assembly 223 may be a part of, or integrally formed with, any aspect of the head housing assembly 220.

ii. Electronics Support

Figure 15:
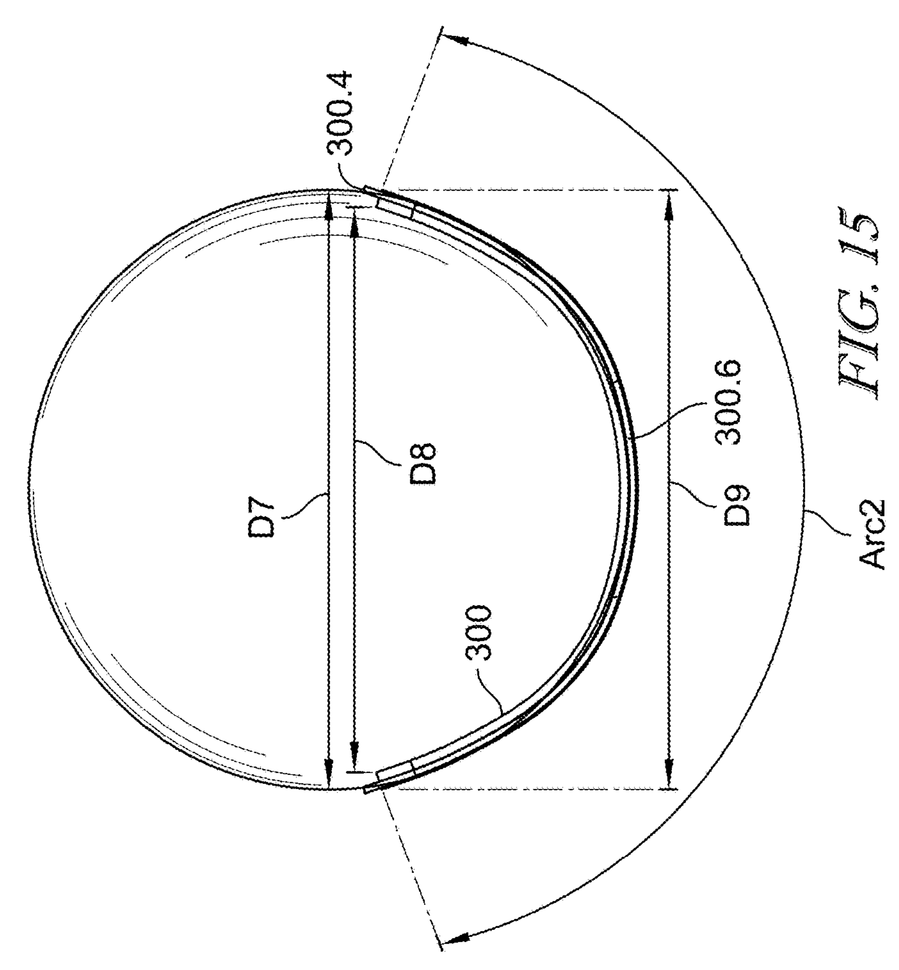
FIG. 15 is a top view of the display included in the head and neck assembly of FIG. 9.
Figure 14:
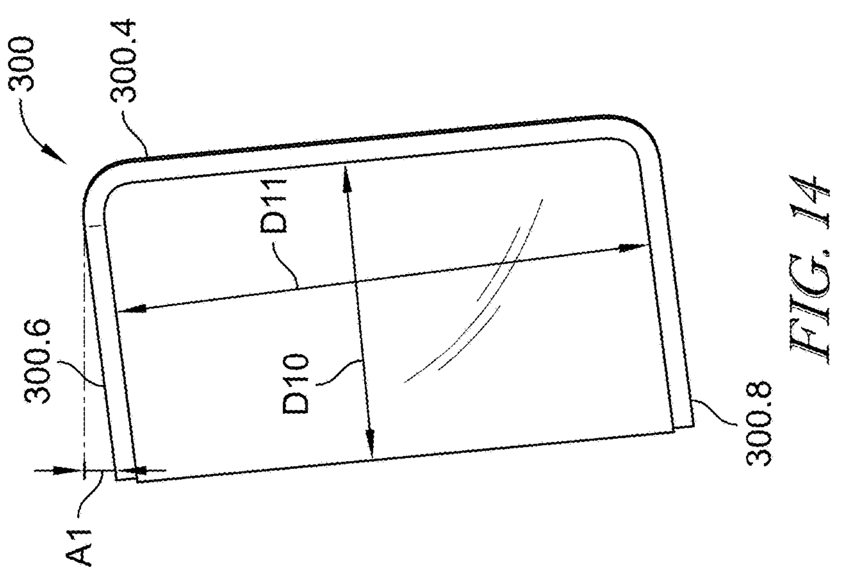
FIG. 14 is a side view of the display included in the head and neck assembly of FIG. 9.

The electronics support 254 is mounted to a generally central area of the intermediate cover 252 and is configured to position a display 300 included in the electronics assembly 222 between the intermediate cover 252 and the frontal shell 228 within the second head sub-volume 238. The electronics support 254 includes a base coupling 266 configured to mount to the intermediate cover 252 and a display coupling 268 configured to mount the display 300 to the electronics support 254. The base coupling 266 is located above and rearward of the display coupling 268. The display coupling 268 positions the display 300 in spaced apart relation to the frontal shell 228, as shown in FIG. 15. As shown in FIGS. 10A, 10B, 26, and 27, the intermediate cover 252 is configured to lie behind the electronics assembly 222 to locate at least a portion of the electronics assembly 222 between the intermediate cover 252 and the frontal shell 228.

The base coupling 266 has a width that is less than the intermediate cover 252 to locate the electronics support 254 within the perimeter 256 of the intermediate cover 252. The base coupling 266 includes left and right support brackets 266*a*, 266*b* configured to support portions of the electronics assembly 222 above the display 300. In the illustrative embodiment shown in FIGS. 9-12, a sensor assembly 301 including three upper cameras 302.4*a*, 302.4*b*, 302.4*c* is mounted to both of the brackets 266*a*, 266*b* and oriented to face in a forward direction of the humanoid robot 100.

iii. Frontal Shell

The frontal shell 228 is configured to cover at least the intermediate cover 252 and the electronics assembly 222, as shown in FIGS. 1-16. The frontal shell 228 forms a forwardmost, exterior surface of the head portion 202*a* and cooperates with the intermediate cover 252 to define the second sub-volume 238 in the head housing assembly 220. The frontal shell 228 may be made from a transparent material so that the display 300 mounted on the electronics support 254 may be viewed therethrough. In other embodiments, the frontal shell 228 may be tinted or opaque. The intermediate cover 252 can be similarly colored (tinted or opaque) so that the frontal shell 228 has a similar appearance to the intermediate cover 252 and so that lights or images displayed on the display 300 are the only items visible or conspicuously displayed through the frontal shell 228. The frontal shell 228 may also include micro-optical elements, such as Fresnel lenses or diffractive optical elements, in specific areas to enhance the performance of internal sensors or create novel lighting effects without additional hardware.

The frontal shell 228 may be coated, etched, or formed with a plurality of layers (e.g., examples of which are disclosed within U.S. Pat. Nos. 8,770,749, 9,134,547, 9,383,594, 9,575,335, and 9,910,297, all of which are incorporated herein by reference in their entirety) in a manner that improves durability, increases sensor accuracy, filters one or more specific wavelengths of light, reduces glare, enhances appearance, reduces fogging, makes the frontal shell 228 easier to clean, or protects it from cleaning products. Examples of such optical coatings include anti-reflection coatings, mirror coatings, hard coatings, anti-static coatings, and anti-fog coatings, some of which are described within U.S. patent application Ser. Nos. 16/896,016, 16/698,775, 16/417,311, 16/126,983, 15/359,317 and, 15/515,966, each of which is incorporated herein by reference. Further, the material composition, shape, number of layers, and composition of said layers of the frontal shell 228 may be different from the material composition, shape, number of layers, and composition of said layers utilized within other parts of the frontal shell 228. In other words, the composition, shape, number of layers, and composition of said layers may vary across the frontal shell 228. It should be understood that this disclosure is not limited to just the information that is disclosed within those applications but instead should include any compositions, shapes, layer numbers, and compositions of layers that are known in the art or are obvious in light of what is known in the art.

The frontal shell 228, or an extent of the frontal shell 228, may have a substantially uniform thickness, which may be equal to or greater than 1 mm, and preferably greater than 2 mm. Additionally, the frontal shell 228 may be optically correct and may not be a corrective lens. As such, the frontal shell 228 has a dioptric power of less than 0.25 diopters, preferably less than 0.12 diopters, and most preferably less than 0.06 diopters. The frontal shell 228 may have a reverse or negative pantoscopic tilt, a forward or positive pantoscopic tilt, or no pantoscopic tilt. Accordingly, the frontal shell 228 may be made from or may include polycarbonate (PC), acrylic (PMMA), trivex, nylon, gorilla glass (aluminosilicate glass), thermoplastic polyurethane (TPU), high-grade glass, cr-39, polyethylene terephthalate (PET), polystyrene, fused silica (quartz glass), borosilicate glass, polyurethane, cellulose acetate, polyvinyl chloride (PVC), cellulose acetate butyrate (CAB), polyvinyl butyral (PVB), optical-grade resin, sapphire glass, polyetherimide (PEI), lexan, thermoset plastics, other anti-scratch coated plastics, or any other similar material that is known in the art.

In the illustrative embodiment shown in FIGS. 1-16, the frontal shell 228 is mounted to the intermediate cover 252 and/or the rear shell 234 along a shield interface 320. This shield interface 320 is located at the relevant outer perimeters, such as the outer perimeter 260 of the frontal shell 228 where it meets the outer perimeter 256 of the intermediate cover 252, and/or the outer perimeter 259 of the rear shell 234. A rear facing edge 322 of the frontal shell 228 is configured to mount with: (i) a frontal edge 253 of the rear shell 234, (ii) a frontal extent of the intermediate cover 252, and/or (iii) both, to form the shield interface 320. As shown in this embodiment, the shield interface 320 is not flat or planar and includes at least a portion that is to be illuminated by 223. Instead, the shield interface 320 is irregular due to the fact that the rear edge 322 of the frontal shell 228 is formed to include a plurality of recesses 324. Each recess 324 is sized to receive a respective light emitter housing 262 formed in the intermediate cover 252 that houses a respective light emitting assembly 264. In some embodiments, the frontal shell 228 itself can include the light emitter housings 262.2*a*, 262.2*b*, 262.2*c*, 262.2*d*, although this may not be desirable as the frontal shell 228 is the component that is most likely to be removed from the head housing assembly 220 to service the head portion 202*a* and the electronics assembly 222.

Figure 10A:
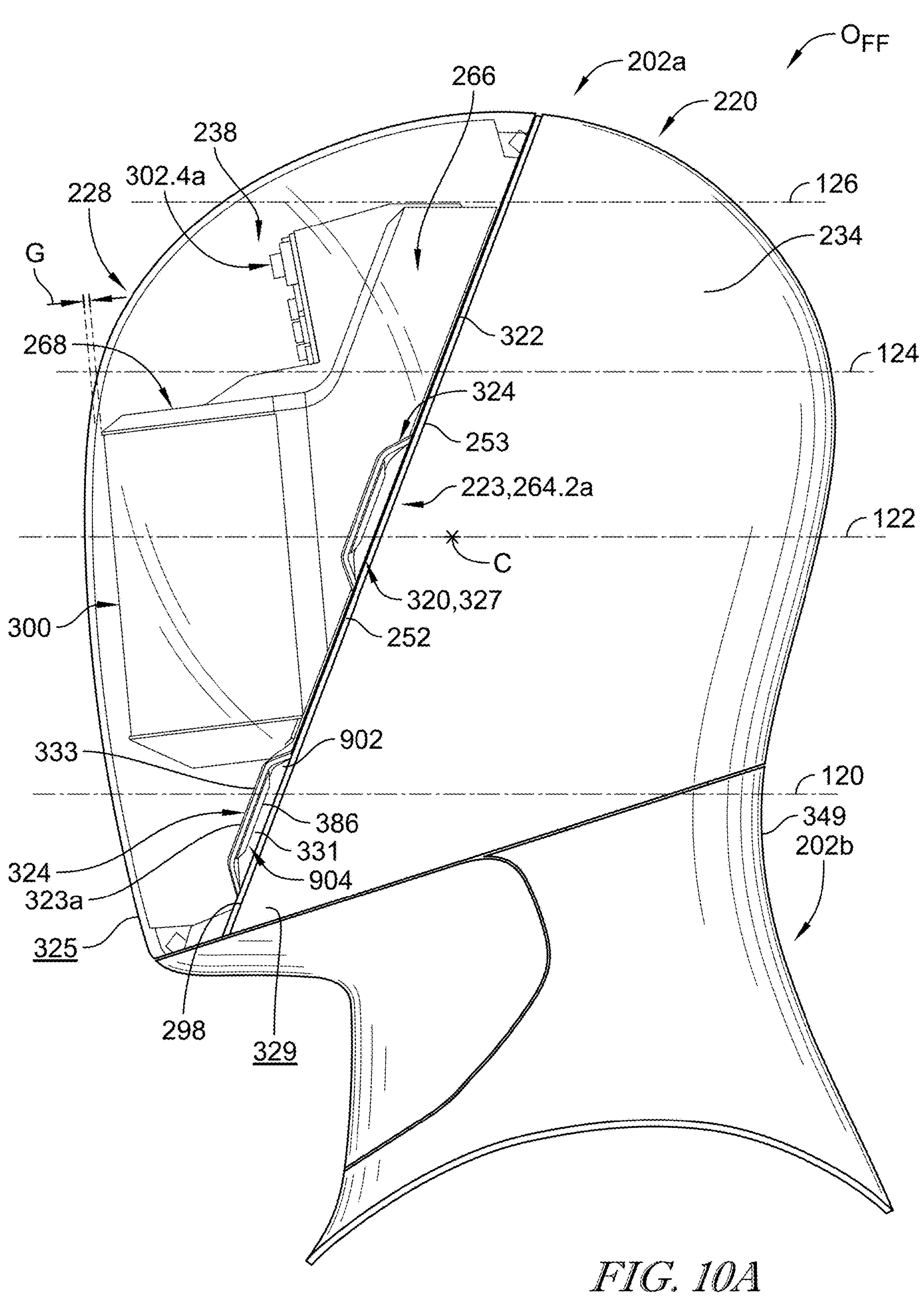
FIG. 10A is a side view of the head and neck assembly of FIG. 9.

Except for the recesses 324, the rear facing edge 322 of the frontal shell 228 is substantially planar along the shield interface 320. The shield interface 320 between the intermediate cover 252 and the frontal shell 228, and the rear-facing edge 322, extends at an angle A2 to the third plane 106, as shown in FIGS. 5A and 10A. In the illustrative embodiment, this angle A2 is within a range of about 15 degrees to about 50 degrees, preferably between 20 and 40 degrees, most preferably between 25 and 35 degrees, and may be approximately 30 degrees. This angular relationship provides the frontal shell 228 with a larger depth at a top end thereof to increase a volume of the second sub-volume 238 and provide more room for components of the electronics assembly 222. An upper end of the frontal shell 228 near an upper extent of the head portion 202*a* is located rearward of the third plane 106, while a lower end of the frontal shell 228 near a chin region 355 is located forward of the third plane 106, as shown in FIG. 5A. There are no recesses formed in the frontal shell 228 in an orbital region 368, a nasal region 357, an oral region 366, or a frontal region 362. The frontal shell 228 extends upward from an extent of the rear shell 234 that is positioned in the chin region 355, over a majority of the facial region 347, and into or beyond a frontal edge of a parietal region 360. The frontal shell 228 has an outer surface occupying at least the orbital region 368 and the nasal region 357. The orbital region 368 of the frontal shell 228 is not recessed in comparison to the nasal region 357 of the frontal shell 228.

The depth change of the frontal shell 228 positions a first light emitting assembly 264.2*a* and a third light emitting assembly 264.2*c* above and rearward of a second light emitting assembly 264.2*b* and a fourth light emitting assembly 264.2*d*. Such an arrangement provides a greater viewing area for users to observe at least one light emitting assembly 264 when positioned at different orientations relative to the humanoid robot 100. In other embodiments, the first and third light emitting assemblies 264.2*a*, 264.2*c* may not be positioned rearward of the second and/or fourth light emitting assemblies 264.2*b*, 264.2*d*. Instead, second and/or fourth light emitting assemblies 264.2*b*, 264.2*d* may be positioned in the same vertical plane, and/or may be positioned rearward of the first and third light emitting assemblies 264.2*a*, 264.2*c*. The frontal shell 228 may: (i) wrap from the front of the head portion 202*a* into the side regions of the head portion 202*a*, (ii) extend into the chin area or cover the entire chin area, and (iii) have a non-uniform rear edge 322, which may be formed by a plurality of recesses 324. The plurality of recesses 324 may be configured to receive an extent of the light emitter housings 262.2*a*, 262.2*b*, 262.2*c*, 262.2*d*. In some aspects, the frontal shell 228 may not extend to the crown region 270 of the head portion 202*a* and/or may not extend rearward past a location where a human's ears would typically be located. The frontal shell 228 may occupy between 50% and 25% of the surface area of the head portion 202*a* and may be curved in at least two directions (e.g., vertically and horizontally). In some embodiments, the frontal shell 228 and the display 300 may be integrated into a single component or may be formed from a plurality of components. The frontal shell 228 may have a different curvature than the display 300. In other embodiments, the frontal shell 228 may extend to the crown region 270 or past the typical ear locations. The frontal shell 228 may occupy more or less of the head portion 202*a* in some cases. The curvature and integration of the frontal shell 228 and display 300 may vary in different implementations.

As shown in FIGS. 9 and 10A, the frontal shell 228, in a forward facing orientation $O_{FF}$, may include, at least: (i) a substantially horizontal first arc length 1120 or chin arc length that extends from a first edge extent 323*a* of the rear edge 322 to a second edge extent 323*b* of the rear edge 322 at a first location or horizontal plane 120, (ii) a substantially horizontal second arc length 1122 a display arc length hat extends from a first edge extent 323*a* of the rear edge 322 to a second edge extent 323*b* of the rear edge 322 at a second location or horizontal plane 122, (iii) a substantially horizontal third arc length 1124 forehead arc length, or above the display arc length that extends from a first edge extent 323*a* of the rear edge 322 to a second edge extent 323*b* of the rear edge 322 at a third location or horizontal plane 124, and (iv) a substantially horizontal fourth arc length 1126 crown arc length that extends from a first edge extent 323*a* of the rear edge 322 to a second edge extent 323*b* of the rear edge 322 at a fourth location or horizontal plane 126. Although the arc lengths are shown as straight lines in the front view of FIG. 9, it should be understood that these arc lengths follow the curvature of the frontal shell 228 along each respective horizontal plane from the rear edge 322 on one side of the frontal shell 228 to the rear edge 322 on the other side.

The frontal shell 228 is concave relative to the display 300 (i.e., it curves around the display) at each location 120, 122, 124, 126 such that the frontal shell 228 extends at least partially about the display 300. The first arc length 1120 occurs below the display 300. The second arc length 1122 occurs at approximately the center C of the head portion 202*a*, is aligned with or intersects the display 300, and is greater than the first arc length 1120. The third arc length 1124 occurs above the display 300, and is greater than the second arc length 1122. The fourth arc length 1126 occurs above the third arc length 1124 and the display 300, and is less than the second and third arc lengths 1122, 1124.

As shown in FIG. 4, the frontal shell 228 has, at least: (i) a first width $W_1$ or lower frontal shell width that extends from a first edge extent 323*a* of the rear edge 322 to a second edge extent 323*b* of the rear edge 322 at a first location below the first or horizontal plane 120, a second width $W_2$ or frontal shell centroid width that extends from a first edge extent 323*a* of the rear edge 322 to a second edge extent 323*b* of the rear edge 322 at a second location or at the horizontal plane 102, and (iii) a third width $W_3$ or upper frontal shell width that extends from a first edge extent 323*a* of the rear edge 322 to a second edge extent 323*b* of the rear edge 322 at a third location above the first plane 102. The first width $W_1$ is less than both the second and third widths $W_2$, $W_3$, the second width $W_2$ is greater than both the first $W_1$ and third widths $W_3$, and the third width $W_3$ is greater than the first width $W_1$, and less than the second width $W_2$. The first width $W_1$ or lower frontal shell width is positioned below a display width WD, and wherein the display width Wp is greater than the frontal shell width $W_1$. The frontal shell centroid width $W_2$ and the upper frontal shell width $W_3$ is greater than the display width WD.

In some embodiments, the frontal shell 228 may incorporate a variable transparency feature, allowing it to switch between transparent, translucent, and opaque states. This could be achieved through the use of electrochromic materials or liquid crystal layers embedded within the shell structure. Such a feature may enable dynamic control over the visibility of internal components and displays, enhancing both functionality and aesthetics. The frontal shell 228 may also incorporate embedded flexible electronic circuits, displays, and/or have conductive pathways. These could serve multiple purposes, such as acting as antennas for improved wireless communication, providing touch-sensitive areas for user interaction, or enabling localized heating to prevent fogging in challenging environments. The frontal shell 228 may utilize an advanced multi-layer coating system, combining various functional properties. For example, a hydrophobic outer layer for water repellency, a middle layer with self-healing properties to repair minor scratches, and an inner layer with electromagnetic shielding capabilities to protect sensitive electronics from interference. Further, the frontal shell 228 may include integrated micro-lens arrays or diffractive optical elements. These could be used to enhance the performance of internal sensors, create specific lighting effects, or even project information onto nearby surfaces without the need for additional hardware. In some aspects, while the head portion 202*a* has a modular design, the frontal shell 228 could also have a modular design to allow for easy replacement or customization of specific sections. This could include interchangeable panels with different optical properties, sensor arrays, or display technologies, enabling rapid adaptation to various operational requirements or upgrades.

iv. Rear Shell

Figures 5B, 6:
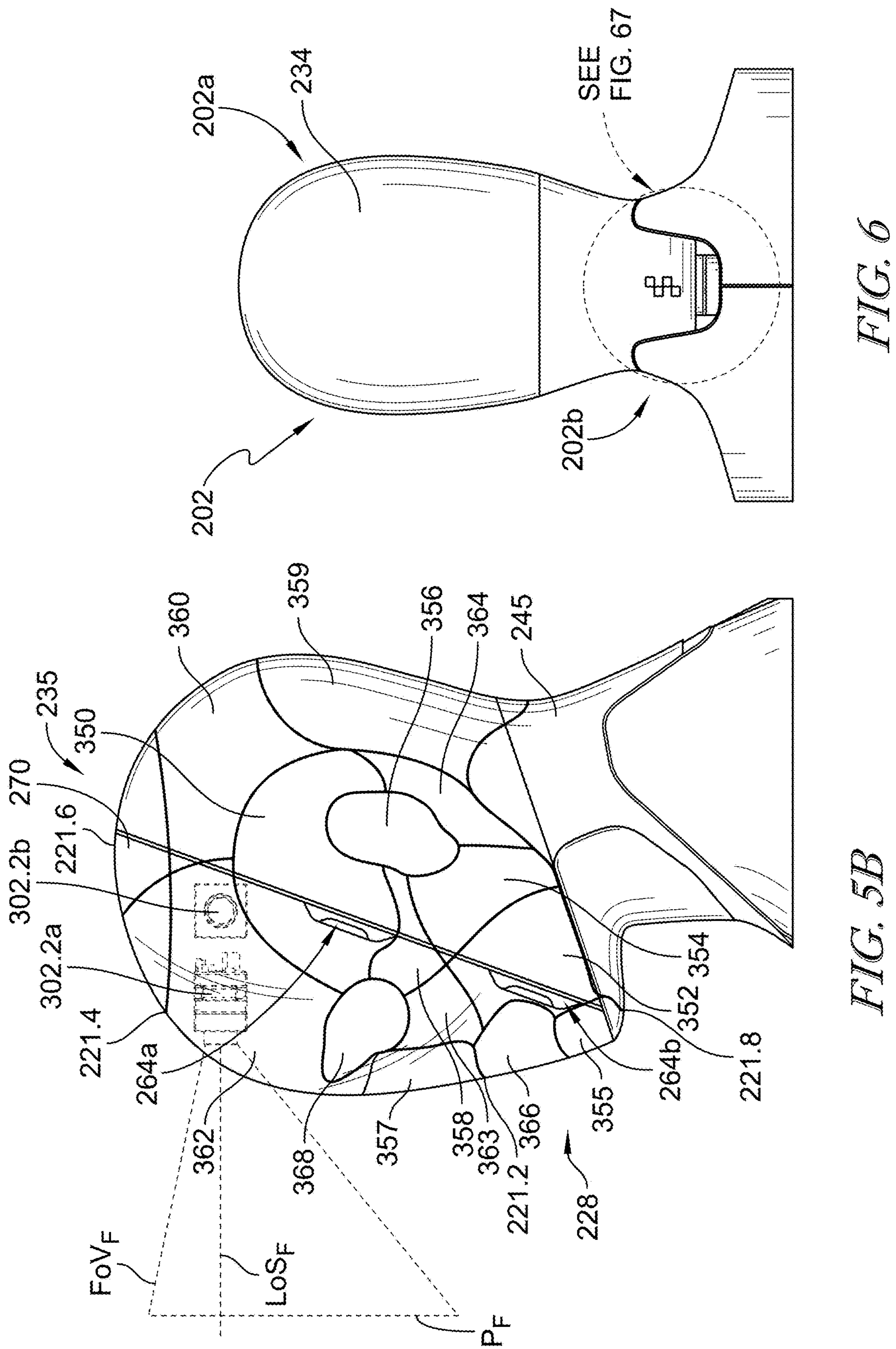
FIG. 5B is a side view of the head and neck assembly of FIG. 3, showing various anatomical regions of the head portion.
FIG. 6 is a rear view of the head and neck assembly of FIG. 3.
Figure 10B:
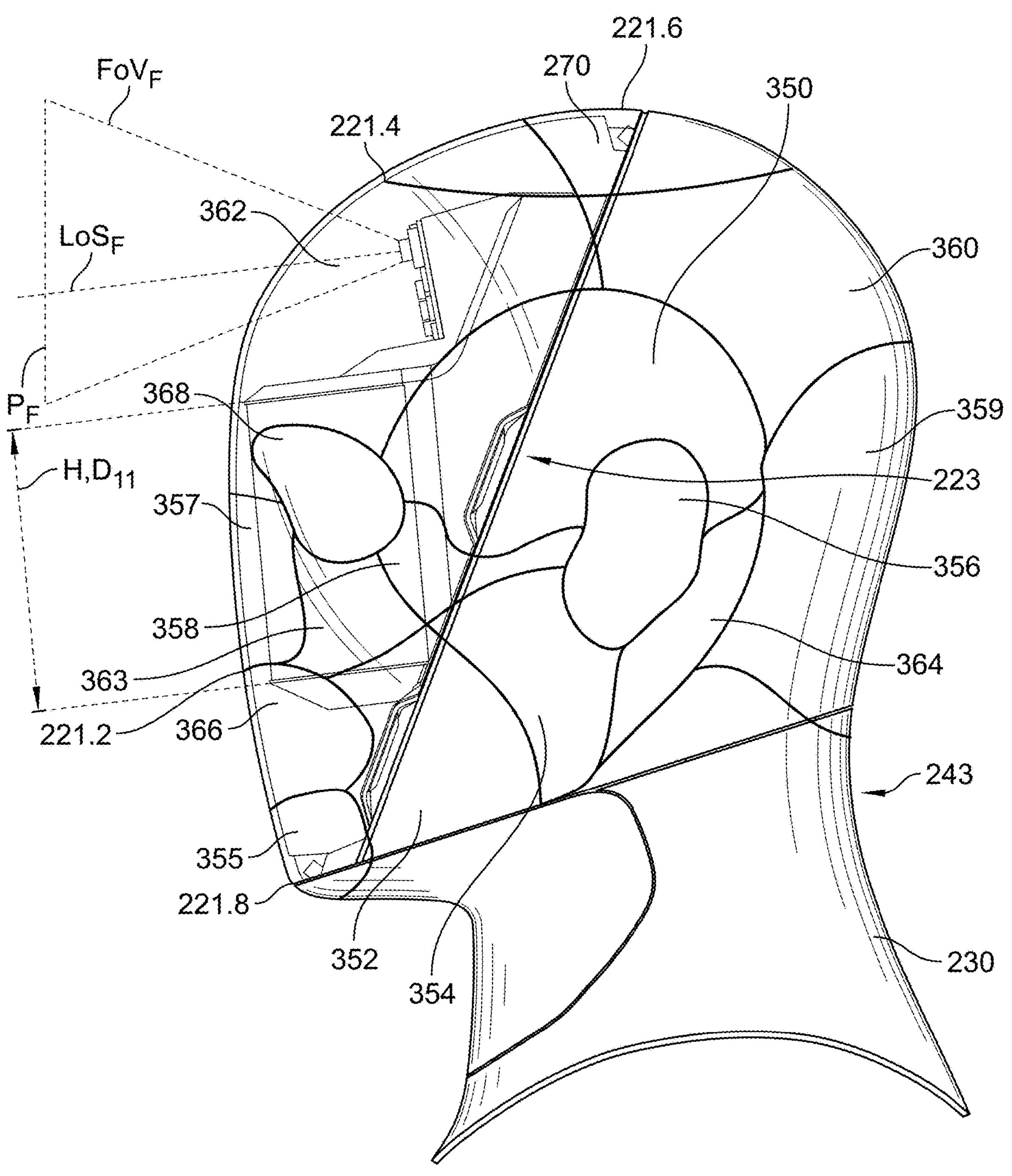
FIG. 10B is a side view of the head and neck assembly of FIG. 9 showing various anatomical regions of the head portion and a field of view of a camera included in the sensor assembly.

The rear shell 234 is shaped to resemble the curvature of a rear and sides of a human head, or at least portions of a parietal region 360, an occipital region 359, a temporal region 350, an auricular region 356, a zygomatic region 358, a mastoid region 364, a buccal region 352, and a parotid region 354. As shown in FIGS. 5B and 10B, the interface region 320 between the rear shell 234 and the frontal shell 228 passes through the buccal region 352, the parotid region 354, the zygomatic region 358, the temporal region 350, the parietal region 360, and the crown region 270. In other words, the rear shell 234 begins at the parotid region 354, the zygomatic region 358, the temporal region 350, the parietal region 360, and the crown region 270 and forms all portions of the head portion 202*a* rearward thereof. Likewise, the frontal shell 228 begins at the parotid region 354, the zygomatic region 358, the temporal region 350, the parietal region 360, and the crown region 270 and forms all portions of the head portion 202*a* forward thereof, except for a chin region 355 which is included in the rear shell 234 in some embodiments. Also, it should be understood that the frontal shell 228 may only be positioned forward of the auricular region 356.

The rear shell 234 may be configured to cover a rear portion of the electronics assembly 222 and to form a rear end of the head portion 202*a*. The rear shell 234 may extend downward from a top central position and forward at an angle substantially similar to the rear facing edge 322 of the frontal shell 228. The rear shell 234 may include a forward facing edge 253 configured to mate with the rear facing edge 322 of the frontal shell 228 and/or with the intermediate cover 252. As shown in FIG. 11 the rear shell 234 may have an outer rim 255 and a ledge 257 projecting inwardly from the outer rim 255 and located in the first sub-volume 236. The rim 255 may have a slightly larger outer perimeter 259 than the outer perimeter 256 of the intermediate cover 252 to allow the intermediate cover 252 to fit within said rim 255 and engage the ledge 257.

The ledge 257 and the intermediate cover 252 may have corresponding attachment holes 261*a*, 261*b* that receive a fastener to mount the intermediate cover 252 to the rear shell 234. Apertures 261*c* formed in the frontal shell 228 may also receive a fastener to mount the frontal shell 228 to both the intermediate cover 252 and the rear shell 234. Additionally, the interface region between the rear shell 234 and the frontal shell 228 may include an interlocking mechanism, such as a tongue-and-groove design or a series of small tabs and slots, to provide a more secure connection in addition to or instead of fasteners. This could improve the overall structural integrity of the head assembly 220. The interface region may also incorporate other types of fasteners or connection mechanisms, such as snap-fit connections, magnetic attachments, bayonet couplers, threaded couplers, friction-fit couplers, quick-release couplers, ball-and-socket joints, twist-lock couplers, dovetail joints, latch mechanisms, spring-loaded couplers, sliding locks, compression couplings, cam-lock couplers, clamp-on attachments, pin-and-hole connections, key-and-slot joints, or any combination thereof. In some aspects, the interface region may utilize multiple types of fasteners or connection mechanisms in different areas to optimize assembly, disassembly, and structural support.

The rear shell 234 may include a chin projection region 269 that extends forward from the rim 255 and defines a lower end of the rear shell 234. The intermediate cover 252 may include a lower mount 265 that engages and rests on the chin projection region 269. In some aspects, the chin projection region 269 and the lower mount 265 each include corresponding attachment holes 267*a*, 267*b* that receive a fastener to secure the intermediate cover 252 to the rear shell 234 at a lower end thereof. Apertures 267*c* formed in the frontal shell 228 may also receive a fastener to mount the frontal shell 228 to both the intermediate cover 252 and the rear shell 234. Alternatively, the apertures 267*c* and fasteners may be replaced using snap-fit connections, magnetic attachments, interlocking geometries, bayonet couplers, threaded couplers, friction-fit couplers, quick-release couplers, ball-and-socket joints, twist-lock couplers, dovetail joints, latch mechanisms, spring-loaded couplers, sliding locks, compression couplings, cam-lock couplers, clamp-on attachments, pin-and-hole connections, key-and-slot joints, other similar couplers, or any other known couplers. In other embodiments, the chin projection region 269 could be designed as a separate, detachable component that can be swapped out for different shapes or sizes.

The rear shell 234 may incorporate a multi-layered structure with varying properties to optimize functionality and performance. The outer layer can provide protection against impacts and environmental exposure, while inner layers may help absorb shocks and vibrations to safeguard internal components. The composition of the rear shell 234 may vary across different regions to balance structural support and flexibility, accommodating movement or internal component adjustments. Integrated cable management channels or conduits can improve the routing of wires and connectors, enhancing both aesthetics and ease of maintenance. These channels may include secure covers to prevent accidental damage. The rear shell 234 may also feature modular sections that are removable or adjustable for customization and upgrades, such as access panels for frequently serviced components. Magnetic attachments can be used to secure external accessories, enabling quick reconfiguration without mechanical fasteners. Additionally, interlocking geometries along edges or connection points can improve assembly precision and distribute mechanical loads more evenly, enhancing the structural integrity of the device. Advanced designs may embed sensors or connectors within the shell 234 to detect impacts, provide real-time feedback on structural integrity, or facilitate internal power and data transfer without visible wiring, contributing to a cleaner, streamlined design.

The rear shell 234 may be formed from or include silicone elastomers, thermoplastic polyurethane (TPU), shape-memory polymers (SMPS), polydimethylsiloxane (PDMS), polyurethane, liquid silicone rubber (LSR), urethane rubber, a vinyl (PVC) skin, soft thermoplastic elastomers (TPE), elastomeric alloys, acrylonitrile butadiene styrene (ABS) blends, high-density polyethylene (HDPE) blends, conductive polymers, carbon nanotube-infused elastomers, magnetic shape-memory alloys, electroactive polymers (EAPS), styrene-butadiene rubber (SBR), thermoplastic vulcanizates (TPV), polyurea elastomers, medical-grade synthetic skin materials, thermoplastic olefins (TPO), fluoroelastomers, chloroprene rubber, ethylene propylene diene monomer (EPDM) rubber, polyacrylamide hydrogels, polycaprolactone (PCL), photocurable resins, elastomeric composites, phosphorescent elastomers, thermochromic materials, electrostrictive polymers, piezoelectric polymers, superelastic alloys, microcellular foams, hyperelastic materials, viscoelastic gels, nanocomposite elastomers, fabrics, metal, other similar plastics or polymers, any combination of the above, and/or any other similar material known in the art.

The rear shell 234 may be fabricated using various manufacturing techniques, each offering unique benefits based on design requirements, material properties, and production efficiency. These methods include injection molding, dip molding, casting, additive manufacturing methods (e.g., stereolithography, fused deposition modeling (FDM), and selective laser sintering (SLS)), spray coating, lamination or layering, electrospinning, sculpting or precision machining, thermoforming, or other similar manufacturing methods or combinations thereof. In one exemplary hybrid approach, the primary structure of the rear shell 234 could be 3D printed using a high-strength polymer, such as nylon or polycarbonate, to achieve both durability and complex geometries. Overmolding certain regions with softer elastomeric materials, like thermoplastic elastomers (TPE) or silicone rubber, can enhance flexibility, shock absorption, and user comfort in areas subject to impact or repeated stress. This combination ensures a balance between rigidity and pliability, improving both mechanical performance and ergonomic benefits. Furthermore, additional post-processing steps can be incorporated to tailor the rear shell 234 for specific applications. In some cases, conductive coatings may be applied to enable electromagnetic shielding or to support smart functionalities, such as integrating sensors or antennas directly into the shell's surface. Additionally, certain regions of the rear shell 234, particularly around joints or flex points, could incorporate shape-memory alloys or polymers. These materials could allow for controlled deformation and return to an original shape, accommodating movement while maintaining overall structural integrity. Further, the rear shell 234 could feature integrated cable management channels or conduits, integrated cooling channels or heat sinks, or separate, detachable components.

3. Electronics Assembly

The electronics assembly 222 contained in the head portion 202*a* may include one or more of: (i) a sensor assembly 301, (ii) a display 300, (iii) an illumination assembly 223 that includes at least one, and preferably a plurality of, light emitting assemblies 264.2*a*-264.2*d*, (iv) other electronics (e.g., an Inertial Measurement Unit (IMU), an RFID reader, location sensors (e.g., Global Positioning System ("GPS"), GLONASS, Galileo, QZSS, and/or iBeacon), etc.), and/or (v) Printed Circuit Boards (PCBs) for connecting the electronics. As shown in at least FIGS. 2-4 and 8-12, at least some components of the electronics assembly 222 may be mounted to the electronics support 254 and located above the display 300, or to any other structure of the head and neck assembly 202. Mounting the electronics assembly 222 to the electronics support 254 above the display 300 and within the second sub-volume 238 may arrange the individual items in a space-saving manner and leave other areas of the head housing assembly 220 open for storage of other components that do not need direct access to areas outside of the humanoid robot 100, such as sensors, cameras, displays, etc. As noted above, the head housing assembly 220 is configured to enclose the electronics assembly 222 without interfering with the transmission or reception of signals. For example, the head housing assembly 220 does not obscure the line of sight or field of view of the sensors.

i. Display

As best shown in FIGS. 8-13, the display 300 of the electronics assembly 222 may be mounted to the electronics support 254 and positioned behind the frontal shell 228. The display 300 may be operatively connected to at least one processor to generate and display status messages and other information on said display 300. For example, the display 300 may display information: (i) related to the robot's state (e.g., working, error, moving, charging, or idle), (ii) obtained from sensors contained within the head portion 202*a*, including but not limited to cameras (e.g., 302, 303), proximity sensors, temperature sensors, and accelerometers, or (iii) received from other processors in communication with the display 300 (e.g., other internal processors housed within the humanoid robot 100 or external information transmitted to and received by the humanoid robot 100). The display 300 may also be configured to display alerts or warnings, such as low battery notifications, obstacle detection alerts, or maintenance reminders. The information displayed on the display 300 may be presented in various formats, including text-based messages, graphical icons, animations, and dynamic visual indicators. These visual indicators may take the form of color-coded blocks, well-known shapes, logos, or other moving items (e.g., thought bubbles, arrows indicating direction of movement, or animated progress bars). The display 300 may further support interactive features, allowing users to provide inputs via touch or proximity gestures, depending on the implementation. However, the information displayed on the display 300 may be restricted from showing human facial features (e.g., eyes, mouth, nose) to avoid any anthropomorphic representations that might be confusing or misleading to users. Instead, the display 300 is designed to convey functional and operational information in a clear and efficient manner that enhances user interaction without mimicking human expressions.

As shown in FIGS. 7A-15 the display 300 may have a substantially rectangular display surface that has a convex curvature conforming to the curvature of the frontal shell 228 of the head housing assembly 220. The curvature of the display 300 provides an aesthetically pleasing integration with the overall design of the device and enhances the seamless appearance of the frontal surface. The display 300 may be slightly tilted downward to improve visibility and user interaction. For example, the display 300 may be tilted from a horizontal plane at an angle of about 5.7 degrees to about 8.6 degrees, or about 6.4 degrees to about 7.9 degrees. This tilt configuration improves ergonomic usability by aligning the display 300 with a typical user's line of sight, reducing the need for head or neck adjustment during prolonged use. The downward tilt also helps to mitigate unwanted glare and reflections from ambient light sources, thereby enhancing the clarity and readability of the display content under various lighting conditions. As best shown in FIGS. 15A, a gap is formed between the outer surface of the display 300 and the inner surface of the frontal shell 228. The display 300 also has a first or left substantially vertical edge 300.2 and a second or right substantially vertical edge 300.4 when the head is in the forward facing orientation $O_{FF}$, and wherein said display 300 also includes a display width WD that extends between the first or left substantially vertical edge 300.2 and the second or right substantially vertical edge 300.4. The display width WD is greater than the first width $W_1$ or lower frontal shell width, but is less than the frontal shell centroid width $W_2$ and the upper frontal shell width $W_3$. The display 300 also includes an upper edge 300.6 and a lower edge 300.8, wherein the display 300 has a constant: (i) height H between the upper edge 300.6 and the lower edge 300.8 across the display width WD, and (ii) a constant arc length between the upper edge 300.6 and the lower edge 300.8.

The display 300 may incorporate any known technology or feature to achieve optimal performance and energy efficiency, including but not limited to: liquid crystal display (LCD), light-emitting diode (LED), organic light-emitting diode (OLED), laser phosphor display (LPD), interferometric modulator display (IMOD), quantum dot light-emitting diode (QDLED), micro-light-emitting diode (mLED), active-matrix organic light-emitting diode (AMOLED), surface-conduction electron-emitter display (SED), field emission display (FED), plasma display, electronic paper or electrophoretic display (EPD), MicroLED, quantum dot display, LED-backlit liquid crystal display (LCD), white liquid crystal display (WLCD), organic liquid crystal display (OLCD), transparent OLED, passive-matrix OLED (PMOLED), capacitive touch display, resistive touch display, e-ink display, other bistable display technologies, monochrome displays, color displays, or any combination thereof. The display 300 may also include advanced features such as high dynamic range (HDR), anti-reflective coatings, wide color gamut (WCG), variable refresh rates, adaptive brightness control, and touch sensitivity enhancements. The selection of display technology can be tailored to specific use cases, such as low-power consumption for battery-operated devices or high-resolution imaging for applications requiring detailed visual output. Furthermore, the display 300 may support additional functionalities, such as multi-touch input, gesture recognition, and/or haptic feedback. The display 300 may be configured to operate in different modes, including a low-power mode for extended battery life or a high-brightness mode for outdoor visibility.

In addition, the display 300 may be segmented into multiple independently controllable zones. This would allow for selective activation of display areas, potentially conserving power or enabling more complex information presentation strategies. For example, only the relevant portions of the display 300 could be activated based on the robot's current task or status. Further, the display 300 could utilize adaptive brightness and contrast adjustment based on ambient lighting conditions, ensuring optimal visibility across a wide range of environments. This feature could be particularly useful for robots operating in variable lighting conditions. Additionally or alternatively, the display 300 may incorporate augmented reality (AR) elements, overlaying digital information onto the real-world view seen through transparent portions of the display 300. This could enhance the robot's ability to provide context-aware information or instructions. The display 300 disclosed herein meets the standards described in FDA CFR Title 21 part 1040.10, titled Performance standards for Light-Emitting Products, and ANSI LIA Z136.1, titled Safe Use of Lasers, at the time of filing this application, both of which are incorporated herein by reference. In other embodiments, the humanoid robot 100 may include a projection system in addition to, or instead of, the integrated display. This could allow for displaying information on nearby surfaces or creating holographic-like interfaces in the space in front of the humanoid robot 100.

It should be understood that this application contemplates the use of at least one display 300 and potentially a plurality of displays (e.g., between 2 and 5). Additionally, this Application also contemplates utilizing displays that have different sizes. To this end, the display 300 may extend between any of the lines shown in FIG. 13. For example, the display 300 may extend between the third line from the bottom to the third line from the top as notionally indicated in FIG. 13. Additionally, each of the lines on the display 300 in FIG. 13 can represent different zones included in the display 300 and used to convey different images or other visual representations across said display 300. As an example, sides of the display 300 can be used to display a different image or visual representation compared to a front of the display 300. Alternative display sizes may be used to: (i) reduce the surface area of fragile elements within the humanoid robot 100, (ii) because the humanoid robot 100 is not designed to work near humans, (iii) additional area within the head portion 202*a* is needed for sensors or other electronics, or (iv) for any other reason known by one of skill in the art. The disclosed display 300 may be embedded in or occupy the entire frontal shell 228, between 100% and 75% of the frontal shell 228, between 75% and 50% of the frontal shell 228, between 50% and 25% of the frontal shell 228, or less than 25% of the frontal shell 228. In some examples, the display may utilize the full frontal shell 228.

Figures 12, 13:
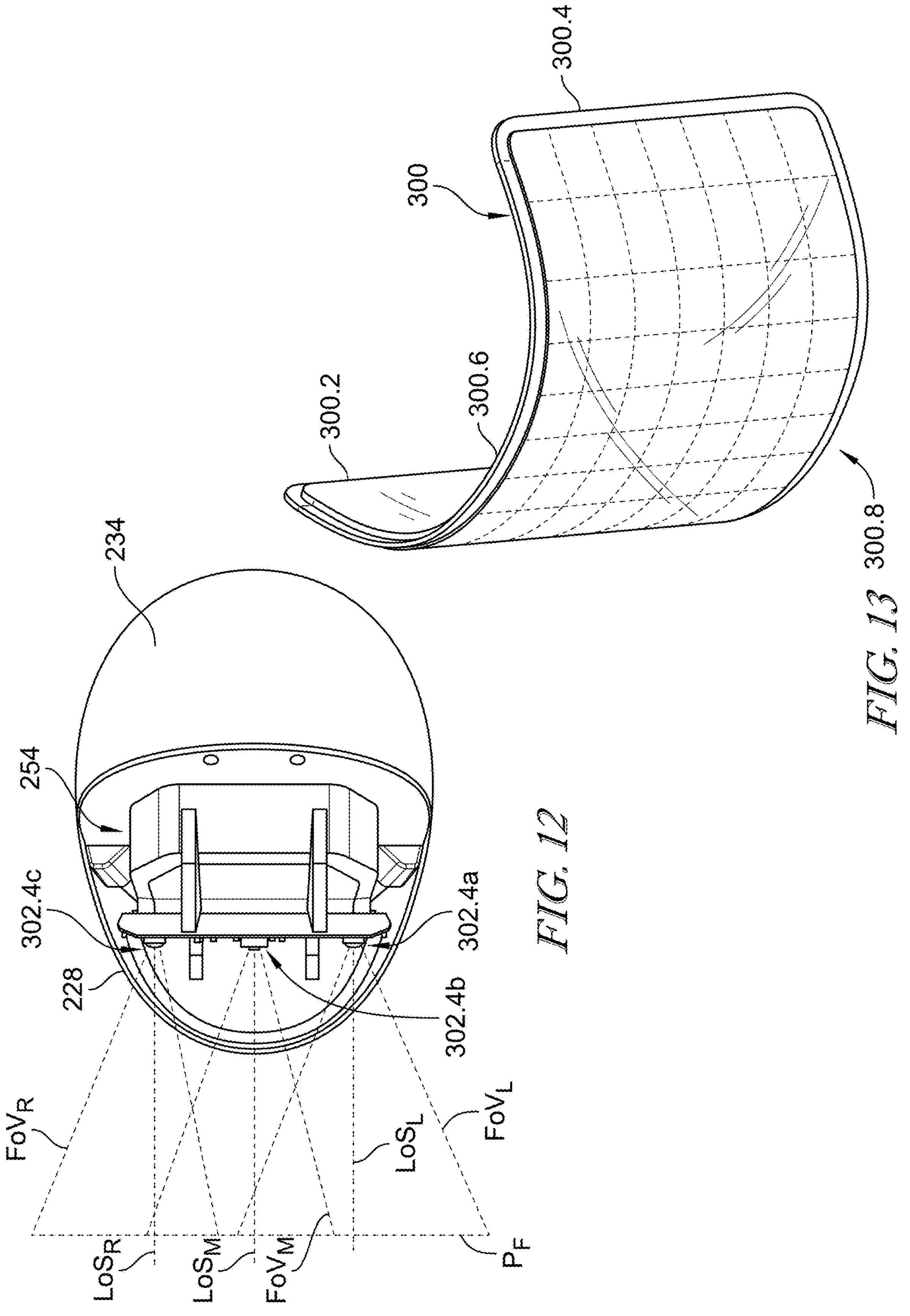
FIG. 12 is a top view of the head and neck assembly of FIG. 9, showing the sensor assembly including three cameras having overlapping fields of view oriented in a forward direction of the robot.
FIG. 13 is a perspective view of the display included in the head and neck assembly of FIG. 9.

As illustrated in FIG. 13, the display 300 is designed to curve along the contours of the humanoid robot's facial structure, aligning with various regions of the face to provide a seamless visual interface. Specifically, the display 300 conforms to and presents information through all or portions of key or important facial regions, including the orbital region 368, which surrounds the eyes, the frontal region 362 (encompassing the forehead area), the temporal region 350 (located near the temples), the zygomatic region 358 (corresponding to the cheekbones), the nasal region 357 (covering the nose area), the infraorbital region 363 beneath the eyes, the buccal region 352 (associated with the cheeks), and the oral region 366 (surrounding the mouth area). This curvature enhances the robot's ability to display expressive content or important visual cues directly on its face, potentially improving user interaction and engagement. Conversely, in the depicted embodiment, the display 300 does not extend to any regions located rearward of the shield interface 320. These excluded regions include the mental region 355 (corresponding to the chin), the auricular region 356 (encompassing the ears), the crown region 270 (at the top of the head), the parietal region 360 (located on the sides and upper back of the head), the occipital region 359 (at the lower back of the head), and the mastoid region 364 (behind the ears). By limiting the display 300 to the frontal facial areas, the design ensures that visual outputs remain within the primary field of view of human observers, optimizing the robot's communicative abilities. In some embodiments, the display 300 may be configured to present information, indications, or dynamic visual representations across a broader surface area. For example, the display 300 may cover: (i) the entire frontal shell 228 of the robot's head portion 202*a*, providing a comprehensive visual interface; (ii) a majority of the frontal shell 228, focusing on the most expressive regions; (iii) the entire facial region 241, ensuring full-face display coverage; or (iv) a majority of the facial region 241, balancing display utility with structural design considerations. Alternatively, in certain embodiments, the display 300 may be entirely omitted from the facial region 241 or repositioned to other parts of the robot's body. For instance, the display 300 could be integrated into the robot's torso 204 or another suitable location, depending on the specific application requirements or design preferences. This flexibility in display placement allows for customization based on the intended use case, whether it be for humanoid interaction, information dissemination, or other functionalities.

Figures 7A, 7B, 7C, 7D:
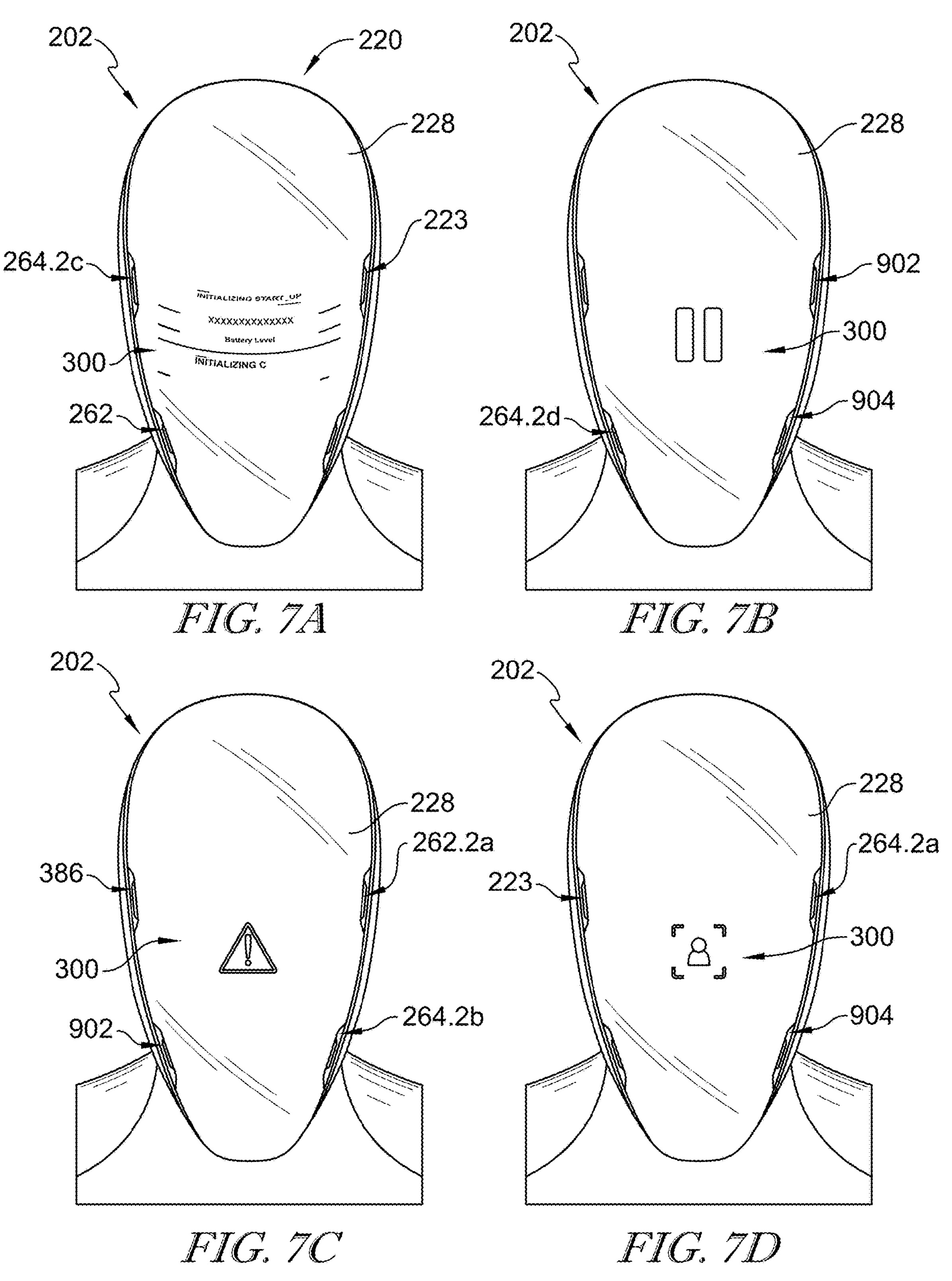
FIG. 7A is a partial perspective view of the head and neck assembly of FIG. 3, showing a first set of information displayed on and/or through the frontal shell.
FIG. 7B is a front view of the head portion of the humanoid robot showing an icon indicating a status on and/or through the frontal shell.
FIG. 7C is a front view of the head portion of the humanoid robot showing another icon indicating an alert or system failure event on and/or through the frontal shell.
FIG. 7D is a front view of the head portion of the humanoid robot showing an icon indicating a particular mode of the robot on and/or through the frontal shell.

FIGS. 7A-7D show various statuses and corresponding indications or visual representations that are contemplated by this disclosure. It should be noted that the present disclosure is not limited to these statuses and corresponding indications or visual representations, and that these are merely examples that can be displayed by the display 300. FIG. 7A shows a set of information displayed by display 300, including device status (e.g., camera status and robot start-up status), robot part status (e.g., a specified joint status), and a battery level status. The various statuses disclosed herein can update as the status changes. For example, during start-up of a camera, the display 300 may display text, an icon, or another visual representation indicating that the camera is initializing and is not ready for use. The status can change to display an icon, or another visual representation indicating that the camera is active when start-up is complete. FIG. 7B shows a robot status icon. Illustratively, the status icon depicted is a pause icon. The pause icon can be displayed when the humanoid robot 100 is currently not completing any tasks or modes and is ready for instructions. Other icons corresponding to additional robot statuses that can be completed by the humanoid robot 100 can also be displayed. FIG. 7C shows another icon indicating an alert or system failure event. The icon includes a triangle with an exclamation mark within it to indicate the alert or system failure event. Such an icon may be displayed when a part of the humanoid robot 100 has failed, such as an actuator, a camera, or another device included in the humanoid robot 100. Identifying information in the form of text or another icon can also be displayed with the alert or failure icon to specify which part of the robot 100 has failed or needs attention. FIG. 7D shows an icon indicating a particular mode of the robot. Illustratively, mode depicted indicates a follow mode in which the robot 100 is engaged in following a user, another device, or another robot. The icon includes a generally human shaped icon with a border around the generally human shaped icon. Other icons corresponding to additional modes of operation of the robot can also be displayed.

ii. Head Illumination Assembly

The head illumination assembly 223 includes at least one, and preferably a plurality of, light emitting assemblies 264.2*a*-264.2*d* located on lateral sides of the head portion 202*a*. In certain configurations, the illumination assembly 223 may be designed to visually indicate robot statuses to users viewing the humanoid robot 100 from the side. As shown in FIGS. 5B, 10B, 21, and 27, a first light emitting assembly 264.2*a* is located in a temporal region 350 of the robot's head portion 202*a*, and a second light emitting assembly 264.2*b* is located in a buccal region 352 of the robot's head portion 202*a*. Third and fourth light emitting assemblies 264.2*c*, 264.2*d* are located symmetrically on the opposite side of the robot's head portion 202*a*, and so are also located in the temporal region 350 and the buccal region 352 respectively. In some embodiments, the light emitting assemblies 264.2*a*-264.2*d* can be located all or partially in a parotid region 354, an auricular region 356, a zygomatic region 358, a parietal region 360, a frontal region 362, or a mastoid region 364, so long as the light emitters 902 comprised in the light emitting assemblies 264.2*a*-264.2*d* are positioned on a lateral side of the robot's head portion 202*a* so as to be visible to a person standing next to the humanoid robot 100. These positions of the light emitting assemblies 264.2*a*-264.2*d* allow users to view the light emitted from said light emitting assemblies 264.2*a*-264.2*d* from the side while the humanoid robot 100 is working on a task in an assembly line, for example, and while the display 300 is facing the assembly line and may not be entirely visible by the user. Further, the light emitting assemblies 264.2*a*-264.2*d* may face away from the display 300 so as not to obstruct the information displayed by the display 300, and may face away from other sensors so as not to interfere with said sensors. Other regions of the head portion 202*a* where the light emitting assemblies 264.2*a*-264.2*d* are not typically found include a chin or mental region 355, an orbital region 368, a nasal region 357, a crown region 270, and an occipital region 359.

The light emitting assemblies 264.2*a*-264.2*d* in the head portion 202*a* may be configured to display a status of the humanoid robot 100, or a part thereof, to users. As such, the light emitting assemblies 264.2*a*-264.2*d* may be able to alter their color (e.g., visible and non-visible light), intensity, duration of being on/off, etc. In one embodiment, the light emitting assemblies 264.2*a*-264.2*d* may display a first color (i.e., green—550 nm) when the robot is engaged in a task, such as assembling a part on an assembly line. The light emitting assemblies 264.2*a*-264.2*d* can display a second color (i.e., yellow—600 nm) when the humanoid robot 100 is not assigned to a task, to indicate to users that the humanoid robot 100 is available for a task. The light emitting assemblies 264.2*a*-264.2*d* can display a third color (i.e., red—665 nm) when the humanoid robot 100 is low on battery life and should be recharged. Additionally, the light emitting assemblies 264.2*a*-264.2*d* may display a variety of other colors or patterns, or may utilize display sequences to convey different statuses or alerts. For example, the light emitting assemblies 264.2*a*-264.2*d* can display a flashing blue light—470 nm to indicate that the humanoid robot 100 is in a standby mode and awaiting further instructions. A pulsing white light can be used to indicate that the humanoid robot 100 is undergoing a system update or performing a self-diagnostic check. Alternatively, the light emitting assemblies 264.2*a*-264.2*d* can display a purple light to indicate that the humanoid robot 100 is in a training mode, learning a new task or recalibrating its sensors. Further, the light emitting assemblies 264.2*a*-264.2*d* can blink repeatedly to indicate that the humanoid robot 100 has lost communication with a host server or external device, or is attempting to pair or searching for a device or server to connect to. Finally, the light emitting assemblies 264.2*a*-264.2*d* may emit non-visible light (e.g., infrared, ultraviolet) that enables the humanoid robot 100 to communicate with other robots or systems equipped with appropriate sensors.

In some embodiments, the light emitting assemblies 264.2*a*-264.2*d* may also use dynamic lighting patterns, such as slow pulses, fast blinks, or color gradients, to communicate additional information. For instance, a gradual transition from green to yellow may indicate that the humanoid robot 100 is completing a task and will soon be available. A rapidly blinking red light may signal a critical error or an emergency stop condition, prompting immediate attention from users. The light emitting assemblies 264.2*a*-264.2*d* and/or the display 300 can also be used to indicate when a component in the head portion 202*a* and/or neck portion 202*b*, such as an actuator or sensor, is malfunctioning and should be serviced. For example, a specific color or pattern may correspond to different types of malfunctions. A steady orange light could indicate a minor issue that requires maintenance but does not immediately impact the robot's performance, while a flashing red-and-white pattern could signal a major fault that requires immediate servicing. In another example, the light emitting assemblies 264.2*a*-264.2*d* can display a particular color that corresponds with the information displayed on the display 300. If the humanoid robot 100 is running low on battery life, the light emitting assemblies 264.2*a*-264.2*d* can display a red color while the display 300 displays a message and/or icon that indicates that the battery is low.

The light emitting assemblies 264.2*a*-264.2*d* may also be synchronized with audible alerts or haptic feedback mechanisms to ensure that users are promptly notified of the robot's status, even in environments where visual indicators may be less noticeable. For instance, a flashing light paired with a beeping sound can signal an urgent issue, while a soft chime can accompany a color change indicating that the humanoid robot 100 has completed its task and is ready for the next assignment. Light emitting assemblies 264.2*b*, 264.2*d* are positioned adjacent to an oral region 366 of the head portion 202*a* and can be operated independently of the light emitting assemblies 264.2*a*, 264.2*c*, which are located above light emitting assemblies 264.2*b*, 264.2*d* and adjacent to an orbital region 368 of the head portion 202*a*. Alternatively or additionally, said light emitting assemblies 264.2*a*-264.2*d* may be able to project patterns or simple icons onto nearby surfaces.

Each of the light emitting assemblies 264.2*a*-264.2*d* in the head portion 202*a* includes: (i) a light source or light emitter 902, and (ii) a diffuser lens 386 extending between end walls 376, 378, a top wall 380, a bottom wall 382, and an interior wall 384 of a respective light emitter housing 262. The light source 902 and the diffuser lens 386 form the light emitting assembly 264 that is inserted together into each respective light emitter housing 262. The light source or emitter 902 can include any known light emitter, including any one or more of the following: a laser, an LCD, an LED (e.g., a Chip-on-Board LED), an OLED, an LPD, an IMOD, a QDLED, an mLED, an AMOLED, an SED, an FED, a plasma source, electronic paper or EPD, MicroLED, a quantum dot display, a LED backlit LED, a WLCD, a OLCD, a transparent OLED, a PMOLED, a capacitive touchdisplay, a resistive touchdisplay, fiber optic light guides that distribute light from a central source to multiple output points on the head surface, a monochrome emitter, a color emitter, or any combination of the above, or any other known technology or light emitting feature. It should be understood that in other embodiments, the above disclosed light sources or emitters 902 and/or additional light emitters 902 may be formed in any desirable configuration or used with any other material, structure, or component to form the desirable light emitting assemblies 264.2*a*-264.2*d*. Examples of said light emitting assemblies 264.2*a*-264.2*d* that may be formed include those utilizing fiber optic cables, electroluminescent (EL) wire, laser diodes, neon tubes, cold cathode fluorescent lamps (CCFL), plasma tubes, phosphorescent strips, UV LED strips, infrared LED arrays, light guide panels (LGP), or edge-lit light panels. The light source or light emitter 902 may be made from a single emitter or a plurality of emitters (e.g., between 2 and 1000). Said light source or light emitter 902 may be driven by an internal or external driver within another aspect of the electronics assembly 222.

Each of the light emitters 902 is positioned in a void 904 of each respective light emitter housing 262 (i.e., positioned toward the display 300 from an outer perspective) and the diffuser lens 386 is positioned in front of the light emitter 902 to reside between a frontal extent of the light emitter 902 and an outermost edge of each respective light emitter housing 262 and/or an outermost edge surface 325 of the head portion 202*a* or frontal shell 228. In some embodiments, the diffuser lens 386 can be omitted from the assemblies 264.2*a*-264.2*d*. Each light emitter 902 is located forward of and adjacent to the forward facing edge 253 of the rear shell 234, and rearward of and adjacent to a portion of the rear facing edge 322 of the frontal shell 228 defining each recess 324. A rearmost edge of each light emitter 902 is located rearward of the entire rear facing edge 322 of the frontal shell 228. The voids 904 are located between the frontal shell 228 and the rear shell 234. In other embodiments, the light emitters 902 may not be formed in the voids 904; instead, said voids 904 may act as a reflector for light that is emitted from said light emitter or source 902. In other words, the light emitter 902 may be positioned in the first head sub-volume 236.

The recesses 324 positioned between the frontal shell 228 and the rear shell 234 define a gap, region, or channel 327. Light emitted from the illumination assembly 223 is configured to be visible in each said gap, region, or channel 327. In other words, the region or the gap 327 may be: (i) positioned adjacent to both the rear edge 322 of the frontal shell 228 and the frontal edge 253 of the rear shell 234, and (ii) illuminated by an extent of the illumination assembly 223, namely by light that is emitted by at least one of the light emitters 902. As shown in the FIGURES, the regions or the gaps 327 that illuminated by the illumination assembly 223 at least span between the end walls 376, 378.

An extent of the head portion 202*a* is provided by peripheral projections associated with the light emitter housings 262. This extent is recessed relative to both: (i) a first location 333.2 on the outer surface 325 of the frontal shell 228 that is positioned adjacent to the gap 327, and (ii) a second location 333.4 on the outer surface 329 of the rear shell 234 that is positioned adjacent to said gap 327. The rear edge 322 of the frontal shell 228 does not abut the forward facing edge 253 of the rear shell 234 at a location corresponding to the gaps 327. In other words, an extent of the portion of the light emitter housing 262 may be recessed relative to the outer surfaces 325, 329 of the frontal shell 228 and rear shell 234. This positional relationship may cause an extent of the head portion 202*a* to be positioned: (i) between the frontal shell 228 and/or the rear shell 234, and (ii) at said location to connect the frontal shell 228 to the rear shell 234 indirectly via the intermediate cover 252 housing the light emitting assemblies 264.2*a*-264.2*d*. As such, the light emitting assemblies 264.2*a*-264.2*d* may have an arc or curvilinear configuration conforming to the head shape. Light emitted from the illumination assembly 223 (via assemblies 264.2*a*-264.2*d*) may obscure an extent of the head portion 202*a*, and may specifically obscure an extent (e.g., an extent of the region 327) of the head portion 202*a* that has an outer surface 331 (of the diffuser lens 386 or housing 262) that is recessed relative to the outer surfaces 325, 329 of the frontal shell 228 and rear shell 234.

When viewing the head portion 202*a* from the front as shown in FIGS. 4 and 9, it can be seen that the light emitting assemblies 264.2*a*-264.2*d* (and their emitters 902) are spaced apart from the display 300 and the electronics support 254. In some aspects, the light emitting assemblies 264.2*a*-264.2*d* do not reside behind or overlap with the display 300 or the electronics support 254, although in some embodiments this may occur. The lower light emitting assemblies 264.2*b*, 264.2*d* may be positioned below the display 300 and the electronics support 254. The upper light emitting assemblies 264.2*a*, 264.2*c* may flank the display 300 and the electronics support 254 such that a horizontal plane (i.e., plane 122 as shown in FIG. 9) extending through the upper light emitting assemblies 264.2*a*, 264.2*c* also passes through the display 300. The plane 122 may also pass through the center C of the head portion 202*a*, but the upper light emitting assemblies 264.2*a*, 264.2*c* may be slightly offset upward relative to the plane 122. In some cases, the upper light emitting assemblies 264.2*a*, 264.2*c* may be located below a top end of the display 300 so as to be positioned below any cameras or sensors mounted to the electronics support 254 above the display 300.

iii. Sensor Assembly

The sensor assembly 301 may include a variety of sensing devices and systems to enhance the humanoid robot 100's perception capabilities and adaptability in various environments. The sensor assembly 301 may include: (i) a vision system 301V with one or more cameras 302.2*a*-302.2*c*, 302.4*a*-302.4*c*), (ii) temperature sensors to detect ambient or object temperatures for safety and operational adjustments, (iii) pressure sensors to measure contact or surface pressures, (iv) force sensors for detecting applied forces during interactions, (v) inductive sensors for proximity and metal object detection, (vi) capacitive sensors to sense touch or proximity, (vii) any combination of these sensors, or (viii) other known sensors including ultrasonic, acoustic, or gas sensors for additional environmental monitoring.

Figure 26:
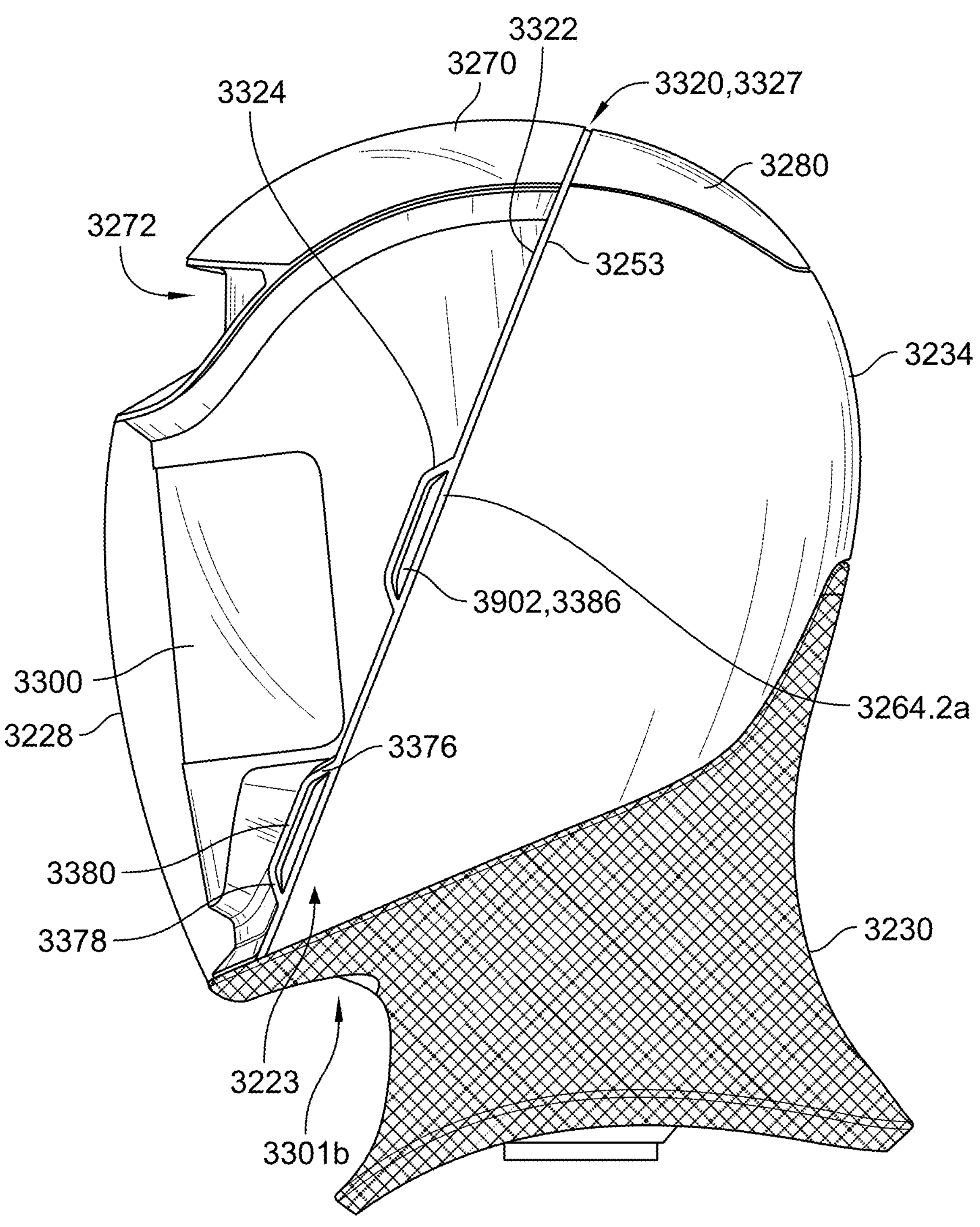
FIG. 26 is a side view of the head and neck assembly of FIG. 22.
Figure 27:
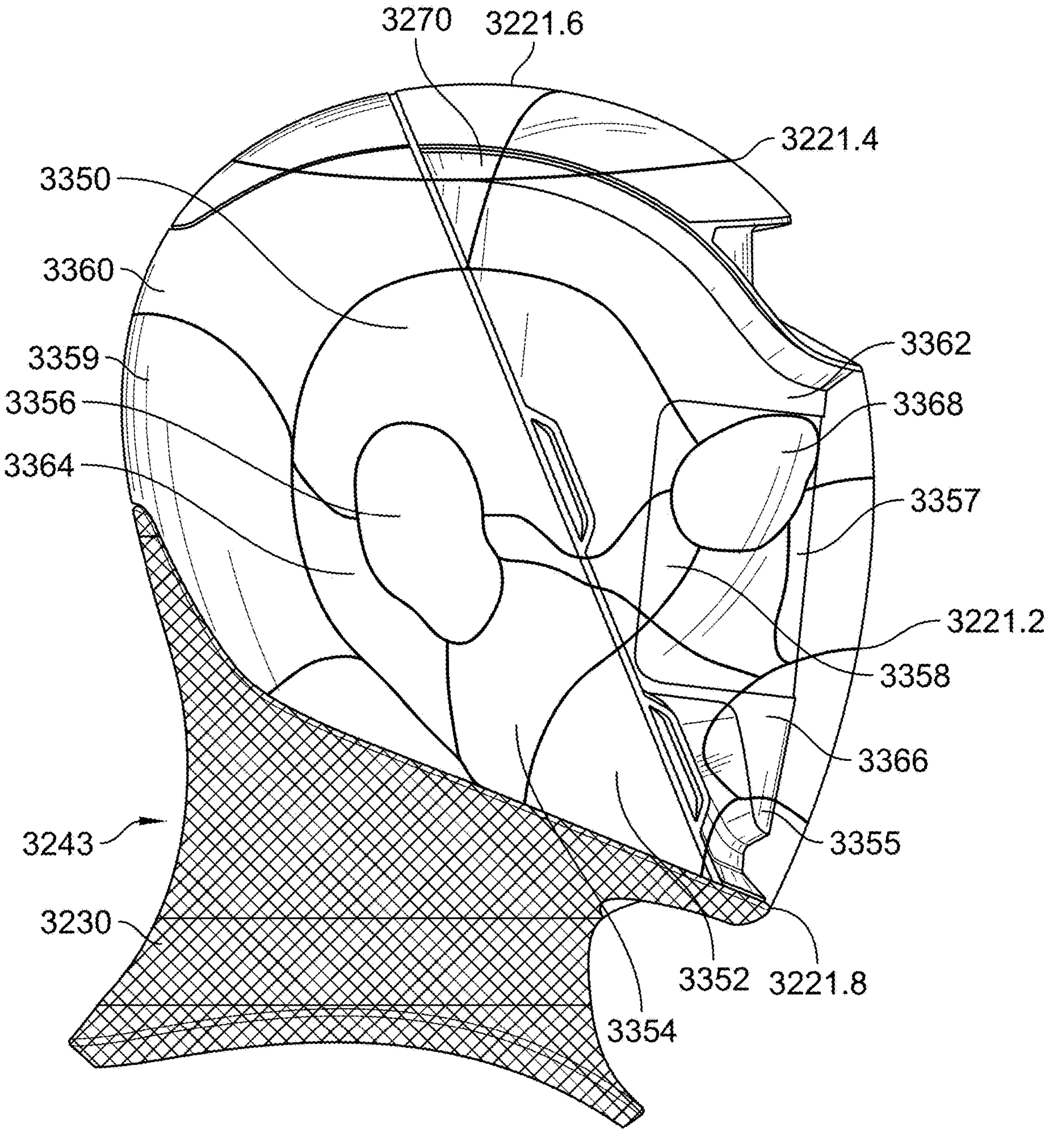
FIG. 27 is a side view of the head and neck assembly of FIG. 22 showing various anatomical regions of the head.

In some implementations, the vision system 301V may include a set of cameras 302, wherein said set of cameras 302 may include three upper cameras 302.2*a*, 302.2*b*, 302.2*c* that are positioned in the head volume, in a forward facing orientation $O_{FF}$: (i) above: (a) the display 300 and coupled to the electronics support 254, (b) the orbital region 368, (c) the nasal region 357, (d) the oral region 366, and (e) an extent of the illumination assembly 263 and at least one light emitter 264*a*-264*d*, (ii) generally positioned in the frontal region 362, (iii) vertically above an extent of: (a) the temporal region 350, (b) the zygomatic region 358, and (c) the buccal region 352, and (iv) directed forward. As shown in FIGS. 26 and 27, the three upper cameras 302.2*a*-302.2*c* are substantially horizontally aligned and spaced apart from one another along a plane that is parallel with plane 124. A first camera 302.2*a* included in the set of cameras 302 may be directed in a forward direction relative to the humanoid robot 100, providing a primary field of vision for object recognition and navigation. Second camera 302.2*b* and third camera 302.2*c*, included in the set of cameras 302, may be directed in opposed lateral directions relative to the humanoid robot 100, substantially perpendicular to the first camera 302.2*a*, ensuring broader peripheral coverage and spatial awareness. As shown in FIG. 4, the three cameras 302.2*a*-302.2*c* may be arranged along a substantially horizontal plane, when the head portion 202*a* is in the forward facing orientation $O_{FF}$. And as discussed in greater detail below, the head portion 202*a* includes an illumination assembly 223 that has at least one light emitter 902 that is configured to illuminate a region that is positioned adjacent to the rear edge 322 of the frontal shield 228.

As shown in the FIGURES, upper cameras 302.2*a*, 302.2*b*, 302.2*c* in the head portion 202*a* may have a forward field of view $FoV_F$ or lateral facing fields of view $FoV_L$, $FoV_R$ or cone of vision, of about 57.6 degrees to about 86.4 degrees, or about 71.1 degrees to about 79.2 degrees. For example, the field of view $FoV_F$, $FoV_L$, $FoV_R$ or cone of vision of the upper cameras 302.2*a*, 302.2*b*, 302.2*c* may be about 72 degrees. As shown in FIGS. 2 and 3, the fields of view of the upper cameras 302.2*a*, 302.2*b*, 302.2*c* may not overlap or may have partially overlapping fields of view directly in front of the humanoid robot 100. In alternative embodiments, the field of view or cone of vision of the upper cameras 302.2*a*, 302.2*b*, 302.2*c* may have a minor overlap or may have a substantial overlap to improve depth perception and eliminate blind spots. Additionally, and as shown in FIG. 3, the first camera 302.2*a* may have a front field of view $FoV_F$ that has a line of sight $LoS_F$ that is perpendicular to a frontal plane $P_F$. As shown in FIG. 5B, the line of sight $LoS_F$ is not centered in the front field of view $FoV_F$ due to optics that are used in connection with the camera 302.2*a*. The second and third cameras 302.2*b*, 302.2*c* also have fields of view $FoV_L$, $FoV_R$ with lines of sight $LoS_L$ $LoS_R$ that are substantially perpendicular to the line of sight $LoS_F$.

To further enhance the versatility of the vision system 301V, the cameras contained in the set of cameras 302 may feature adjustable fields of view achieved through various mechanisms. These mechanisms may include motorized zoom lenses capable of dynamically adjusting the focal length to focus on distant or close objects as needed, and wide-angle lenses combined with software-based digital zoom and cropping to provide both broad coverage and detailed inspection capabilities. In scenarios where extreme wide-angle views are required, fisheye lenses with integrated distortion correction algorithms may be employed to deliver a seamless image output.

FIGS. 8-12 show an alternative embodiment of a sensor assembly 301, where the three cameras (302.2*a*, 302.2*b*, 302.2*c*) are replaced with three forward facing cameras 302.4*a*, 302.4*b*, and 302.4*c*. In this embodiment, the three cameras 302.4*a*, 302.4*b*, 302.4*c* can be coupled to the electronics support 254 and configured to provide depth perception for the humanoid robot 100 utilizing overlapping fields of view, as suggested in FIG. 12. Any number of cameras can be located above the display 300 and arranged in the forward direction of the humanoid robot 100, allowing for a customizable field of view based on specific task requirements. For instance, multiple forward-facing cameras may be configured to function as a stereo vision system, calculating depth and distance using disparity between images captured by each camera.

Each of these three cameras 302.4*a*, 302.4*b*, 302.4*c* has respective fields of vision $FoV_L$, $FoV_M$, and $FoV_R$ (as labeled in FIG. 12, where $FoV_L$ here means left-of-center forward, FoVM means middle forward, and FoVR means right-of-center forward for the three forward cameras), wherein these fields of vision overlap one another to aid in providing a 3D reconstruction of the humanoid robot's 100 environment. The line of sight $LoS_L$, $LoS_M$, and LoSR (corresponding to cameras 302.4*a*, 302.4*b*, 302.4*c* respectively) for each camera 302.4*a*, 302.4*b*, 302.4*c* are spaced along a horizontal plane and may be parallel with one another and angled relative to the frontal plane $P_F$, wherein said frontal plane Pris parallel with the coronal plane of the humanoid robot 100. Said angle between the lines of sight $LoS_L$, $LoS_M$, $LoS_R$ and the frontal plane $P_F$ may be between 91 degrees and 150 degrees, and preferably around 110 degrees, when measuring the angle from the plane looking forward and upward.

In other embodiments, the sensor assembly 301 or set of cameras 302 of the humanoid robot 100 may include additional or different cameras. For example, said set of cameras 302 may alternatively or additionally include a plurality of lower cameras positioned below the display 300, oriented downward to monitor the area in front of the robot's feet 412*a*, 412*b*. Said plurality of lower cameras may be beneficial for obstacle detection in close proximity to the humanoid robot 100, enabling it to navigate uneven terrain or avoid small objects on the ground. Additionally, the set of cameras 302 may include rear-facing camera(s) to monitor the area behind the humanoid robot 100, which may improve safety during backward movements or when the humanoid robot 100 operates in dynamic environments with multiple moving objects. In some aspects, the set of cameras 302 may include side-mounted cameras on each side of the head portion 202*a* may provide a full 360-degree field of vision, ensuring the humanoid robot 100 can detect lateral movements and peripheral activities. In certain implementations, the set of cameras 302 may include cameras be mounted on adjustable or retractable arms, or may be detachable to enable them to be reconfigured or repositioned based on specific operational requirements. These adjustable mounts may include motorized mechanisms to dynamically adjust the angle and position of each camera contained in the set of cameras 302, allowing for on-the-fly adaptation to different tasks and environments. For example, during inspection tasks, the cameras may be reoriented to focus on specific areas of interest, while during navigation, they may return to a default position to maximize the robot's field of vision.

Additionally, the vision system 301V may incorporate advanced imaging techniques, such as multi-frame noise reduction algorithms, to improve image clarity in low-light conditions. Advanced autofocus systems, including phase-detection and contrast-detection autofocus, may be integrated to provide rapid and precise focus adjustments. For enhanced environmental adaptability, the vision system 301V may be equipped with polarization filters to reduce glare and improve visibility in reflective or water-covered environments. For reliability and redundancy, the vision system 301V may feature modular cameras 302 that can be hot-swapped, allowing for seamless replacement without disrupting the robot's operations. These camera units may also include self-cleaning mechanisms like hydrophobic coatings, ultrasonic vibration systems to dislodge dust, or small wipers to maintain lens clarity. Additionally, automated diagnostics systems could be integrated to monitor the health and performance of each camera 302, alerting the humanoid robot 100 to potential issues and enabling proactive maintenance. To enhance resilience in harsh environments, the cameras 302 may be housed in rugged enclosures with shock-absorbing mounts, protecting them from physical impacts and vibrations.

Although upper cameras 302.2*a*-302.2*c*, 302.4*a*-302.4*c* are shown as illustrative examples, other types of sensors may be utilized and mounted to an internal frame or support in a similar manner to achieve optimal directional alignment for various detection, sensing, or signal reception tasks. For example, the sensor assembly 301 or the vision system 301V may incorporate time-of-flight (ToF) sensors, structured light projectors paired with infrared cameras, or stereo cameras with variable baselines to enhance depth perception and generate accurate three-dimensional spatial maps. Additionally, radar and ultrasonic sensors may be integrated to provide redundant distance measurements, which can be particularly valuable in low-visibility conditions or dynamic environments. In certain embodiments, lidar sensors may be employed for precise long-range distance measurements, while thermal imaging cameras can detect heat signatures and monitor temperature variations. Multi-spectral or hyper-spectral imaging systems may further improve object recognition by identifying materials based on their unique spectral characteristics, thereby enhancing the robot's ability to navigate and interpret complex environments.

Additionally or alternatively, the sensor assembly 301, vision system 301V, and/or cameras (e.g., 302.2*a*, 302.2*b*, 302.2*c*, 302.4*a*, 302.4*b*, 302.4*c*) may include: (i) scan camera(s) for detailed inspection, (ii) monochrome camera(s) for improved low-light performance, (iii) color camera(s) for standard imaging, (iv) CMOS camera(s) for high-speed imaging, (v) CCD sensor(s) or camera(s) that include CCD sensor(s) for high-quality imaging, (vi) camera(s) or sensor(s) that have a rolling shutter or global shutter for various imaging requirements, (vii) other types of 2D digital camera(s) for traditional imaging, (viii) other types of 3D digital camera(s) for depth mapping, (ix) camera(s) or sensor(s) that are capable of stereo vision, structured light projection, and laser triangulation for enhanced 3D imaging, (x) sonar camera(s) or ultrasonic camera(s) for proximity sensing, (xi) infrared sensor(s) and/or infrared camera(s) for low-light and heat detection, (xii) radar sensor(s) for distance measurement, (xiii) LiDAR for precise mapping, (xiv) other structured light sensors, camera(s), or technologies for advanced imaging, (xv) dot projecting camera(s) or sensor(s) for depth sensing, or (xvi) any combination of the above or any other known camera or sensor. In one embodiment, a camera 302 may have a megapixel resolution of between 0.4 MP to 20 MP, may record video at frame rates from 5.6 FPS to 286 FPS, may have a CMOS sensor, its pixel size may range from 2.4 μm to 6.9 μm, may utilize Starvis rolling shutter technology, can operate in 55-degree Celsius ambient air temperatures, and may have any other properties, technologies, or features that are discussed within U.S. patent application Ser. Nos. 11,402,726, 11,599,009, 11,333,954, or 11,600,010, all of which are incorporated herein by reference in their entirety. It should be understood that the cameras 302 are typically configured as video cameras but may have an alternative configuration, such as an image camera or a multi-functional camera capable of capturing both still images and video footage.

4. Neck Portion

As shown in at least FIG. 3, the neck portion 202*b* includes a deformable cover and member 230 that is designed to extend from an upper portion of the torso 204 to a lower portion of the head portion 202*a*. In particular, the deformable cover and member 230 is configured to wrap around at least an edge portion of the rear shell 234. In doing so, the deformable cover and member 230 obscures actuators and other electronics contained in the neck portion 202*b*.

5. Distances, Angles, Radii, and Arcs

The following tables include non-limiting examples of distances, angles, radii and arcs. Additionally, while the entire figure set is not to scale, it should be understood that the components contained in within each FIGURES are generally to scale and as such comparison, ratios, and/or other information can be derived from the FIGURES and even supplemented by the information contained in the below tables.

TABLE 1

| Distance (mm) | Lower Bound | Upper Bound | Preferred Lower Bound | Preferred Upper Bound |
|---|---|---|---|---|
| D1 | 61.7 | 92.6 | 69.5 | 84.9 |
| D2 | 113.6 | 170.4 | 127.8 | 156.2 |
| D3 | 80.6 | 120.9 | 90.7 | 110.8 |
| D4 | 177.2 | 265.8 | 199.4 | 243.7 |
| D5 | 61.4 | 92.1 | 69.1 | 84.4 |
| D6 | 81.5 | 122.3 | 91.7 | 112.1 |
| D7 | 80.5 | 120.8 | 90.6 | 110.7 |
| D8 | 76.1 | 114.2 | 85.6 | 104.7 |
| D9 | 80.6 | 120.9 | 90.7 | 110.9 |
| D10 | 34.2 | 51.2 | 38.4 | 47.0 |
| D11 | 61.7 | 92.6 | 69.4 | 84.8 |
| D12 | 137.6 | 206.4 | 154.8 | 189.2 |
| D13 | 139.1 | 208.6 | 156.5 | 191.2 |
| D14 | 20.1 | 30.2 | 22.6 | 27.7 |
| D15 | 67.2 | 100.8 | 75.6 | 92.4 |
| D16 | 48.0 | 72.0 | 54.0 | 66.0 |
| D17 | 28.8 | 43.2 | 32.4 | 39.6 |
| D18 | 136.3 | 204.5 | 153.3 | 187.4 |
| D19 | 13.6 | 20.4 | 15.3 | 18.7 |
| D20 | 137.0 | 205.5 | 154.1 | 188.3 |
| D21 | 20.8 | 31.2 | 23.4 | 28.6 |

TABLE 1-continued

| Distance (mm) | Lower Bound | Upper Bound | Preferred Lower Bound | Preferred Upper Bound |
|---|---|---|---|---|
| D22 | 93.3 | 140.0 | 105.0 | 128.3 |
| D23 | 173.6 | 260.4 | 195.3 | 238.7 |
| D24 | 166.2 | 249.4 | 187.0 | 228.6 |

TABLE 2

| Angle (Degrees) | Lower Bound | Upper Bound | Preferred Lower Bound | Preferred Upper Bound |
|---|---|---|---|---|
| A1 | 5.7 | 8.6 | 6.4 | 7.9 |
| A2 | 55.1 | 82.6 | 62.0 | 75.8 |
| A3 | 54.8 | 82.2 | 61.6 | 75.3 |

TABLE 3

| Radius (mm) | Lower Bound | Upper Bound | Preferred Lower Bound | Preferred Upper Bound |
|---|---|---|---|---|
| R1 | 99.7 | 149.6 | 112.2 | 137.1 |
| R2 | 46.0 | 69.0 | 51.7 | 63.2 |
| R3 | 63.7 | 95.5 | 71.6 | 87.6 |
| R4 | 66.6 | 99.9 | 74.9 | 91.6 |
| R5 | 25.7 | 38.5 | 28.9 | 35.3 |
| R6 | 62.7 | 94.0 | 70.5 | 86.2 |
| R7 | 122.4 | 183.6 | 137.7 | 168.3 |
| R8 | 101.8 | 152.8 | 114.6 | 140.0 |
| R9 | 75.2 | 112.8 | 84.6 | 103.4 |
| R10 | 127.7 | 191.6 | 143.7 | 175.6 |
| R11 | 79.3 | 118.9 | 89.2 | 109.0 |
| R12 | 69.0 | 103.5 | 77.6 | 94.8 |

TABLE 4

| Arc (Degrees) | Lower Bound | Upper Bound | Preferred Lower Bound | Preferred Upper Bound |
|---|---|---|---|---|
| Arc1 | 119.7 | 179.5 | 134.6 | 164.5 |
| Arc2 | 115.1 | 172.6 | 129.5 | 158.2 |
| Arc3 | 162.5 | 243.8 | 182.8 | 223.5 |
| Arc4 | 110.8 | 166.2 | 124.6 | 152.3 |
| Arc5 | 117.1 | 175.6 | 131.7 | 161.0 |
| Arc6 | 65.8 | 98.7 | 74.1 | 90.5 |
| Arc7 | 39.6 | 59.5 | 44.6 | 54.5 |
| Arc8 | 102.4 | 153.6 | 115.2 | 140.8 |
| Arc9 | 88.0 | 131.9 | 99.0 | 120.9 |

D. Alternative Embodiments of the Head and Neck Assembly

Figures 16, 17:
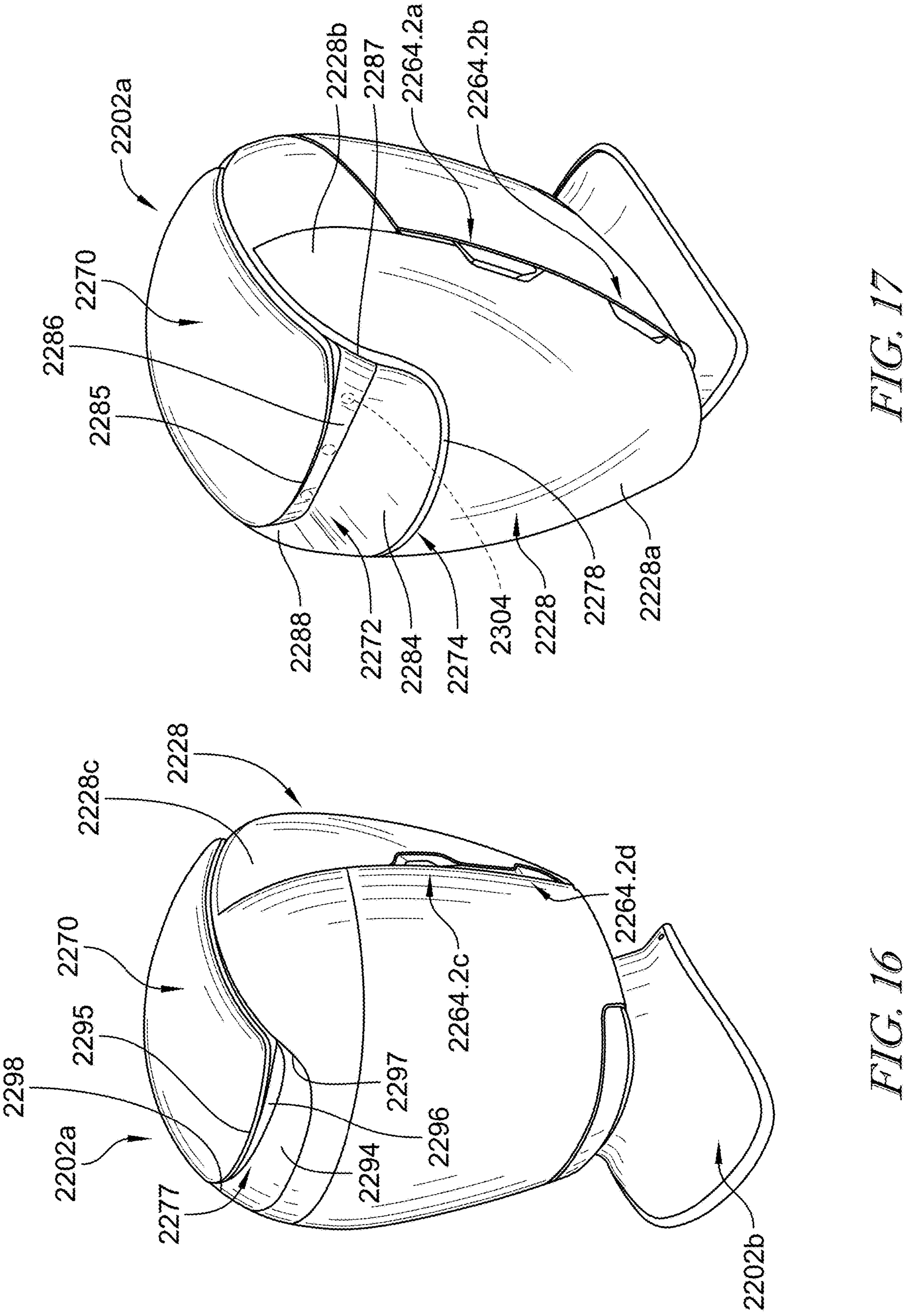
FIG. 16 is a rear perspective view of a second embodiment of a head and neck assembly of the humanoid robot of FIG. 1.
FIG. 17 is a front perspective view of the head and neck assembly of FIG. 28, wherein the head assembly further includes an upper shell with an upper recessed sensor zone.
Figure 19:
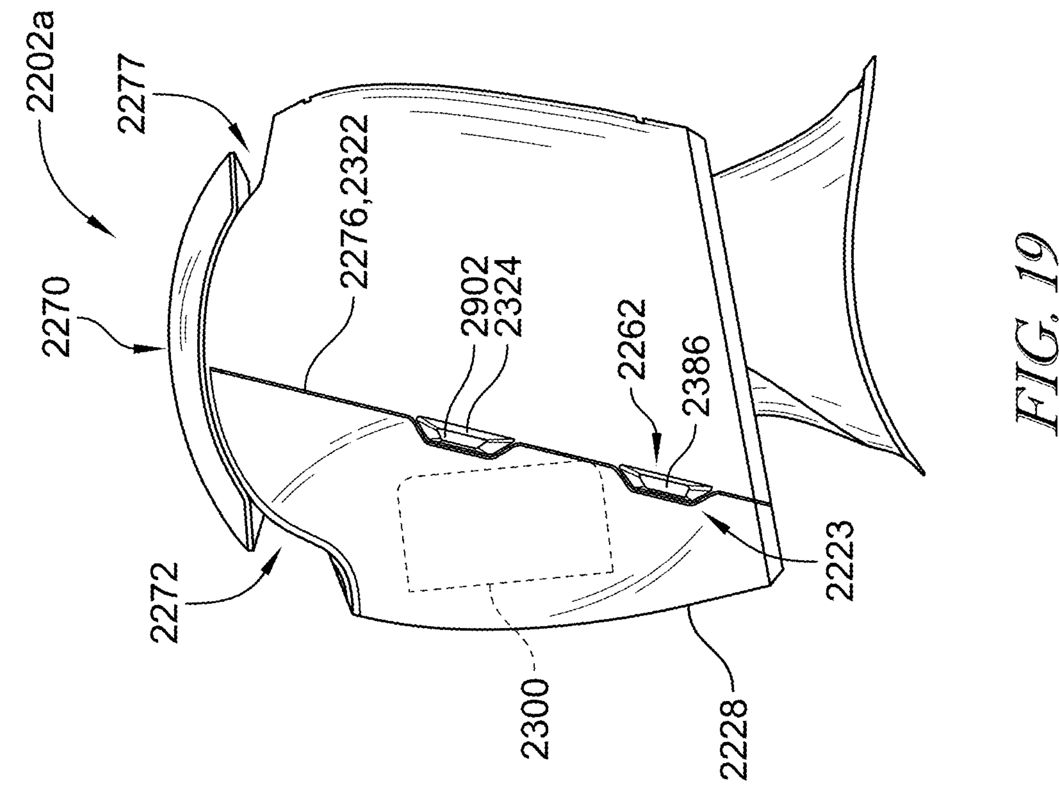
FIG. 19 is a side view of the head and neck assembly of FIG. 16.
Figure 22:
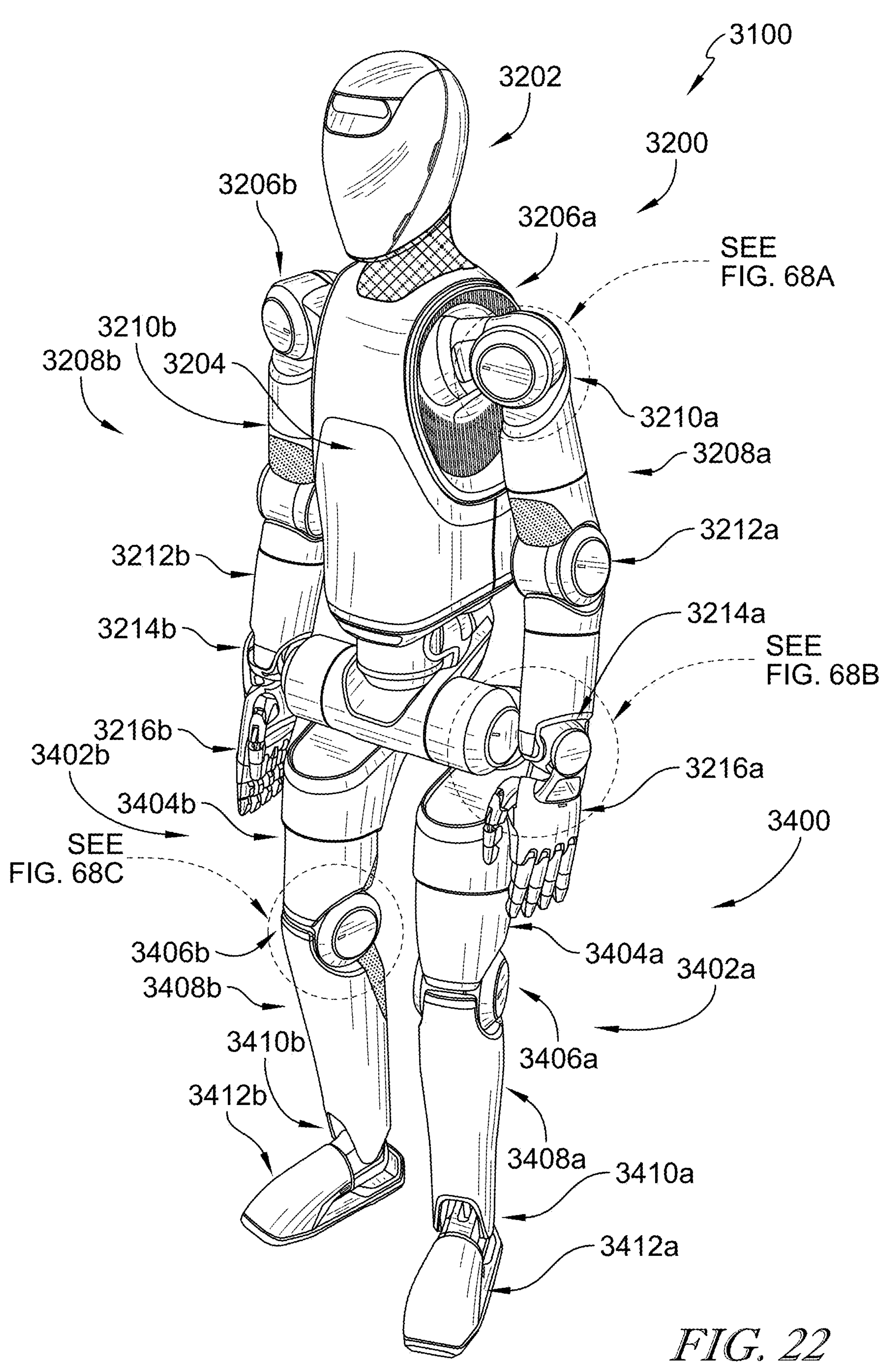
FIG. 22 is a perspective view of a humanoid robot including a third embodiment of a head and neck assembly of the humanoid robot, wherein the head and neck assembly includes a deformable mesh covering internal structures and components of the neck assembly.
Figure 23:
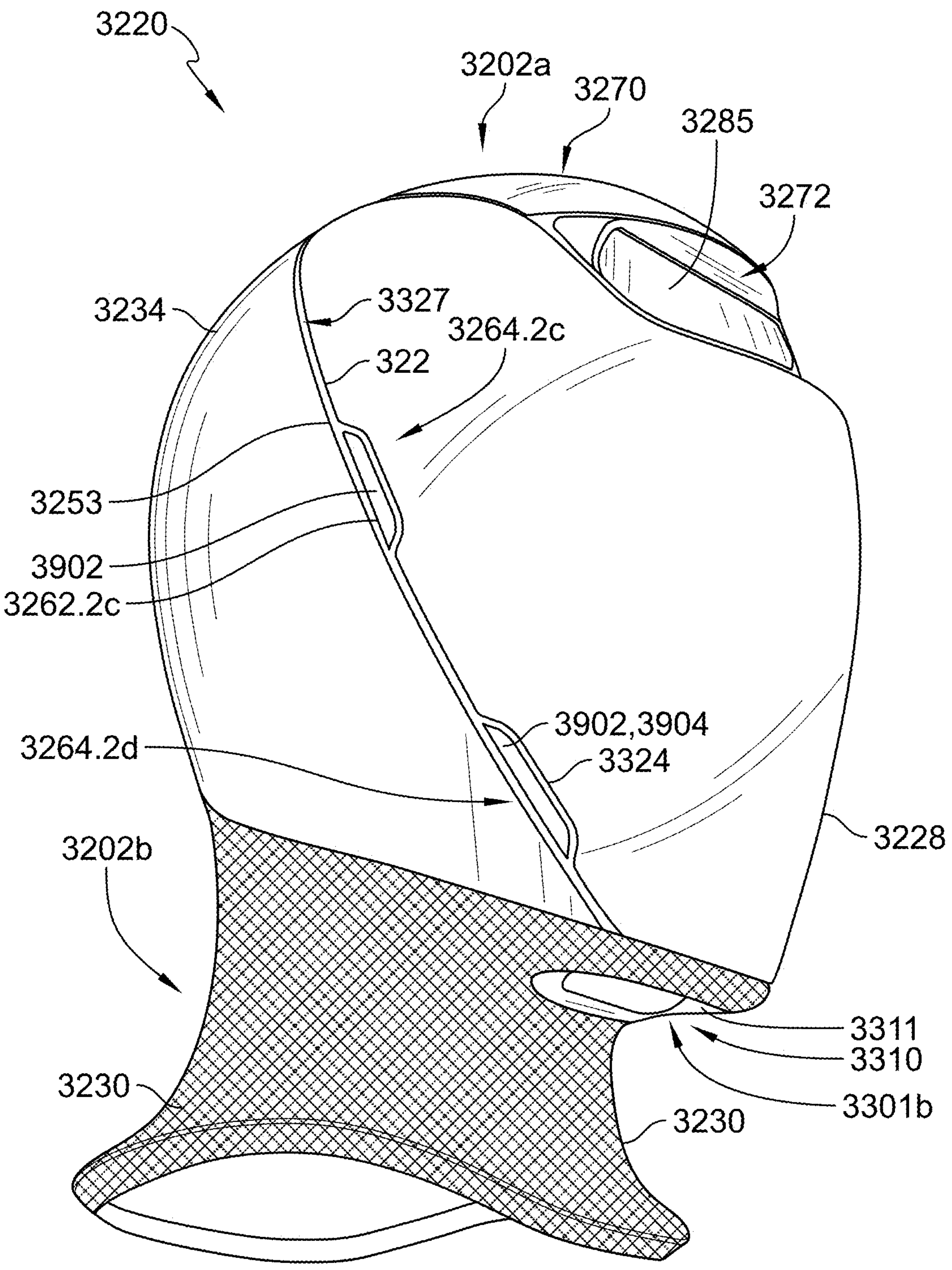
FIG. 23 is a lower perspective view of the third embodiment of the head and neck assembly of FIG. 22, wherein the head and neck assembly includes: (i) a head portion having: (a) a head housing assembly with a frontal shell, a rear shell, and an upper shell with an upper recessed sensor zone, (b) a head electronics assembly with an illumination assembly having at least one light emitter configured to emit light between an extent of the frontal shell and rear shell, and (ii) a neck portion having: (a) a neck housing assembly with a deformable cover and a lower recessed sensor zone, and (b) a neck electronics assembly.
Figure 24:
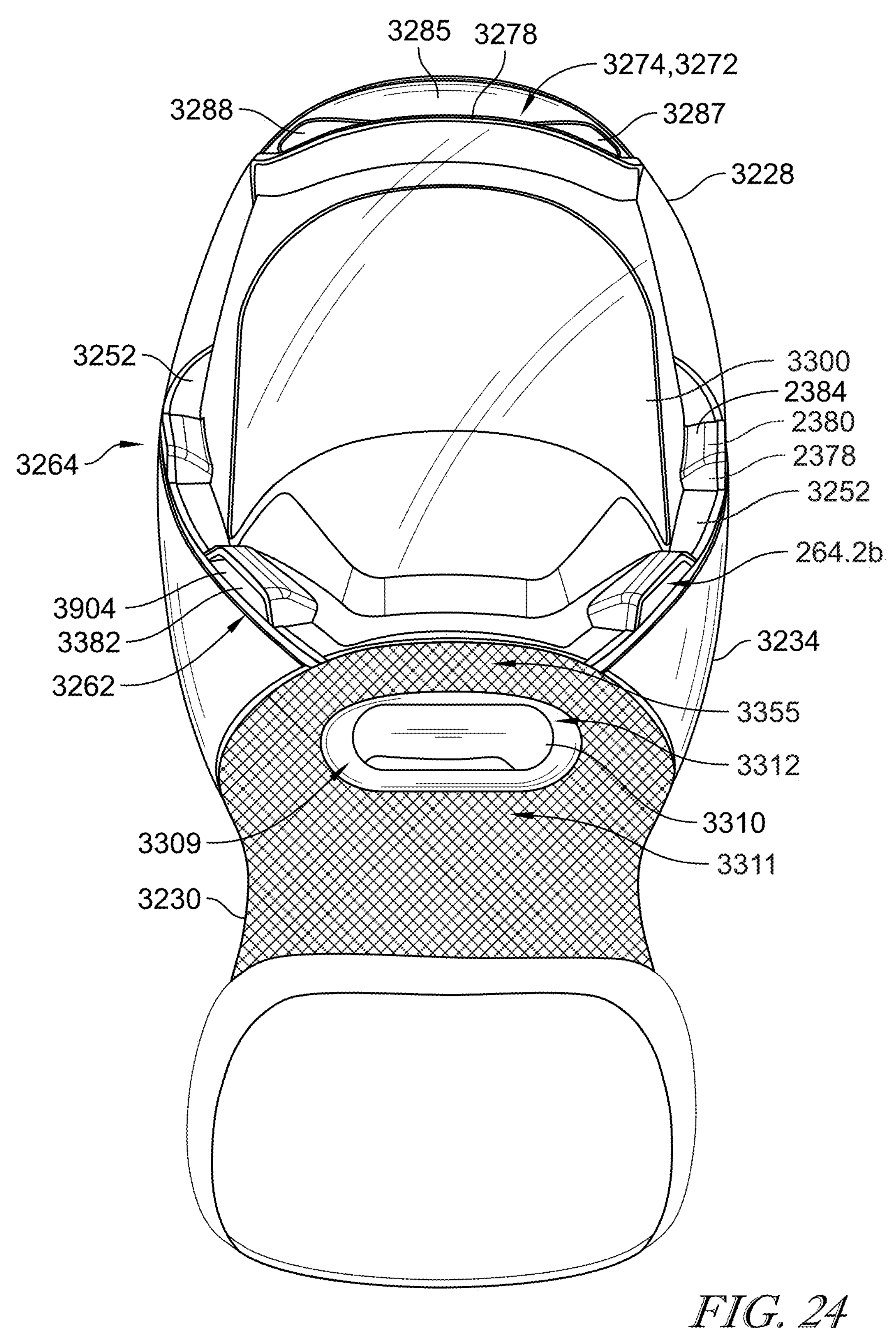
FIG. 24 is a bottom perspective view of the head and neck assembly of FIG. 22.
Figure 25:
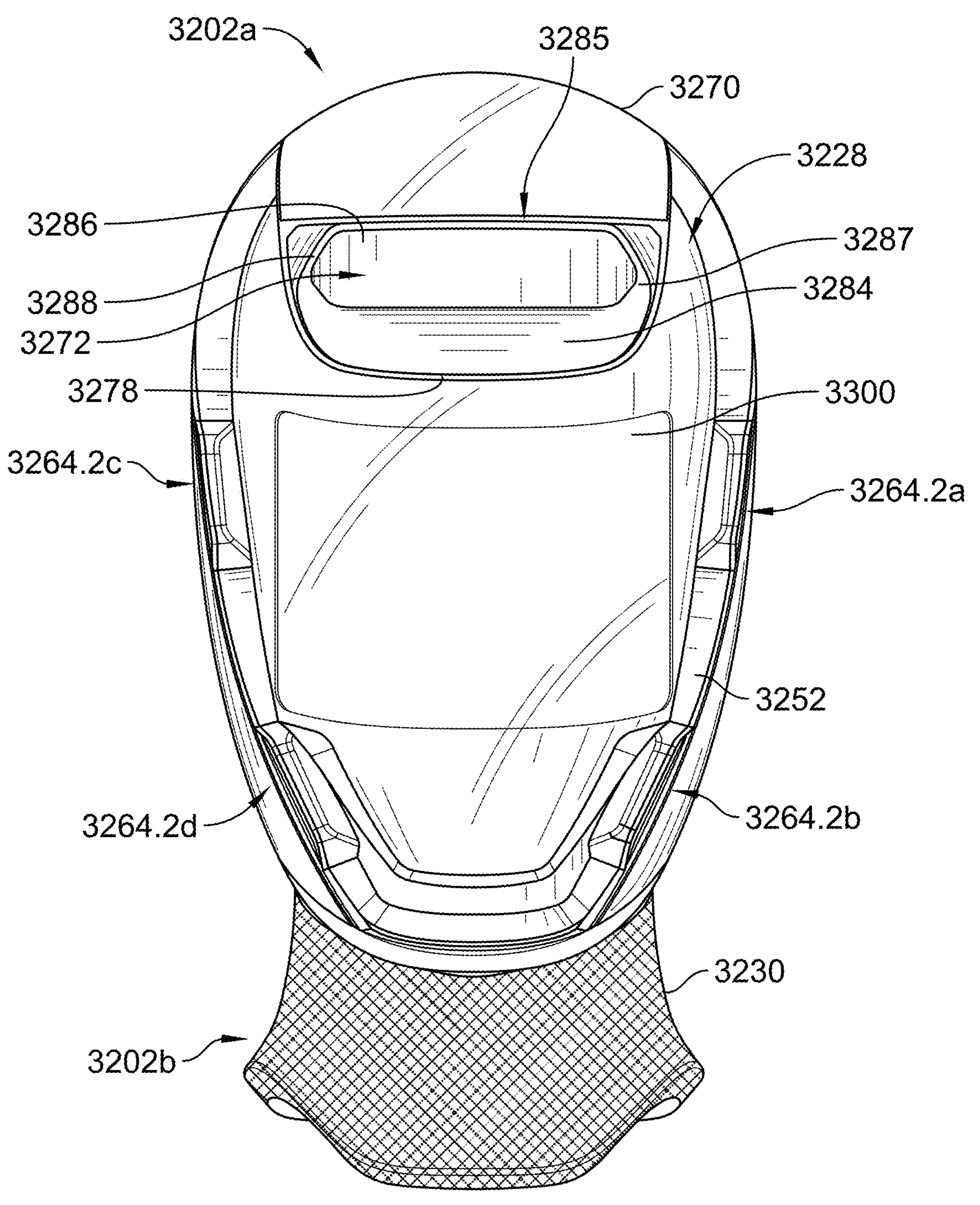
FIG. 25 is a front view of the head and neck assembly of FIG. 22.
Figure 50:
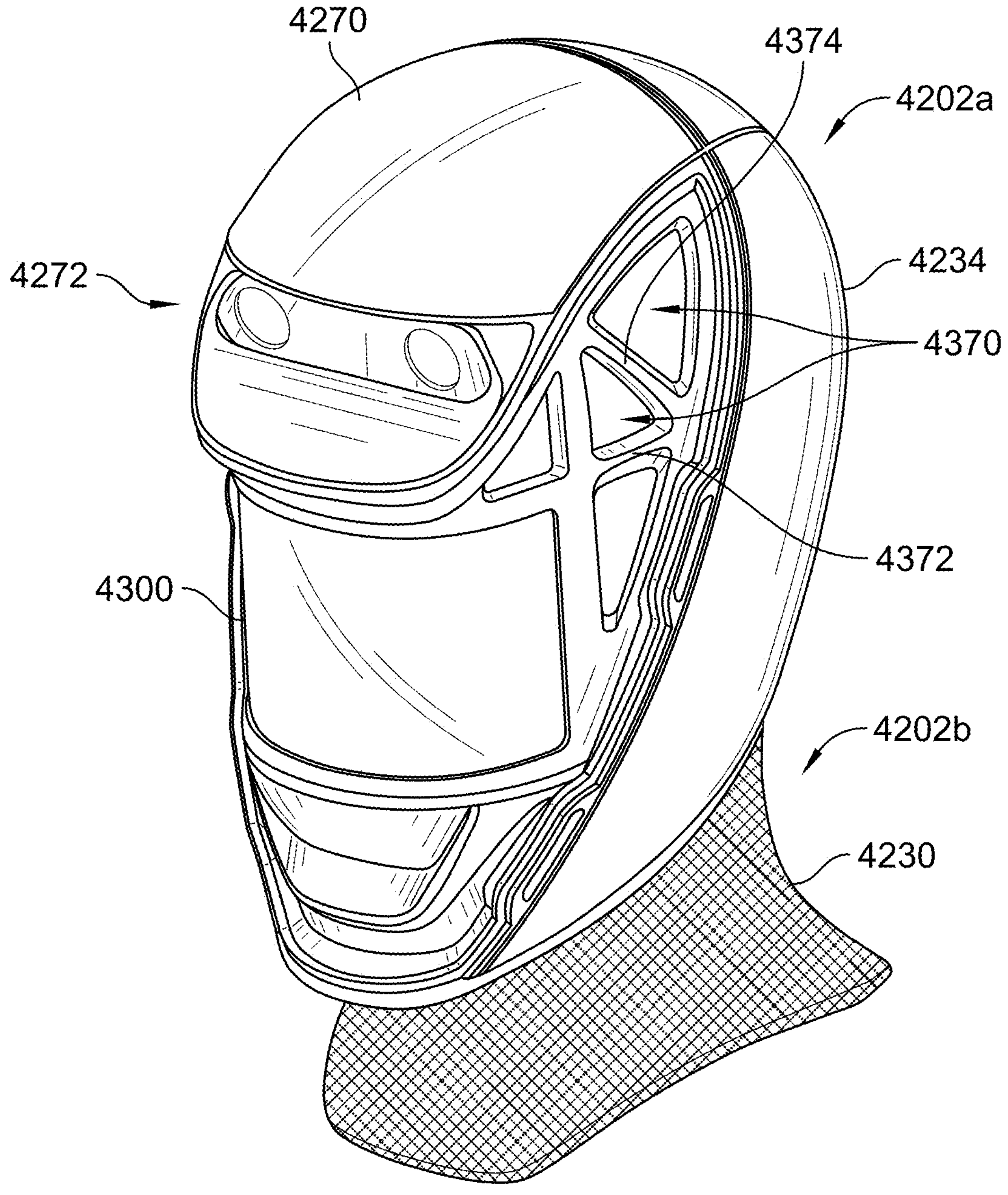
FIG. 50 is a perspective view of a third embodiment of a head and neck assembly, wherein the frontal shell is omitted from the housing assembly, the electronics frame further includes a plurality of support ribs, and the electronics assembly further includes a plurality of side displays coupled to the electronics frame.
Figure 51:
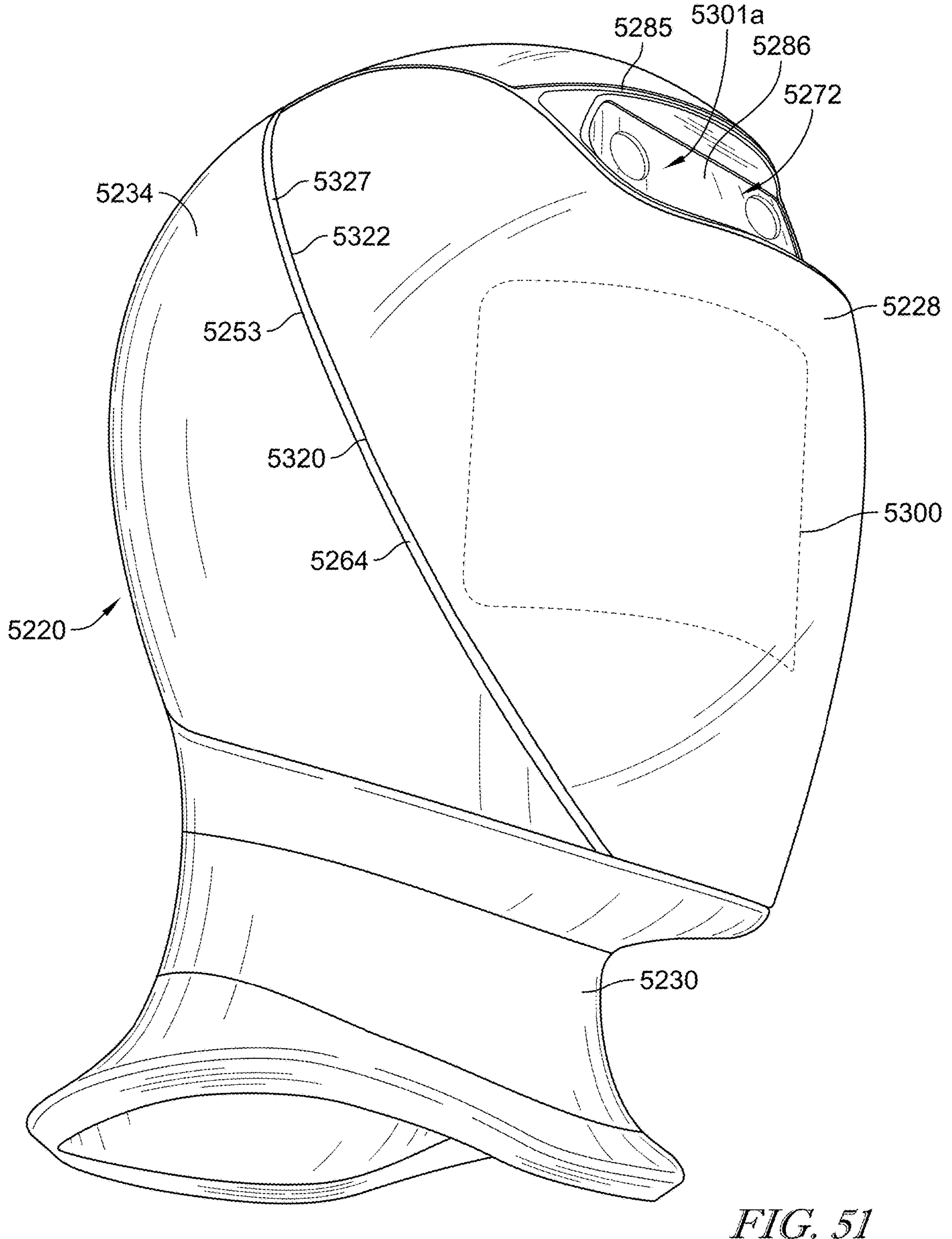
FIG. 51 is a perspective view of a fourth embodiment of a head and neck assembly, wherein the illumination assembly includes a plurality of light emitters that are positioned adjacent to a majority of the rear edge of said frontal shield.
Figure 52:
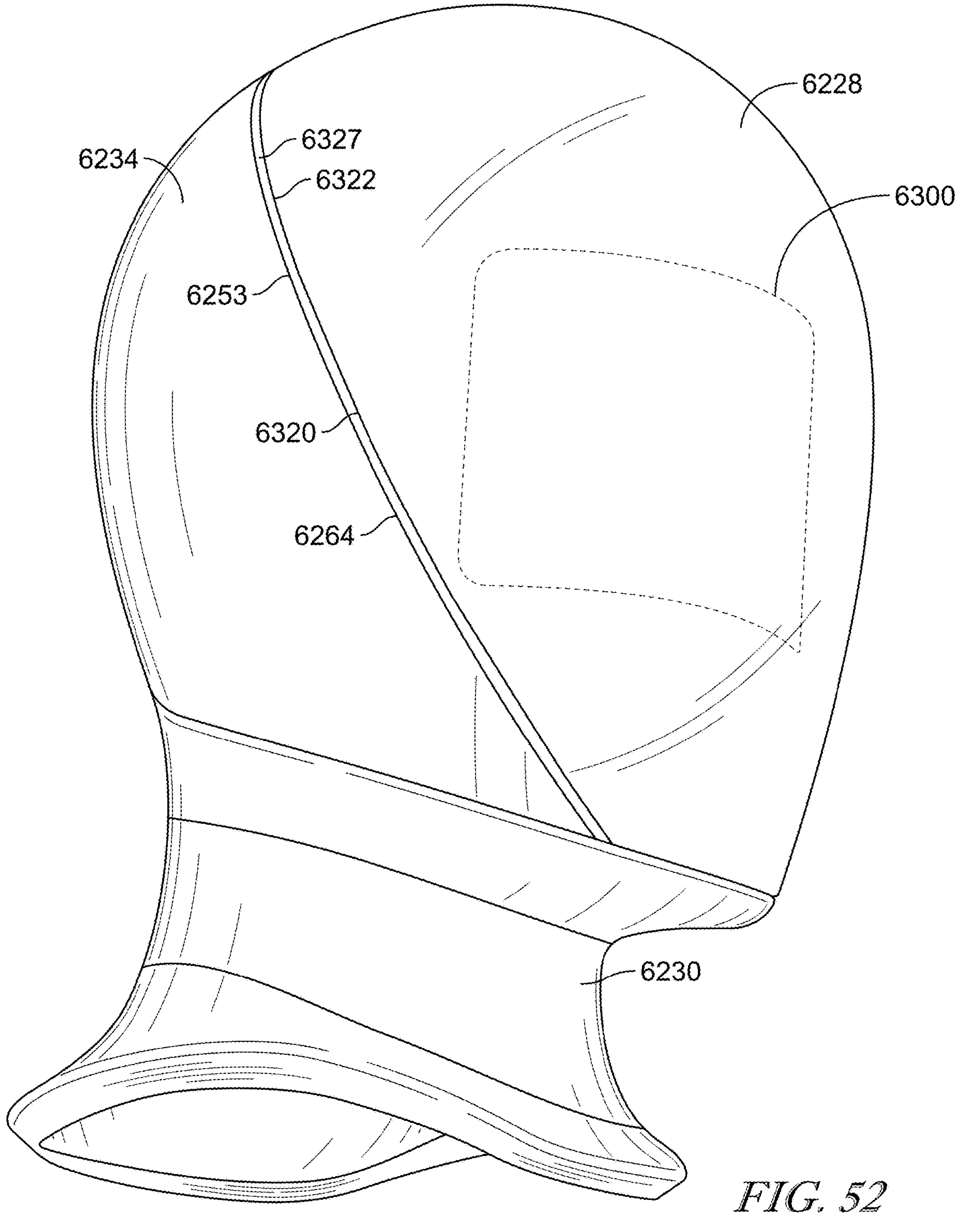
FIG. 52 is a perspective view of a fifth embodiment of a head and neck assembly, wherein the upper recessed sensor zone of the fifth embodiment has been omitted.

FIGS. 16-65C show thirteen alternative embodiments of the head and neck assembly that may be used interchangeably in connection with the different embodiments of the humanoid robots shown in FIGS. 1, 17, and 22. Each of the alternative embodiments has slightly different structures and configurations, but each embodiment is similar in structure, features, and generally tapered shape. As will be discussed below, the features and/or components of any given embodiment may be interchanged with, added to, or removed from the features and/or components of other embodiments. For example, a lower recess 3310, which is formed in the chin or mental region 3355 of the third embodiment (e.g., FIGS. 22-49) may be removed in a manner similar to how the lower recess was removed from the fourth, fifth, and sixth embodiments (e.g., FIGS. 50-52). Additionally, the utilization of a deformable material in the neck assembly, as well as the inclusion of actuators in said neck assembly to permit movement of the head, may be incorporated into the head and neck assemblies 202 of the first embodiment. It should be understood that these examples are illustrative only, and any feature and/or component may be interchanged, added to, or removed from any other embodiment disclosed herein.

1. Second Embodiment

Similar to the head and neck assembly 202 described above in connection with FIGS. 1-15B, FIGS. 16-21 illustrate a second embodiment of a head and neck assembly 2202. For the sake of brevity, the above disclosure in connection with the head and neck assembly 202 will not be repeated below, but it should be understood that like numerals represent generally similar or like structures in the various embodiments. For example, the disclosure regarding display 300 applies equally to display 2300. Further, it should be understood that the functionality and operation of the head and neck assembly 2202 is similar or identical to the features and functionality disclosed with respect to the head and neck assembly 202. It should be understood that any one or more features of the head and neck assembly 202 may be used in combination with those disclosed with respect to the head and neck assembly 2202, and that any one or more features of the head and neck assembly 2202 may be used in combination with those disclosed with respect to the head and neck assembly 202. The primary differences between head and neck assembly 202 and head and neck assembly 2202 comprise: (i) the housing assembly 2220, which further includes front and rear sensor recesses 2272, 2277 and an upper shell 2270, (ii) a frontal shell 2228 having a different shape as compared to frontal shell 228, and (iii) additional electronic devices included in an electronics assembly 2222 as compared to electronics assembly 222.

Similar to the first embodiment, and as shown in FIGS. 16-21, the housing assembly 2220 is configured to hold the display 2300 and at least one sensor, such as a plurality of cameras 2302, of the electronics assembly 2222, which are mounted on an electronics support 2254 and aligned with the sensor recess 2272. The vision system 2301V, and thereby the plurality of upper cameras 2302, includes: (i) a first camera 2302.2*a* with a front left field of view $FoV_L$ and a line of sight $LoS_L$, (ii) a second camera 2302.2*b* with a front middle field of view $FoV_M$ and a line of sight $LoS_M$, and (iii) a third camera 2302.2*c* with a front right field of view $FoV_R$ and a line of sight $LoS_R$. The lines of sight are parallel with one another and perpendicular to the frontal plane $P_F$ in a first direction, while being slightly angled relative to the frontal plane $P_F$ in a second direction. Finally, the vision system 2301V, and thus the plurality of upper cameras 2302, also includes a rear camera that has a field of view $FoV_{RR}$ and a line of sight $LoS_{RR}$, wherein said line of sight $LoS_{RR}$ is perpendicular to the rear plane PR in both directions.

As shown in these FIGURES, the front shell 2228 is configured to cover a front portion of the electronics assembly 2222 to locate at least a portion of the electronics assembly 2222 between a front cover 2252 and the frontal shell 2228. However, unlike the first embodiment, the housing assembly 2220 further includes the upper shell 2270. The inclusion of this upper shell 2270 was primarily a consequence of modifying the housing assembly 2220 to include front and rear sensor recesses 2272, 2277 that are positioned between the front and rear of the housing assembly 2220. The frontal sensor recess 2272 provides an inset region of the head portion 2202*a*, which beneficially minimizes potential distortion that may be caused by the curvilinear design of the front shell in the first embodiment. Thus, the vision system 2301V can forgo the use of complex algorithms to remove or attempt to remove the distortion caused by said curvilinear shield.

Figure 18:
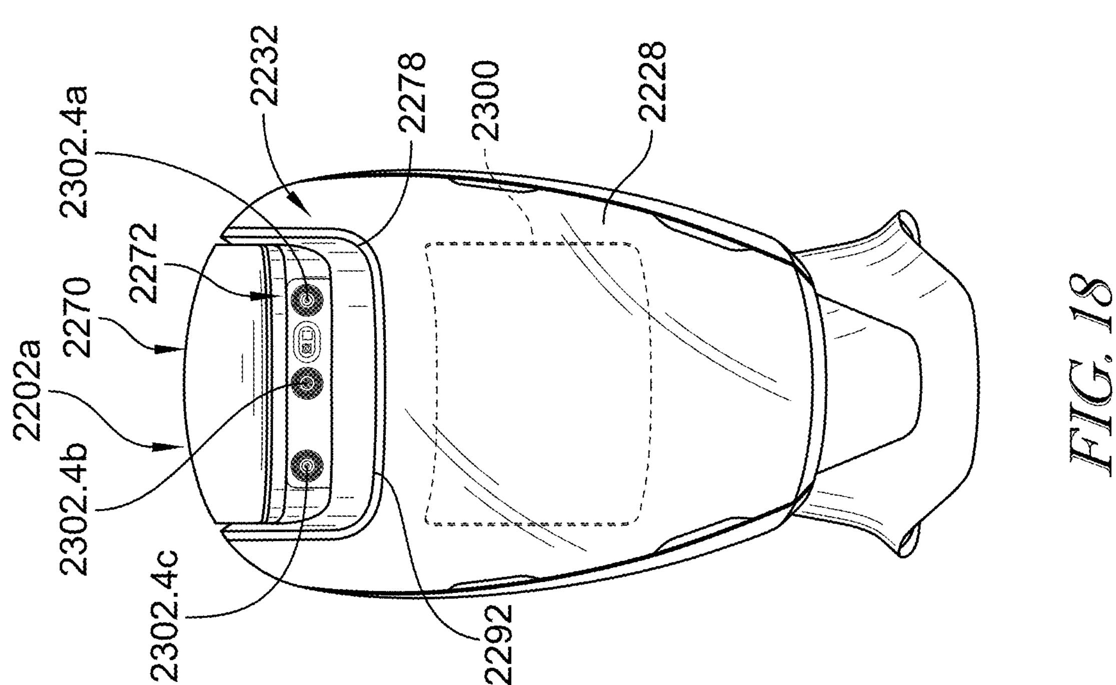
FIG. 18 is a front view of the head and neck assembly of FIG. 16.
Figures 20, 21:
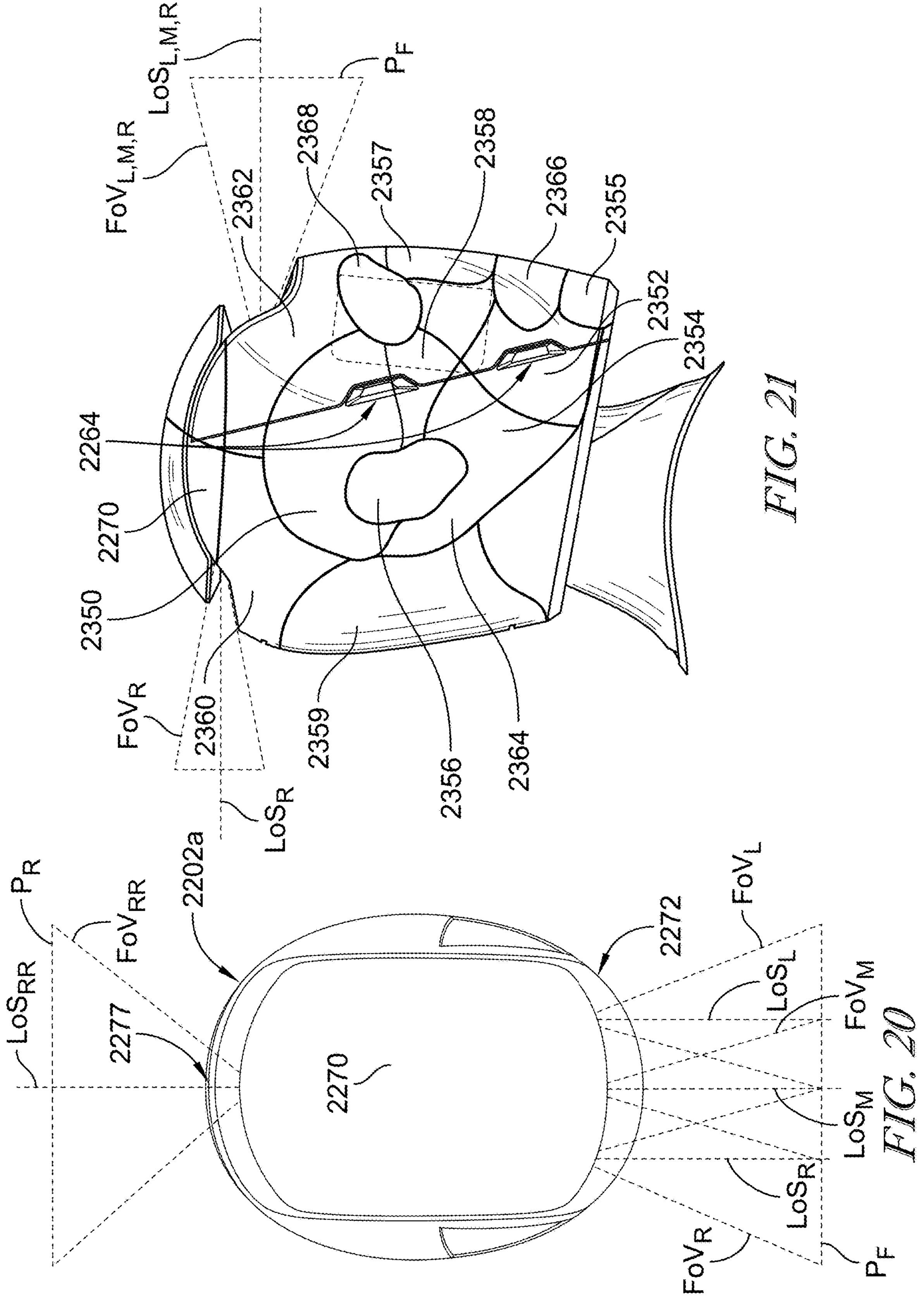
FIG. 20 is a top view of the head and neck assembly of FIG. 16 showing various fields of view of cameras included in the electronics assembly including three cameras facing in a forward direction of the robot and a single camera facing in a rearward direction of the robot.
FIG. 21 is a side view of the head and neck assembly of FIG. 16 showing various anatomical regions of the head portion and the field of view of the cameras located relative to the anatomical regions of the head portion.

The frontal sensor recess 2272 is positioned above the display 2300 and is designed to provide an inset region relative to the frontal shell 2228, thereby enabling secure integration and optimal functionality of the embedded sensors. Said frontal sensor recess 2272 includes a shelf 2284, an overhang 2285, a planar sensor cover 2286, and side walls 2287 and 2288, as illustrated in FIGS. 17 and 18. The sensor recess 2272: (i) is positioned above a substantial extent of the frontal shell 2228 and below the upper shell 2270, and (ii) forms a cavity that provides an unobstructed field of view for its upper cameras 2302 or other sensors. The shelf 2284 extends forward and downward from the planar sensor cover 2286 at a predefined angle, wherein said angle has been determined to avoid interference with the operational range of the sensors. This design of the shelf 2284 causes it to provide a lower bound of the above described cavity. It should be understood that in other embodiments, the shelf 2284 may not be angled and instead may be perpendicular, or substantially perpendicular, to the planar sensor cover 2286.

The overhang 2285, formed by the forward projection of the upper shell 2270 beyond the planar sensor cover 2286, serves both functional and protective roles and provides an upper bound of the above described cavity. Said overhang 2285 may act as a shield against environmental factors such as direct sunlight, precipitation, or debris, thereby enhancing the durability and reliability of the sensors (e.g., cameras). Additionally, the contoured surface connecting the shelf 2284 to the overhang ensures a seamless transition, reducing sharp edges or discontinuities that could compromise structural integrity or aesthetic appearance.

The recess 2272 is designed to ensure that the embedded sensors (e.g., cameras) remain optimally aligned within the recess 2272 and with the planar sensor cover 2286. The planar sensor cover 2286 serves as an optical window for the sensors (e.g., cameras) and is engineered to minimize distortion or interference. For example, the cover 2286 may be constructed from optical-grade transparent material if it houses visual sensors, ensuring minimal attenuation or aberration. The side walls 2287 and 2288, which enclose the recess 2272 and therefore provide the lateral bounds for the above described cavity, provide structural rigidity and additional protection against lateral impacts. The curvilinear border 2278, which extends from the edge of the shelf 2284 to the upper shell 2270, enhances the visual and functional integration of the recess into the housing assembly 2220. This border not only defines the spatial limits of the recess but also contributes to the overall structural cohesiveness by distributing mechanical stresses evenly across the shell. Furthermore, the continuous surface of the upper shell 2270, extending seamlessly from its rear edge to the sensor recess, ensures aerodynamic and structural consistency, rendering the design suitable for high-speed applications.

The structural relationship between the sensor recess 2272 and the frontal shell 2228 is designed to achieve both physical robustness and functional harmony. The continuous surface of the upper shell 2270, extending from its rear edge to the sensor recess, creates a unified framework that enhances the structural rigidity of the assembly. This integration ensures that mechanical stresses, such as those resulting from impacts or vibrations, are distributed across the entire housing assembly, thereby minimizing localized deformation or failure. Additionally, the shelf 2284 is configured to interlock with the frontal shell 2228 through complementary geometries, such as grooves or notches, ensuring precise alignment and a secure fit. This interlocking mechanism enhances the structural bond between the two components, preventing dislodgement during operation. The overhang 2285 further strengthens this relationship by providing a protective canopy that shields the junction between the recess and the frontal shell, thereby mitigating environmental exposure and mechanical wear.

The sensor recess 2272, along with its associated components, is typically fabricated using high-strength, lightweight materials that meet the dual requirements of mechanical durability and environmental resilience. These materials may include advanced polymers, such as polycarbonate or acrylonitrile butadiene styrene (ABS), or lightweight metal alloys, such as aluminum or titanium, depending on the specific application. For applications demanding enhanced electromagnetic shielding, the sensor recess 2272 and surrounding structures may be coated with conductive materials or integrated with Faraday cage-like features to minimize interference. The manufacturing process may involve precision injection molding for polymer components or CNC machining for metallic elements to achieve the tight tolerances necessary for aligning the recess with the sensor cover 2286 and ensuring compatibility with the broader housing assembly 2220. Surface treatments, such as anodizing, powder coating, or weather-resistant coatings, may be applied to enhance longevity and resistance to wear and environmental exposure. In cases where optical sensors are employed, the planar sensor cover 2286 may be fabricated from optical-grade materials with anti-reflective coatings, ensuring clear transmission and minimal distortion of incoming signals.

The sensor cover 2286 is positioned between the overhang 2285 and the shelf 2284 and is substantially parallel with the lenses of the cameras 2302 located behind the sensor cover 2286. The sensor cover 2286 is made of a material that does not obscure a signal detected by the sensor(s). For example, the sensor cover 2286 may be a planar cover made of a transparent material that allows the upper cameras 2302 to receive images, preferably undistorted images. Additionally and/or alternatively, the sensor cover 2286 may have openings formed therein for receiving an extent of a sensor (e.g., a camera lens). In further embodiments, the upper sensor recess 2272 may be omitted, and the frontal shield 2228 may include openings formed therein for receiving an extent of a sensor (e.g., a camera lens). The sensor cover 2286 can include one or more sensor openings 2304 that are set back or recessed from the front of the housing assembly 2220. The sensor openings 2304 are positioned to correspond with the upper camera(s) 2302 of the electronics assembly 2222. The sensor openings 2304 are partially protected by an overhang of the upper shell 2270 that protrudes over the sensor openings 2304.

To further ensure that the frontal shell 2228 does not distort the field of view of the vision system 2301V, said frontal shell 2228 includes a main body 2228*a*, two wing-like projections 2228*b*, 2228*c* that extend upward from the main body 2228*a*, and a central notch 2274 that is positioned between the two wing-like projections 2228*b*, 2228*c*. As such, the frontal shell 2228 is designed to at least partially surround (e.g., on three sides) and/or conform to the sensor recess 2272. Surrounding or conforming to the sensor recess 2272 is primarily achieved by allowing the wing-like projections 2228*b*, 2228*c* to flank the upper sensor recess 2272 and have extents positioned adjacent to the curvilinear border 2278 of the upper sensor recess 2272. Additionally, when viewed from the side, the frontal shell 2228 may have a rearwardly sloping, substantially linear edge 2276 with a forward angle (e.g., extending rearward from horizontal) between approximately 90 degrees and 140 degrees, preferably approximately 110 degrees from horizontal when the robot is in a normal vertical position (wherein the sagittal and coronal planes of the head are aligned with the sagittal and coronal planes of the robot).

Similar to the first embodiment, the frontal shell 2228 is shaped to resemble the form of the head 2202*a*, providing a substantially continuous surface between the upper shell 2270 and sensor recess 2272 to the rear shell 2234. The curvature of the frontal shell 2228 may vary and may have different curvatures (i.e., radii and arcs) at different positions along the frontal shell 2228. The frontal shell 2228 may include light recesses 2324 to conform with the shape of light emitter housings 2262.2*a*, 2262.2*b*, 2262.2*c*, 2262.2*d*. As shown in FIGS. 16-21, the frontal shell 2228 may also include a curved upper surface or rim 2292 defining the slot 2274 and having a shape that substantially matches the curvilinear border 2278. The curved upper surface or rim 2292 of the frontal shell 2228 serves multiple purposes in the design of the humanoid robot's head. By defining the slot 2274 and matching the shape of the curvilinear border 2278, it creates a seamless transition between the main body 2228*a* and the wing-like projections 2228*b*, 2228*c*. This design element not only enhances the aesthetic appeal of the robot's head but also contributes to its functionality. The curved rim 2292 helps to channel any potential debris or moisture away from the sensor recess 2272, thereby providing an additional layer of protection for the sensitive components housed within. Its shape also aids in reducing wind resistance and minimizing turbulence around the head during movement, which could potentially interfere with sensor readings or cause unwanted vibrations. Furthermore, the curvature of the rim 2292 complements the overall ergonomic design of the head, creating a more natural and less intimidating appearance for human interaction.

The rear sensor recess 2277 is a notable addition in the second embodiment, providing enhanced functionality to the head design. This recess may function either as a viewport for a rear-facing camera 2305 or as a ventilation system. As a viewport, it allows the robot to have visual awareness of its surroundings behind it, potentially improving navigation and obstacle avoidance capabilities. This feature could be particularly useful in crowded or dynamic environments where threats or objects of interest may approach from behind. When utilized as a vent, the rear sensor recess 2277 can aid in the thermal management of the head's internal components. By allowing airflow into and out of the head 2202*a*, it facilitates cooling of the electronics assembly 2222. This cooling can be passive, relying on natural convection, or active, utilizing one or more internal fans to force air circulation. Effective thermal management is essential for maintaining optimal performance and longevity of the electronic components, especially in scenarios where the robot may be operating for extended periods or in high-temperature environments.

The structural design of the rear sensor recess 2277 mirrors, or substantially mirrors, that of the front sensor recess 2272, featuring a shelf 2294, an overhang 2295, a sensor cover 2296, and a pair of side walls or edges 2297, 2298. This symmetry in design not only provides a cohesive aesthetic but also ensures consistent protection and functionality for both front and rear sensors. The shelf 2294 not only deflects debris and liquids but may also reduce glare and unwanted light reflections that could interfere with camera functionality or sensor readings. This design element is particularly beneficial in outdoor or brightly lit environments where light interference could compromise the accuracy of visual data collection or other sensor measurements. Additionally, the shelf 2294 may act as a natural heat sink, helping to dissipate thermal energy generated by the sensors or other electronic components housed within the recess. The sensor cover 2296 that is positioned within the rear sensor recess 2277 may feature anti-reflective coatings or polarizing filters to enhance image quality. If used for ventilation, the cover 2296 could be designed with hydrophobic and oleophobic properties to repel water and oil, thereby maintaining clear airflow even in challenging environments. Also, beyond reducing glare and/or aiding in channeling airflow into the housing, the side walls or edges 2297, 2298 may also incorporate electromagnetic shielding and/or vibration-dampening materials.

2. Third Embodiment

Similar to the head and neck assemblies 202, 2202 described above in connection with FIGS. 1-21, FIGS. 22—illustrate a third embodiment of a head and neck assembly, designated 3202. For the sake of brevity, the above disclosure in connection with head and neck assemblies 202, 2202 will not be repeated below, but it should be understood that like numerals represent generally similar or like structures in the various embodiments. For example, the disclosure regarding display 300 applies equally to display 3300. Further, it should be understood that the functionality and operation of the head and neck assembly 3202 are similar or identical to the features and functionality disclosed with respect to the head and neck assemblies 202, 2202. It should be understood that any one or more features of the head and neck assemblies 202, 2202 may be used in combination with those disclosed with respect to the head and neck assembly 3202, and that any one or more features of the head and neck assembly 3202 may be used in combination with those disclosed with respect to the head and neck assemblies 202, 2202. The primary differences between head and neck assembly 2202 and head and neck assembly 3202 are the fact that head 3202*a* does not include the rear sensor recess 2277, includes a lower sensor cover 3310, includes a deformable neck shell 3230, and includes an electronics assembly 3222 with additional devices and components utilized in the operation of the robot.

i. Upper Shell

The head 3202*a* includes an upper shell 3270 having a recessed sensor region 3272 at a front end of the upper shell similarly to the housing assembly 2220 of the second embodiment. However, a rear end of the upper shell 3270 is substantially flush with the rear shell 3234, such that there is no recessed region in this area. In some examples, the upper shell 3270 may further include a recessed area 3280. The recessed area 3280 may be configured to hold a top shell 3282, which is included in the upper shell 3270 and has a shape conforming to the shape of the recessed area 3280.

ii. Neck Shell

The disclosed head and neck assembly 3202 may include one or more actuators 140, 802 that allow the head to: (i) twist or rotate, and (ii) tilt or change pitch. Unlike conventional robots, these actuators are hidden underneath a deformable neck shield 3230. Movement of the actuators causes the deformable neck shell 3230 to deform and accommodate such movements. The deformable neck shield 3230 is designed to extend to the jaw line of the head enclosure and into a rear extent of the head enclosure; it does not extend into the side regions of the head. This configuration ensures that the neck shield 3230 is sufficiently attached to the head, yet minimizes the head's surface area covered by the deformable neck shield 3230. Minimizing the coverage of the deformable neck shield 3230 in the side regions of the head allows for the inclusion of more durable materials in these regions without necessitating overlapping materials. This is beneficial over conventional robot heads because it reduces material usage and/or increases the lateral protection for the electronics contained within the head.

The deformable neck shield 3230 may be constructed from a variety of flexible and durable materials to accommodate the dynamic movements of the humanoid robot's head 3202*a* (e.g., twisting and pitching of the head), while maintaining a sleek and functional appearance (e.g., without pinching or bunching). Suitable materials for the deformable neck shield 3230 may include stretchable fabrics such as spandex, neoprene, or polyester blends, which offer elasticity and resilience. Alternatively, deformable plastics, such as thermoplastic elastomers (TPE), silicone, or polyurethane, may be employed to provide both flexibility and durability. The neck shell 3230 may feature a multi-layered construction, wherein an inner layer provides comfort and protection to internal components, while an outer layer enhances the aesthetic appeal and protects against environmental factors such as dust, moisture, and UV radiation. In some embodiments, the deformable neck shield 3230 may incorporate reinforced sections or embedded support structures to ensure durability in high-stress areas, such as at the base or connection points. These reinforcements could be achieved through the integration of flexible mesh fabrics, carbon fiber inserts, or Kevlar-like materials to prevent wear and tear over prolonged use. Additionally, the deformable neck shield 3230 may include a memory fabric or shape-retentive polymer that assists it in returning to its original state after deformation, thereby ensuring consistent performance and appearance.

To further enhance its functionality, the neck shell 3230 may be designed with a segmented or accordion-like structure, allowing for smoother and more controlled movements in all directions without creating folds or creases that could interfere with the robot's appearance or performance. The design may also include strategically placed ventilation holes or breathable sections to prevent heat buildup within the neck area, particularly when the robot operates for extended periods. Variations of the neck shell 3230 may also include customizable surface finishes, such as matte, glossy, or textured coatings, to align with the robot's intended use case or aesthetic requirements. In some cases, the neck shell 3230 may be treated with hydrophobic or anti-static coatings to improve its resistance to environmental contaminants. Additionally, the neck shell 3230 may incorporate sensors, such as strain gauges or pressure sensors, to monitor the stress and strain experienced during head movements, providing feedback to the robot's control system for more precise motor adjustments. In certain implementations, the neck shell 3230 may also be modular or interchangeable, allowing for easy replacement or customization. For example, different neck shell designs could be utilized depending on the environment in which the robot operates—a rugged, weather-resistant version for outdoor use, or a sleek, soft-touch version for indoor customer interactions. The modular design could also facilitate quick repairs and maintenance, ensuring minimal downtime for the robot.

iv. Electronics Support Frame

The frontal shell 3228 and the display 3300 are mounted to an electronics support frame or shielded portion 3288, wherein said electronics support frame 3288 is essentially a combination of the intermediate cover and electronics support of the first embodiment. The shielded portion 3288 may include a substantial surface that extends from a curvilinear border 3290, which surrounds an extent of the upper shell 3270 and sensor recess 3272, to a rim 3292. The shielded portion 3288 may include a display opening 3294 positioned to receive the mounted display 3300. The display 3300 may be rectangular with a curvature. The shielded portion 3288 may be shaped with contours around the display opening 3294 to receive the curved shape of the display 3300 without obstructing the view. The shielded portion 3288 may also have a taper and/or include additional contours between the display opening 3294 and the rim 3292. The rim 3292 may include lighting recesses or light emitter housings 3262.2*a*, 3262.2*b*, 3262.2*c*, 3262.2*d* formed within the rim 3292 to receive light emitting assemblies 3264.2*a*, 3264.2*b*, 3264.2*c*, 3264.2*d* of the electronics assembly 3222. Although the illustrative embodiment shows the frontal shell 3228 sized to fit within the shielded portion 3288, the frontal shell 3228 may occupy any portion or ratio of the robot's head and may have any configuration, or may be omitted. In some embodiments, the frontal shell 3228 is optional.

Figure 28:
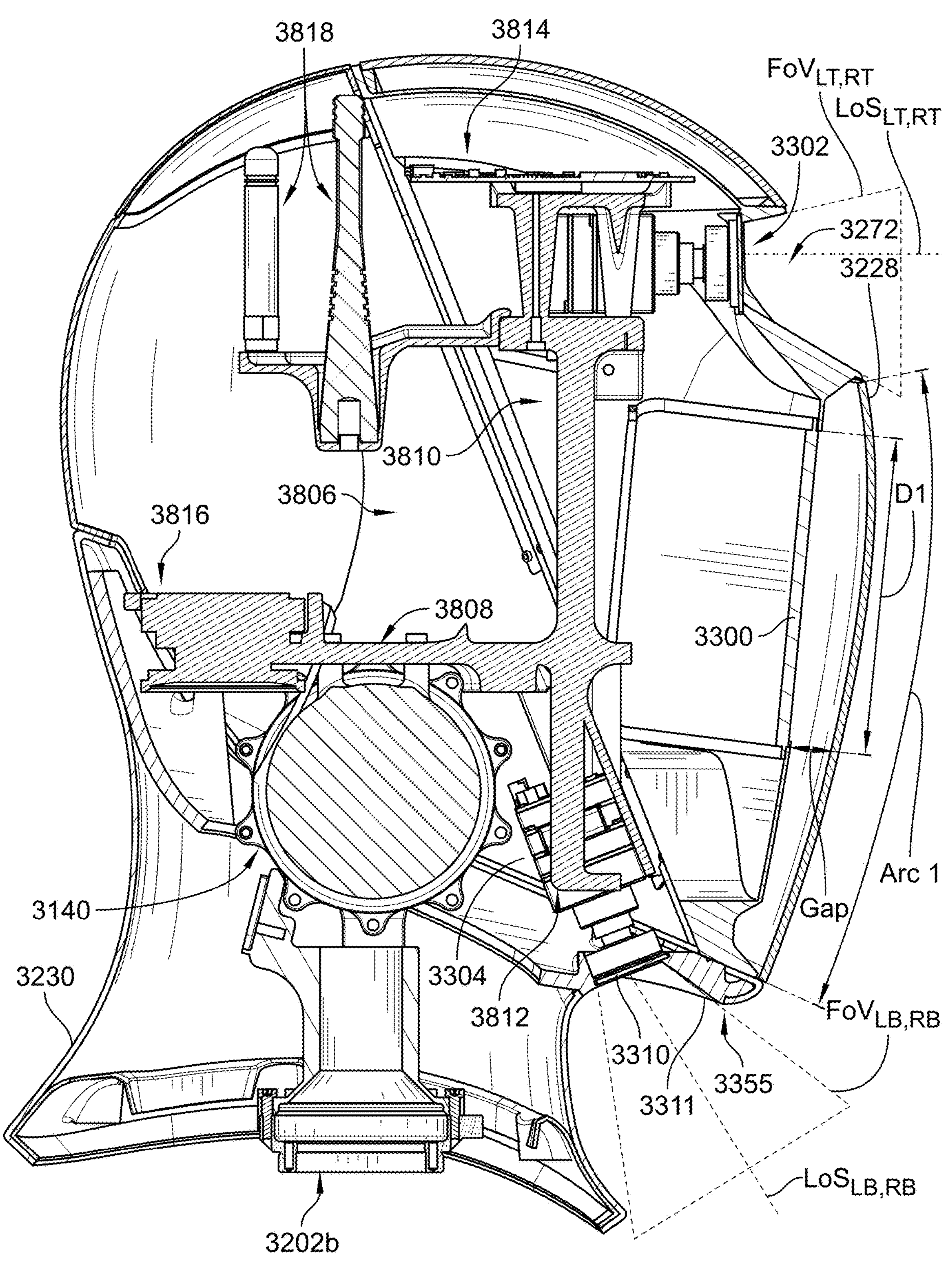
FIG. 28 is a cross section of the head and neck assembly of FIG. 22 showing various compartments in the head housing portions of the electronics assembly.
Figure 29:
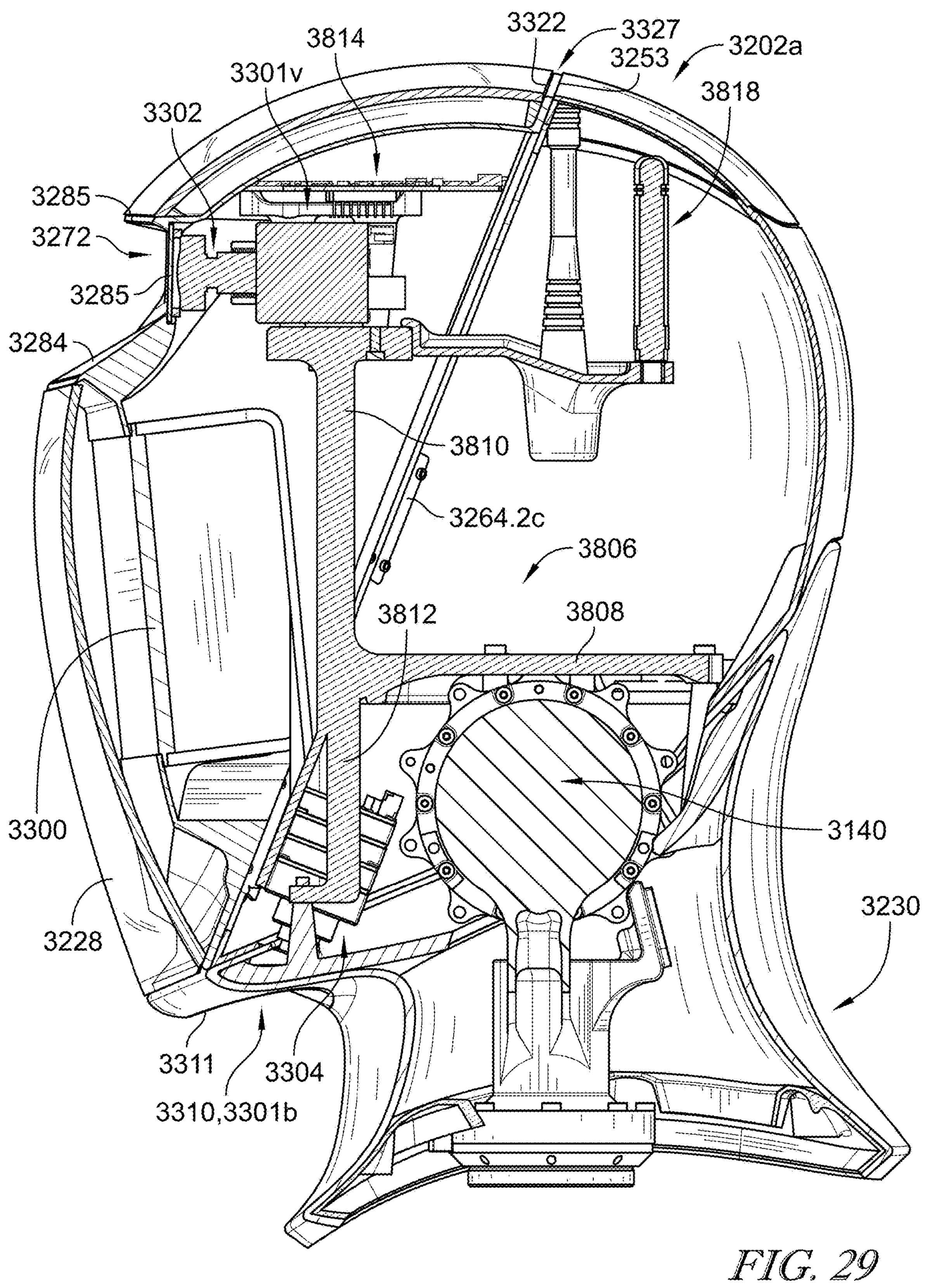
FIG. 29 is another cross section of the head and neck assembly of FIG. 22.
Figure 30:
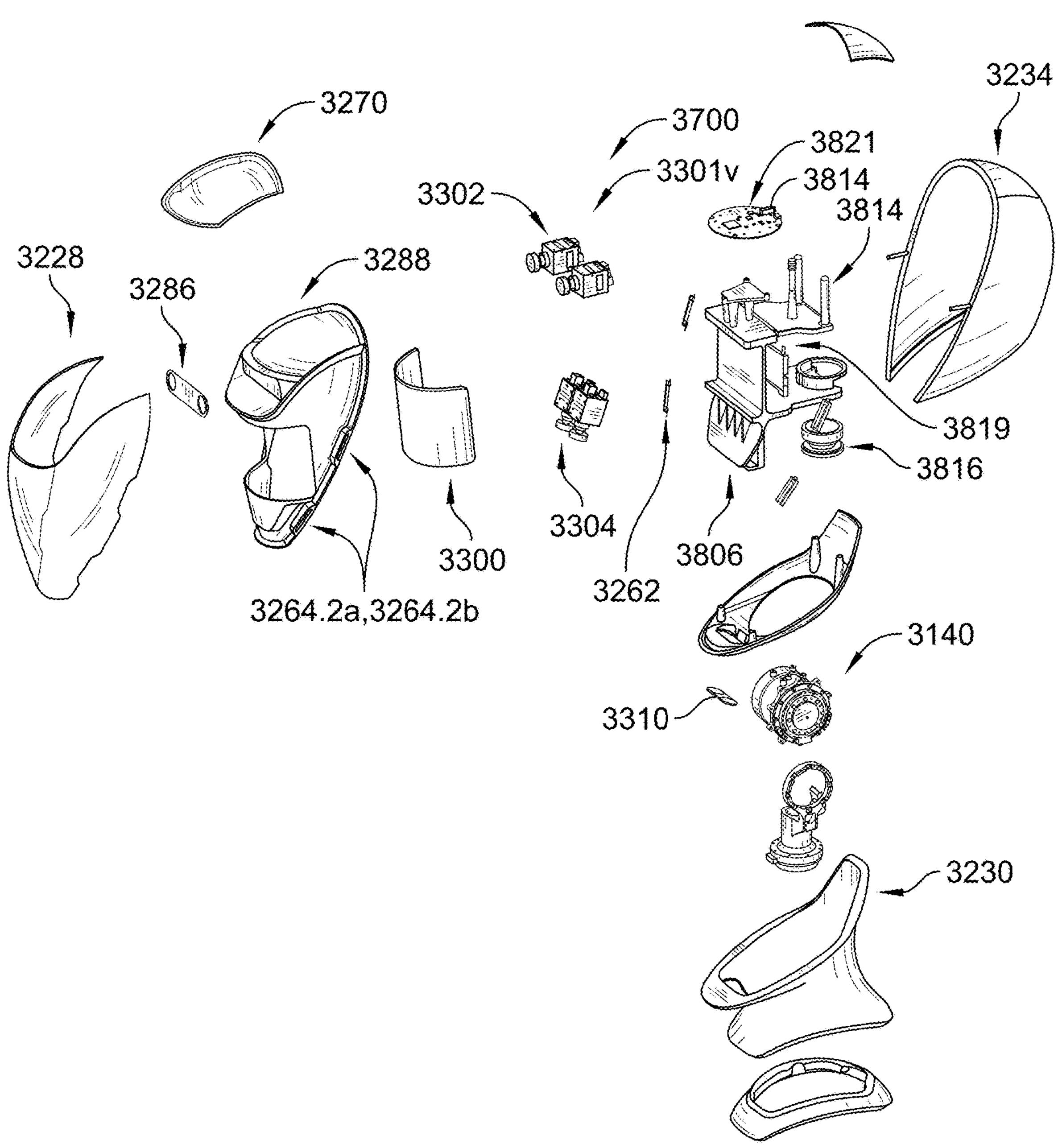
FIG. 30 is an exploded assembly view of the head and neck assembly of FIG. 22.

As shown in at least FIGS. 28-30, the components of the electronics assembly 3222 may be mounted to an internal mounting frame 3806, which is configured to arrange the individual items in a space-saving manner. The internal mounting frame 3806 includes at least an actuator mount 3808, an upper sensor mount 3810, and a lower sensor mount 3812. The actuator mount 3808 couples to the housing of the head nod actuator assembly 3140 and is configured such that the entire internal mounting frame 3806 and attached components move correspondingly with the position of the actuator. As noted above, the housing 3220 is configured to enclose the electronics assembly 3222 without interfering with the transmission or reception of signals. For example, the housing 3220 does not obscure the line of sight or field of view of the sensors.

v. Sensor Assembly and Lower Recess

Figures 33, 34:
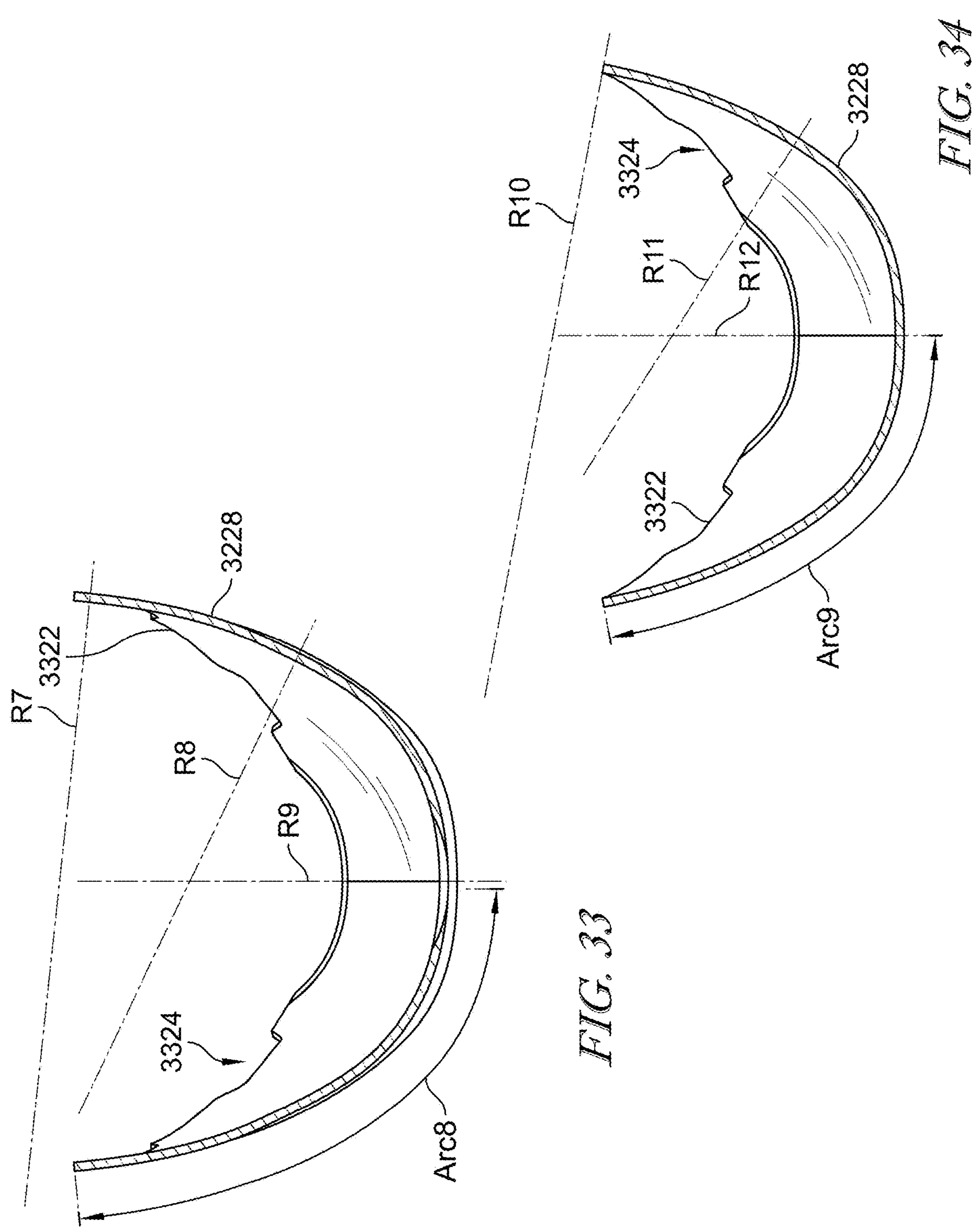
FIG. 33 is a cross-sectional view of the frontal shell of FIG. 22 and showing three different radii of curvatures.
FIG. 34 is a cross-sectional view of the frontal shell of FIG. 22 and showing three different radii of curvatures.
Figures 35, 36, 37:
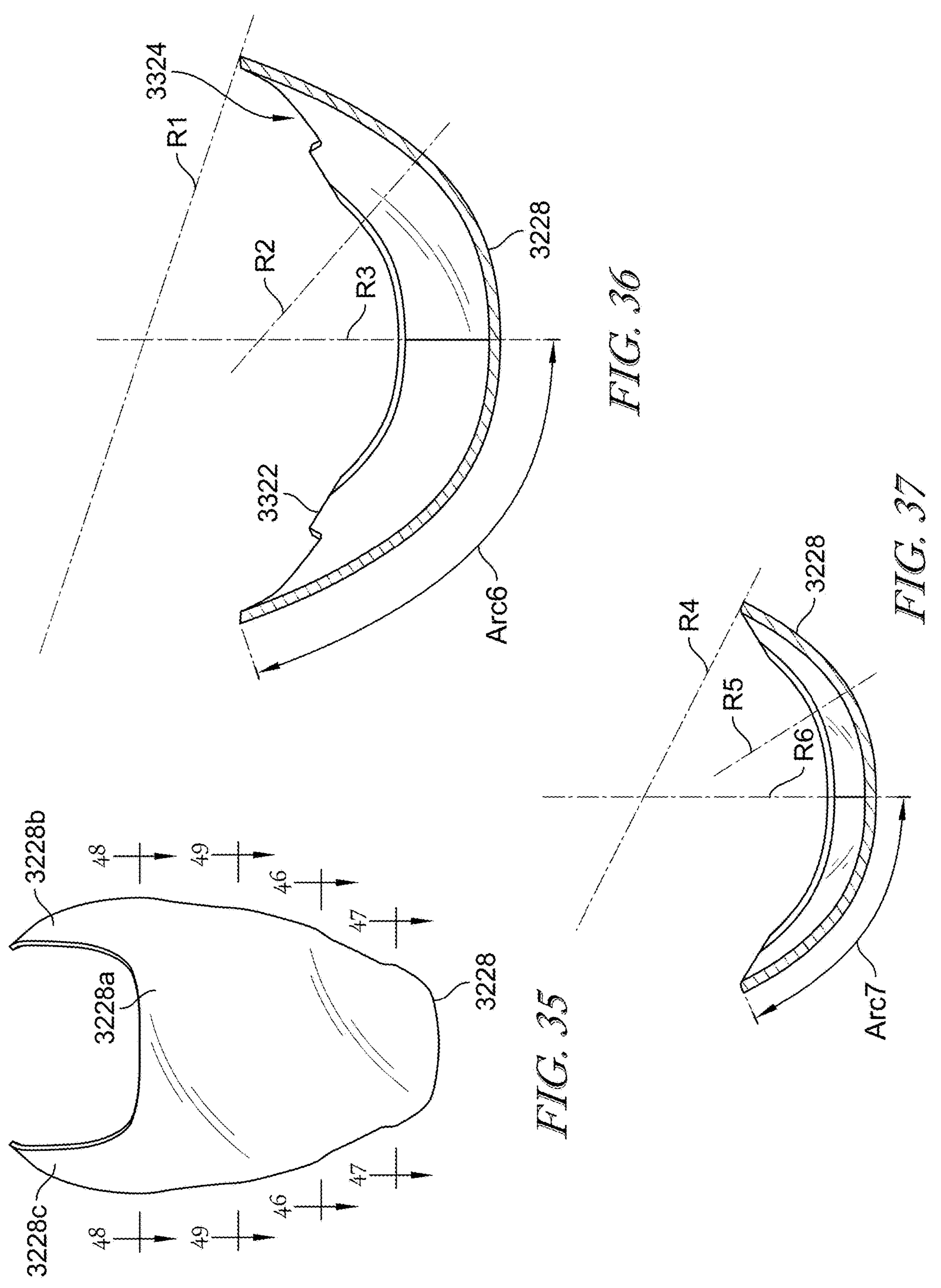
FIG. 35 is a front view of the frontal shell of the head and neck assembly of FIG. 22.
FIG. 36 is a cross-sectional view of the frontal shell of FIG. 22 showing three different radii of curvatures.
FIG. 37 is a cross-sectional view of the frontal shell of FIG. 22 and showing three different radii of curvatures.
Figures 38, 39:
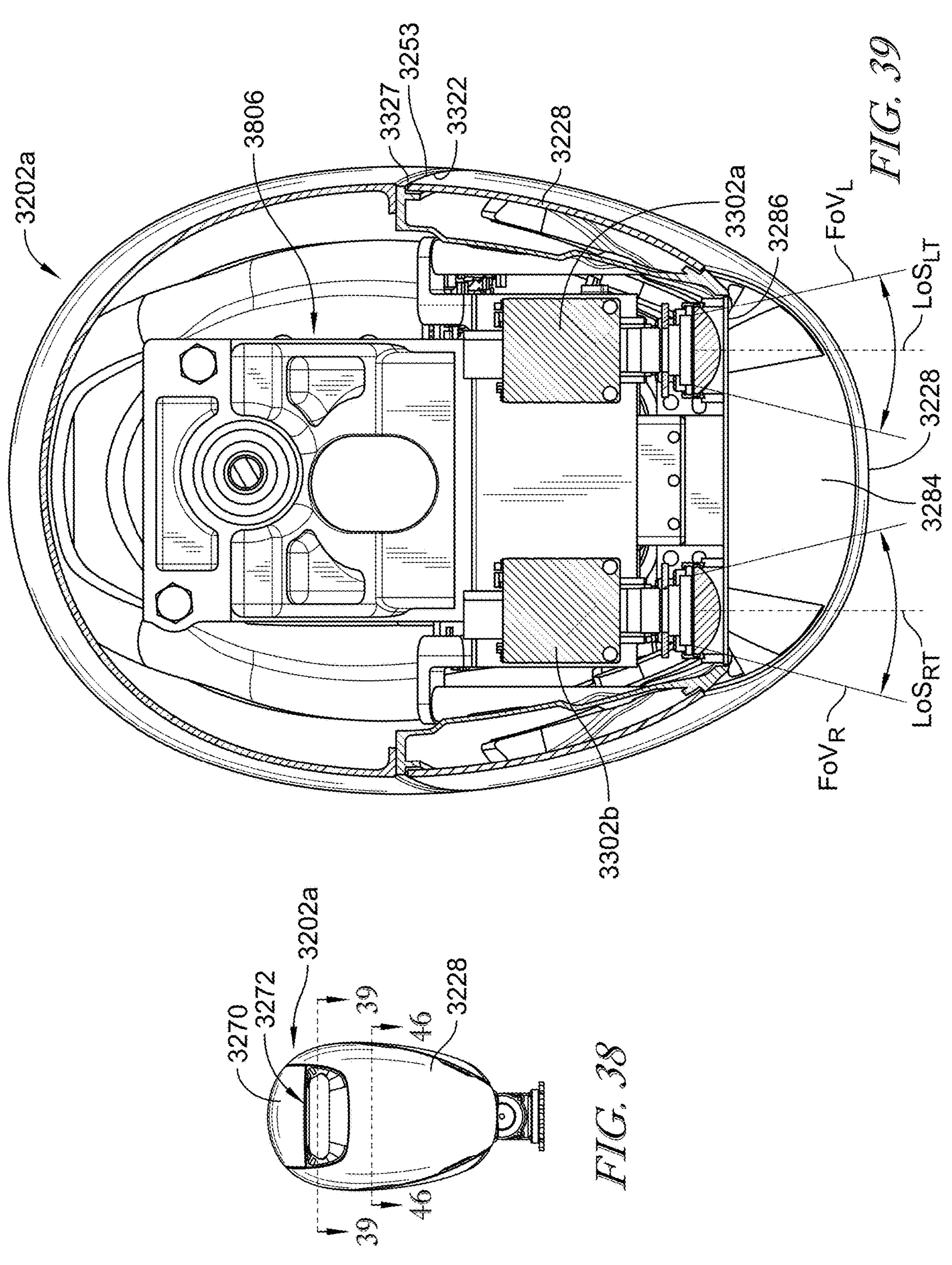
FIG. 38 is a front view of the head and neck assembly of FIG. 22 with a cover of the neck assembly removed.
FIG. 39 is a cross section of the head and neck assembly of FIG. 38 taken along line 39-39 showing the electronics assembly including a sensor assembly having two cameras arranged to face in a forward direction of the robot.
Figure 41:
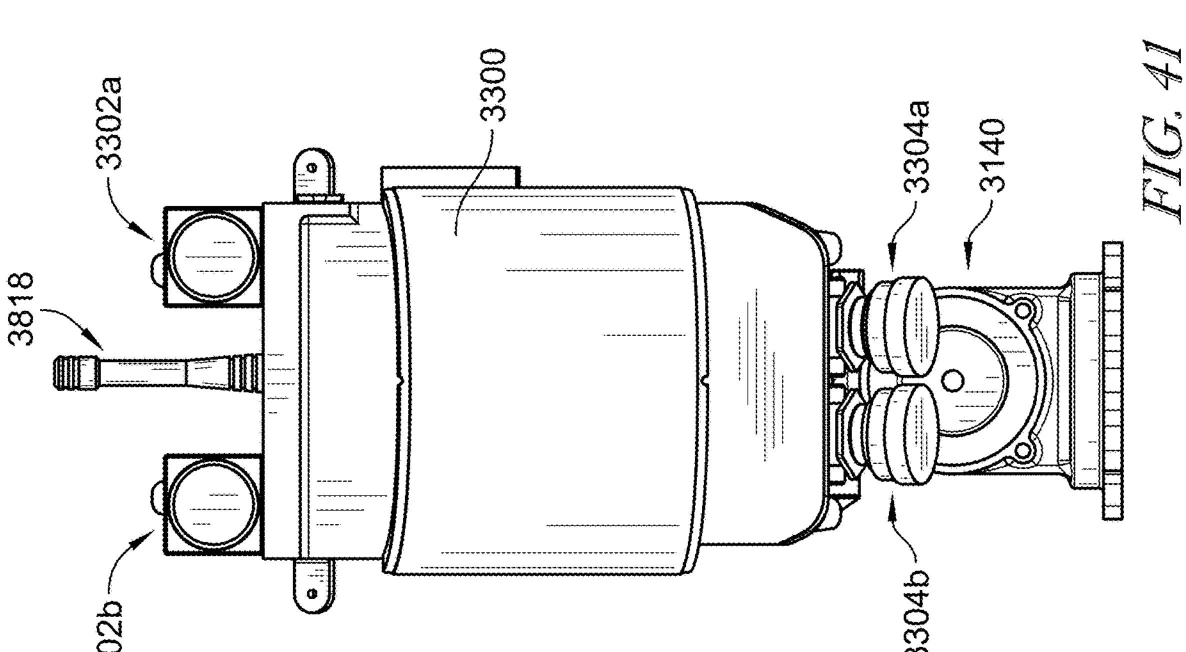
FIG. 41 is a front view of the head and neck assembly of FIG. 22 with the head housing assembly removed to show the electronics assembly.
Figure 40:
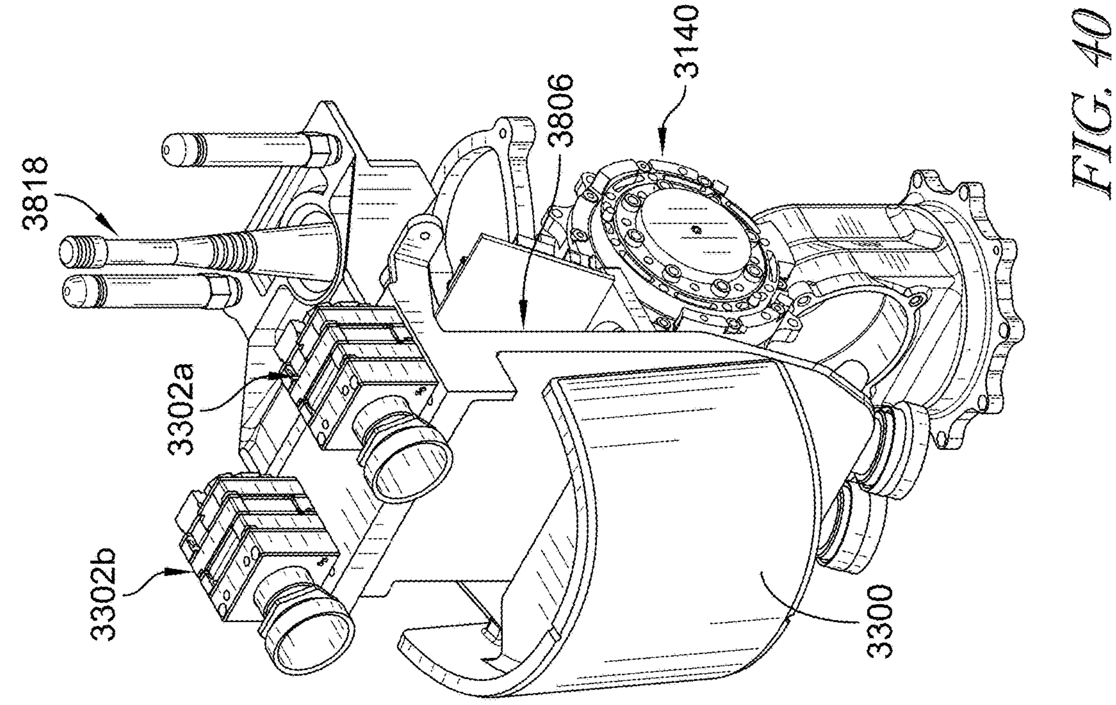
FIG. 40 is a perspective view of the head and neck assembly of FIG. 22 with the head housing assembly removed to show the electronics assembly.
Figure 43:
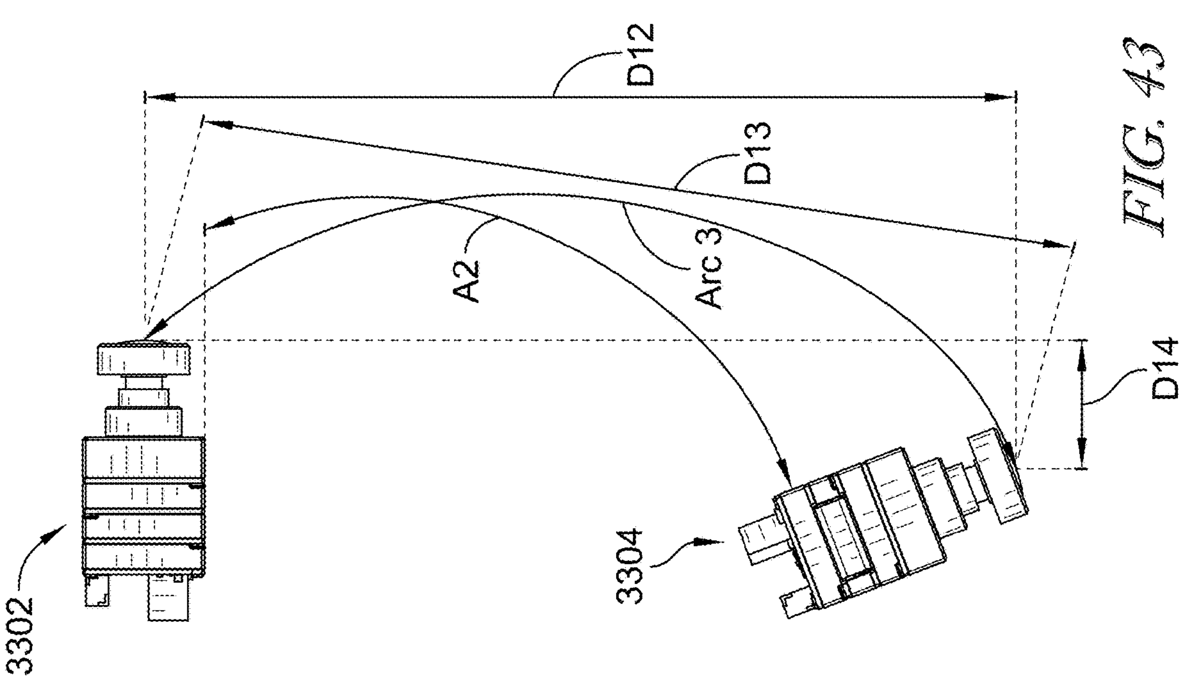
FIG. 43 is a side view of the cameras of FIG. 42 showing distances and arc angles between the upper cameras and the lower cameras.
Figure 42:
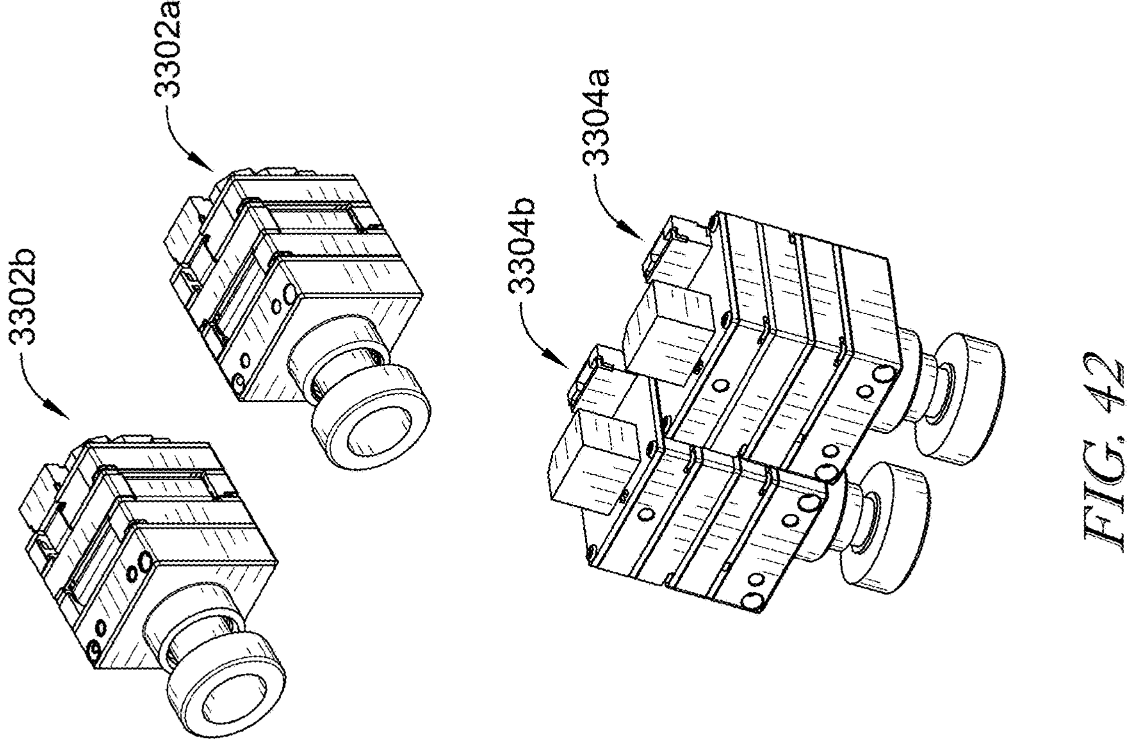
FIG. 42 is a perspective view of the cameras included in the electronics assembly of the head and neck assembly of FIG. 22 showing the orientation of upper cameras relative to lower cameras.
Figures 44, 45:
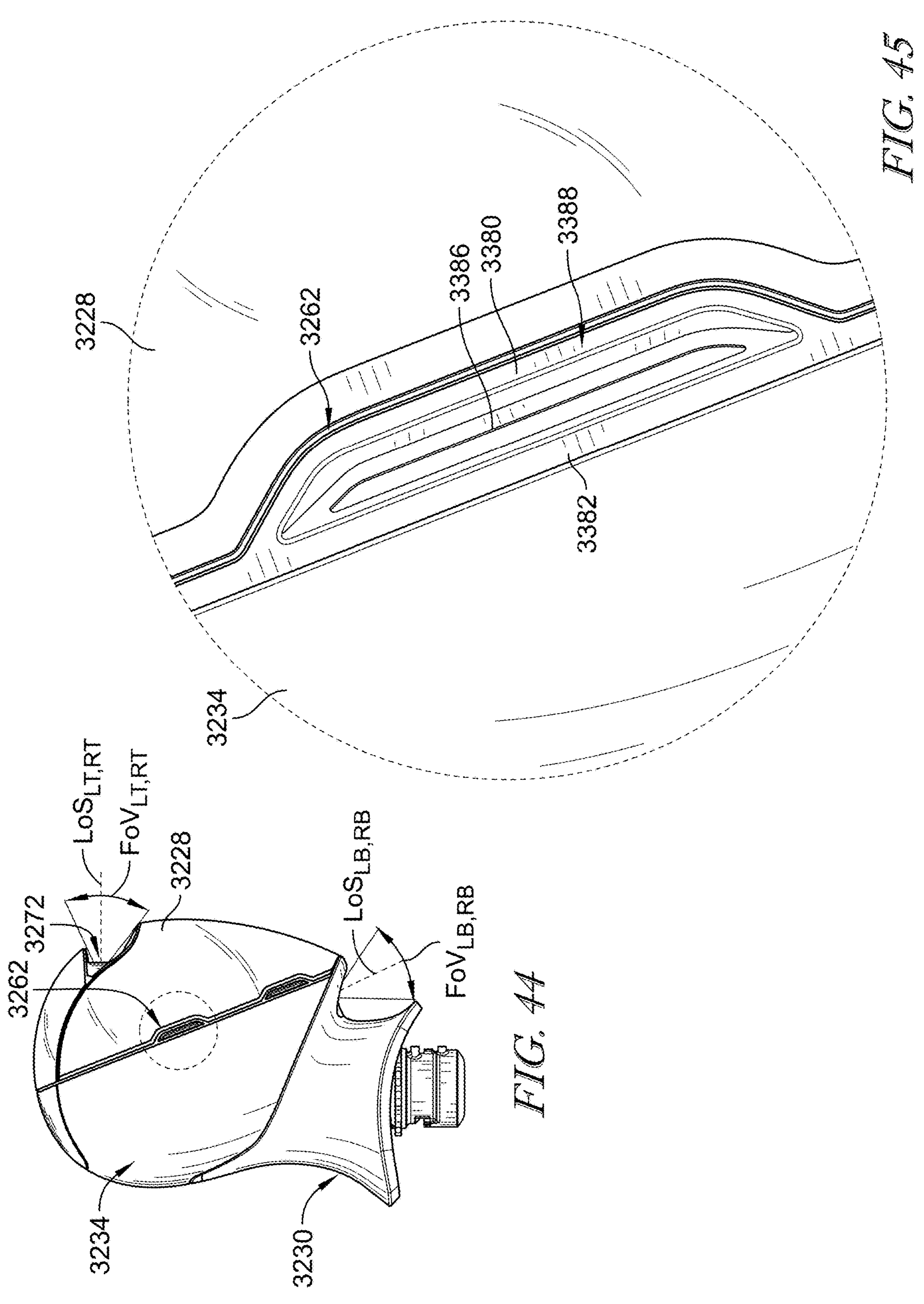
FIG. 44 is a side view of the head and neck assembly of FIG. 22 showing orientations and fields of view of the upper and lower cameras included in the electronics assembly.
FIG. 45 is an enlarged view of a portion of the head and neck assembly of FIG. 44 showing one of the illumination assemblies.
Figures 46, 47:
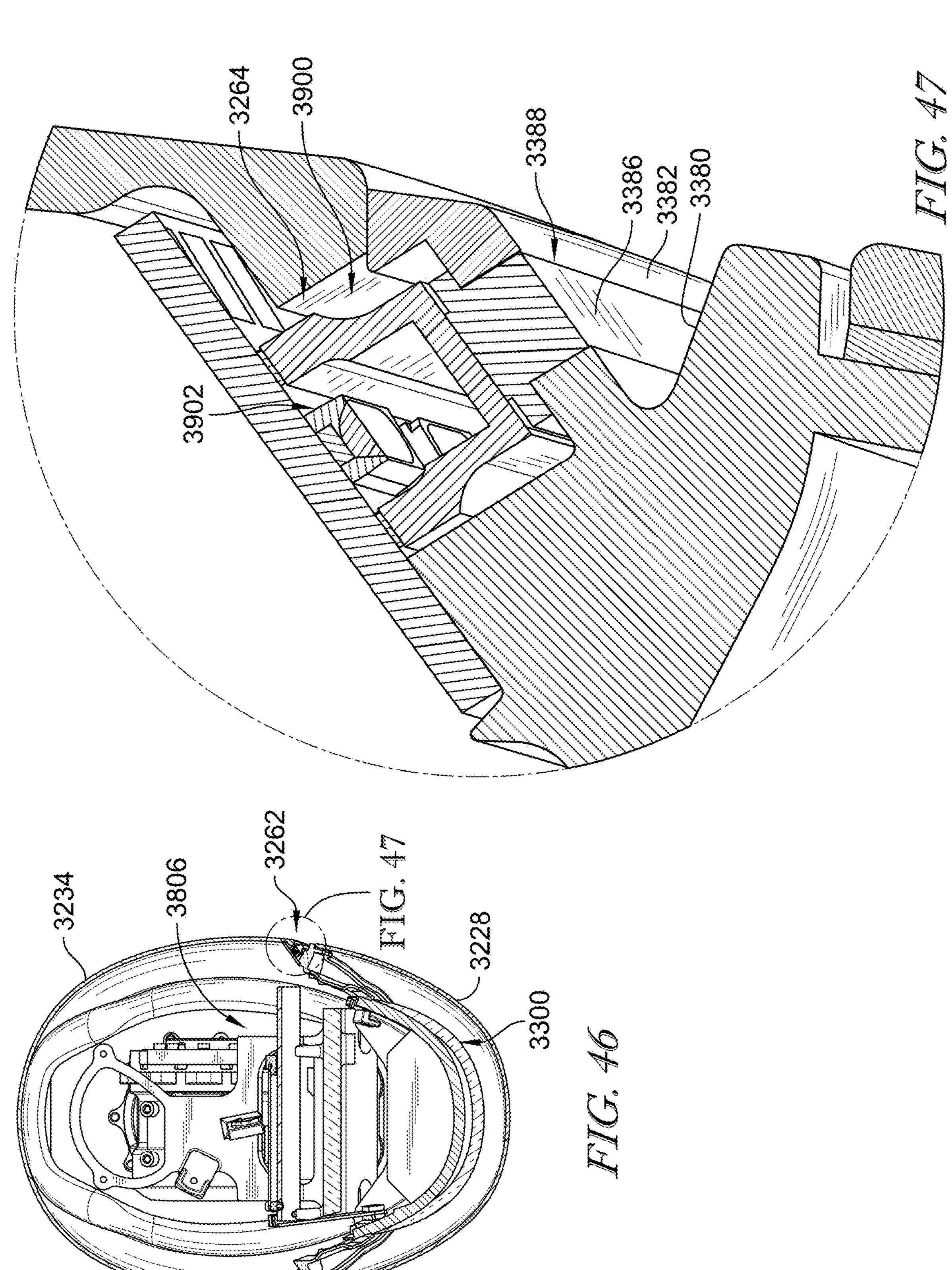
FIG. 46 is a cross section taken along line 46-46 in FIG. 38 showing the illumination assemblies mounted to lateral sides of the head to reside between the frontal shell and the rear shell.
FIG. 47 is an enlarged view of a portion of the head and neck assembly of FIG. 46 showing one of the illumination assemblies in detail.
Figure 49:
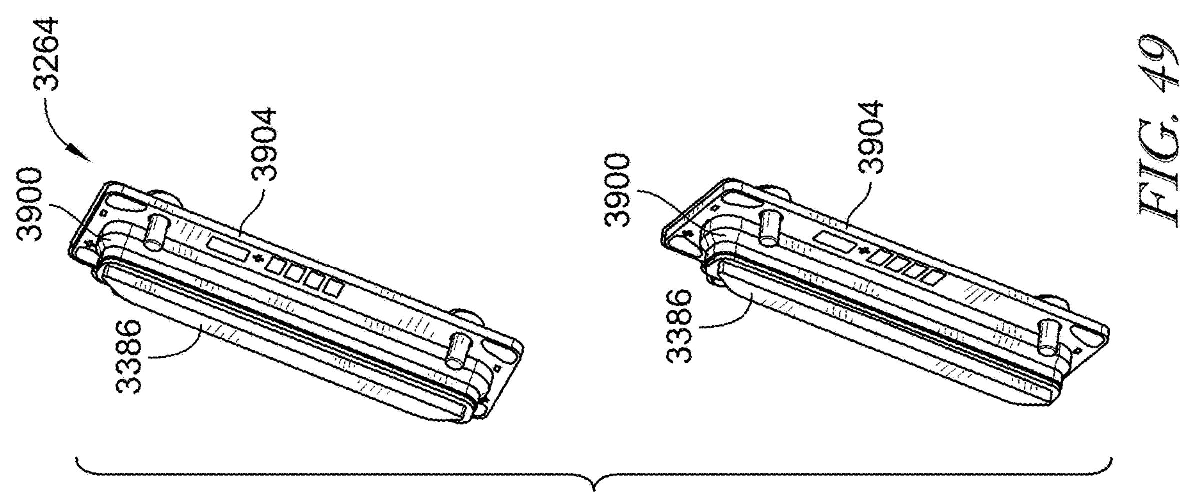
FIG. 49 is a perspective view of a pair of illumination assemblies.
Figure 48:
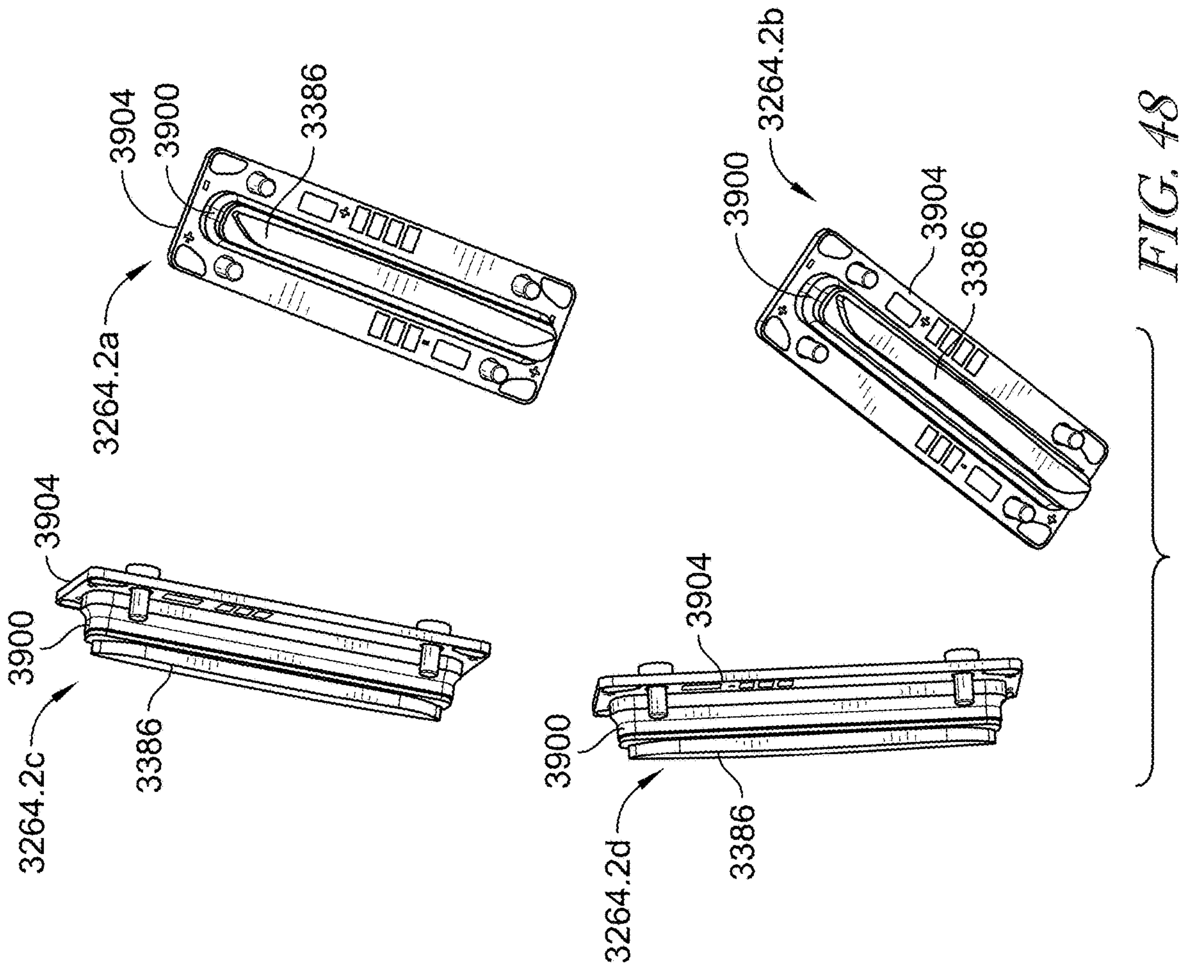
FIG. 48 is a perspective view of the illumination assemblies.
Figures 55, 56:
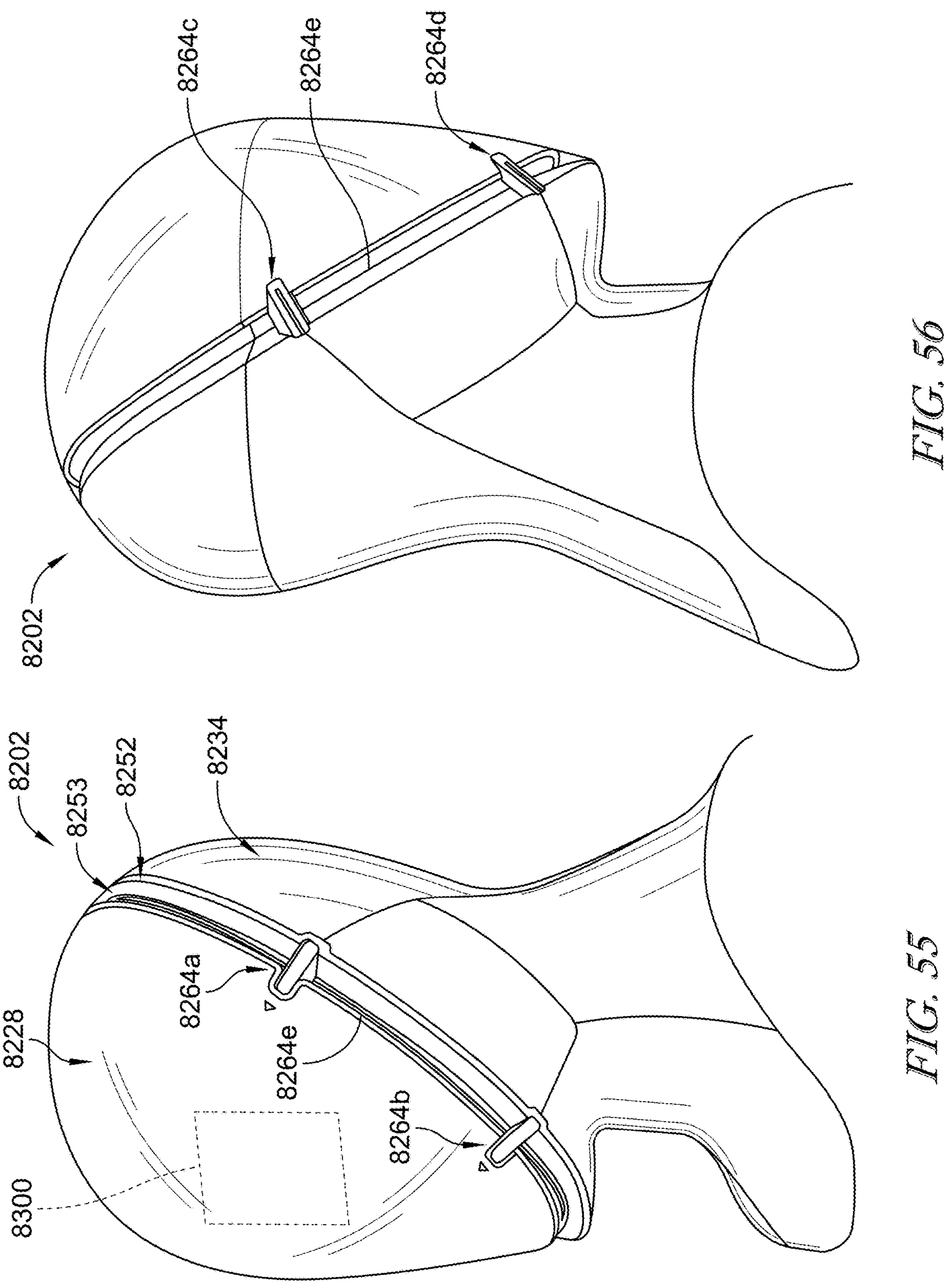
FIG. 55 is a perspective view of a seventh embodiment of a head and neck assembly including rectangular shaped illumination assemblies oriented perpendicular to a rear facing edge of the frontal shell and a perimeter band extending around the frontal shell between the rear facing edge of the frontal shell and the rear shell and having a perimeter illumination assembly contained therein.
FIG. 56 is a rear perspective view of the head and neck assembly of FIG. 55.

The sensor assembly 3700 may include a variety of sensing devices and systems to enhance the humanoid robot 100's perception capabilities and adaptability in various environments. The sensor assembly 3700 may include: (i) a vision system 3301V with one or more cameras 3302*a*, 3302*b*, 3304*a*, 3304*b*, (ii) temperature sensors to detect ambient or object temperatures for safety and operational adjustments, (iii) pressure sensors to measure contact or surface pressures, (iv) force sensors for detecting applied forces during interactions, (v) inductive sensors for proximity and metal object detection, (vi) capacitive sensors to sense touch or proximity, (vii) any combination of these sensors, or (viii) other known sensors including ultrasonic, acoustic, or gas sensors for additional environmental monitoring. As shown in FIGS. 33, 34, and 56, the sensor assembly 3700, and specifically the vision system 3301V, may include a set of upper cameras 3302*a*, 3302*b* and a set of lower cameras 3304*a*, 3304*b* coupled to the internal mounting frame 3806 at respective mounting positions. For example, two upper cameras 3302a, 3302b may be positioned above the display/shield 3300 and directed forward, and two lower cameras 3304a, 3304b may be positioned below the display 3300 and at a downward and forward angle. As shown in FIGS. 28 and 29, the upper cameras 3302 and the lower cameras 3304 may be positioned at different angles to provide a fuller field of view.

As shown in the FIGURES, the lower cameras 3304 may have a generally downward-facing field of view, which allows the robot 100 to gain awareness of its immediate surroundings on the ground. This allows for the detection of obstacles, uneven terrain, or other potential hazards that could impede the robot's movement or cause instability. Said field of view is approximately 57 degrees to approximately 86 degrees, preferably approximately 71 degrees to approximately 79 degrees. For example, the maximum field of view of the lower cameras 3304 may be approximately 72 degrees. Further, when the robot 100 is forward facing in an initial position, the torso 16 interferes with a portion of the field of view of the lower cameras 3304. In this position, the lower cameras 3304 have a downward facing field of view $FoV_{LB}$, $FoV_{RB}$ in front of the robot 100 of approximately 33 degrees to approximately 49 degrees, preferably approximately 40 degrees to approximately 45 degrees. For example, the field of view $FoV_{LB}$, $FoV_{RB}$ of the lower cameras 3304 may be approximately 41 degrees. Also, as shown in FIG. 28, the line of sight $LoS_{LB}$, $LoS_{RB}$ of the bottom cameras 3304a, 3304b is angled relative to a frontal plane $P_F$ and is angled relative to the line of sight $LoS_{LT}$, $LoS_{RT}$ of the top cameras 3302a, 3302b. The bottom angle that is formed between the bottom line of sight $LoS_{LB}$, $LoS_{RB}$ and the frontal plane $P_F$ may be any value between 91 degrees and 180 degrees, preferably between 110 degrees and 150 degrees, and most preferably 130 degrees. As such, the angle between the line of sight $LoS_{LT}$, $LoS_{RT}$ of the top cameras 3302a, 3302b and the line of sight $LoS_{LB}$, $LoS_{RB}$ of the bottom cameras 3304a, 3304b is between 20 and 60 degrees. The LoS angle that is formed between the top and bottom lines of sight $LoS_{LB}$, $LoS_{RB}$, $LoS_{LT}$, $LoS_{RT}$ may be equal to the bottom angle; thus, the top line of sight $LoS_{LT}$, $LoS_{RT}$ would be perpendicular to the frontal plane $P_F$. In other embodiments, the top line of sight $LoS_{LT}$, $LoS_{RT}$ may not be perpendicular to the frontal plane $P_F$; thus, the LoS angle would not be equal to the bottom angle.

As can be understood, the field of view of the lower cameras 3304 may vary due to the relative position of the head 10 and torso 16. For example, when the head 10 is tilted backward, the field of view of the lower cameras 3304 may increase. When the head 10 is tilted forward, the field of view of the lower cameras 3304 may decrease. When the head 10 is twisted to the left or right, the field of view of the lower cameras 3304 changes relative to any interference from the torso 16 or other components of the robot 3100. Likewise, the angle between the bottom line of sight $LoS_{LB}$, $LoS_{RB}$ and the frontal plane $P_F$ will change depending on the position of the head. Additionally, it should be understood that the lower cameras disclosed herein may have or include any properties, components, or elements that are described in other sections herein. For example, most, if not all, of the disclosure contained above in connection with sensor assembly 301, vision system 301V, or upper cameras 302.2a, 302.2b, 302.2c applies with equal force hereto.

In addition, the head 3202a further includes a lower recess 3309 formed in a chin region 3355 of the head 3202a, which may include a lower sensor cover 3310 that is positioned below the display 3300 and is angled downward. As shown in the FIGURES, the lower cameras 3304 are pointed towards said lower sensor cover 3310. The chin region 3355 projects outward away from the neck 3202b to provide a lower surface 3311 facing toward ground G. The lower sensor cover 3310 is coupled to the lower surface and faces toward the ground. The lower sensor cover 3310 is shaped to couple with the head 3202a in a position such that a sensor opening 3312 included in the lower sensor cover 3310 corresponds with a sensor, such as one or more lower camera(s) 3304 of the electronics assembly 3222. The transparent material used for the lower sensor cover 3310 is crucial for maintaining sensor accuracy and functionality. By allowing undistorted transmission of signals or images, it preserves the fidelity of data collected by the lower camera(s) 3304 or other sensors that may be housed in this area. This could include not just visual data, but potentially other sensor types like infrared for heat detection or ultrasonic for precise distance measurements to the ground. For example, the lower sensor cover 3310 may be a planar cover made of a transparent material that allows the lower camera(s) 3304 to receive images, preferably undistorted images. Additionally or alternatively, the lower sensor cover 3310 may be enclosed by the frontal shell 3228 and the neck shell 3230.

vi. Display

As best shown in FIGS. 28 and 29, the display 3300 of the electronics assembly 3222 may be mounted to the internal mounting frame 3806 and positioned between the upper and lower cameras 3302, 3304. The display 3300 is operatively connected to at least one processor to generate and display status messages and other information on the display 3300. As described above in connection with the first embodiment, the display 3300 may display information: (i) related to the robot's state (e.g., working, error, moving, etc.), (ii) obtained from sensors contained within the head assembly, or (iii) received from other processors in communication with the display 3300 (e.g., other internal processors housed within the robot or external information transmitted and received by the robot). Said information may be displayed in the format of blocks, well-known shapes, logos, or other moving items (e.g., thought bubbles). Additionally, it should be understood that most, if not all, of the disclosure in connection with display 300 applies with equal force to display 3300 and as such will not be repeated herein.

vii. Illumination Assemblies

As best shown in FIGS. 44-49, each of the light emitter housings 3262 of the illumination assembly 3223 has a generally trapezoidal shape when viewed from the side. Each of the diffusers 3386 has a corresponding shape and is configured to reside within a slot 3388 formed in each respective light emitter housing 3262 between the top wall 3380 and the bottom wall 3382. Each of the light emitters 3264 includes a cover 3900 coupled to the diffuser 3386, a light source 3902 oriented to face toward the cover 3900 and the diffuser 3386, and a back wall 3904 coupled to the light source 3902 and mounted with the light emitter housing 3262. The cover 3900 and the back wall 3904 form a protective covering for the light source 3902 to protect said light source 3902 from debris and other foreign objects. The light source 3902 is illustratively a light-emitting diode but can include any suitable light source such as an incandescent source, a fluorescent source, a halogen source, etc. The back wall 3904 has a greater width than the cover 3900 to project outwardly beyond the cover and the light source 3902 for attachment to the light emitting housing 3262. Additionally, it should be understood that most, if not all, of the disclosure in connection with illumination assembly 223 from the first embodiment applies with equal force to illumination assembly 3223 and as such will not be repeated herein.

viii. Other Electronic Components

As described above, the electronic components of the head may also include a directional microphone 3814, a speaker 3816, antennas 3818, light emitters 3264, as well as a data storage device 3819 and/or a computing device 3821 comprising a processor and memory, as shown in FIGS. 28-30. Specifically, the directional microphone 3814 is designed to detect sounds and determine a position thereof, which enables the robot to move its head toward the sound. In particular, one or more speakers 3816 may be configured to allow the robot to communicate with nearby humans through audible messages or responses. One or more antennas 3818 may be configured to transmit and receive data wirelessly for data transfer into and out of the robot. Specifically, said robot may include wireless communication modules (e.g., cellular, Wi-Fi, Bluetooth, WiMAX, HomeRF, Z-Wave, Zigbee, THREAD, RFID, NFC, and/or others) that are connected to said antennas 3818. For example, said robot head 3202*a* may include a 5G cellular radio coupled to one of the antennas 3818 and a Wi-Fi radio (e.g., 5 GHz or 2.4 GHz) coupled to the other antenna 3818.

The data storage device 3819 may include a solid-state hard drive designed to capture all of the data generated by the sensors or a subset of the data generated by the sensors. Said subset of the data may be time-based (e.g., for a pre-defined time surrounding the startup/shutdown of the robot), sensor-based (e.g., only encoder data), movement/configuration-based (e.g., when performing a specific task that requires the robot to put its body in a particular position/configuration), environment-based (e.g., when the robot recognizes a specific item or issue in its environment), configuration based, error based, or a combination thereof. In addition, the data storage device may be used to store data for training other robots or for storing data for diagnostic purposes or any other suitable purpose. Finally, the light emitters 3264 may be designed to work in conjunction with the screen 3300 to indicate a state of the robot 100 (e.g., working, error, moving, etc.) to a nearby human, or may illuminate for other reasons.

3. Fourth Embodiment

Similar to the head and neck assemblies 202, 2202, 3202 described above in connection with FIGS. 1-49, FIG. 50 illustrates a fourth embodiment of a head and neck assembly 4202. For the sake of brevity, the above disclosure in connection with the head and neck assemblies 202, 2202, 3202 will not be repeated below, but it should be understood that like numerals generally represent generally similar or like structures in the various embodiments. For example, the disclosure regarding display 300 applies equally to display 4300. Further, it should be understood that the functionality and operation of the head and neck assembly 4202 is similar or identical to the features and functionality disclosed with respect to the head and neck assemblies 202, 2202, 3202. It should be understood that any one or more features of the head and neck assemblies 202, 2202, 3202 may be used in combination with those disclosed with respect to the head and neck assembly 4202, and that any one or more features of the head and neck assembly 4202 may be used in combination with those disclosed with respect to the head and neck assemblies 202, 2202, 3202.

Figures 57, 58:
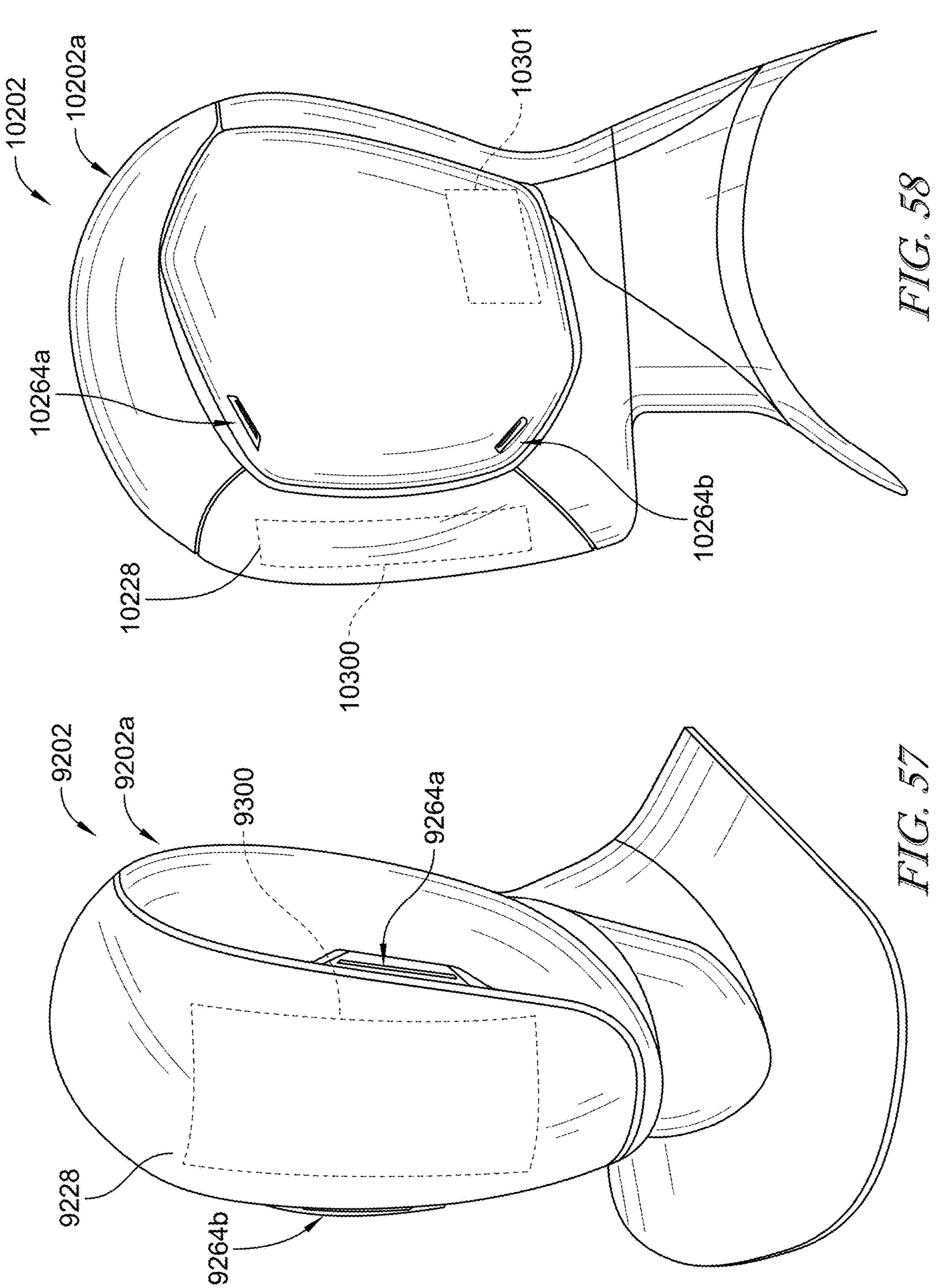
FIG. 57 is a perspective view of an eighth embodiment of a head and neck assembly including a frontal shell having a substantially constant width and extending from a chin region of the head to a crown region of the head, and showing a pair of illumination assemblies on each lateral side of the frontal shell.
FIG. 58 is a side view of a nineth embodiment of a head and neck assembly including a side electronics panel having a pair of illumination assemblies and a display.
Figures 59, 60:
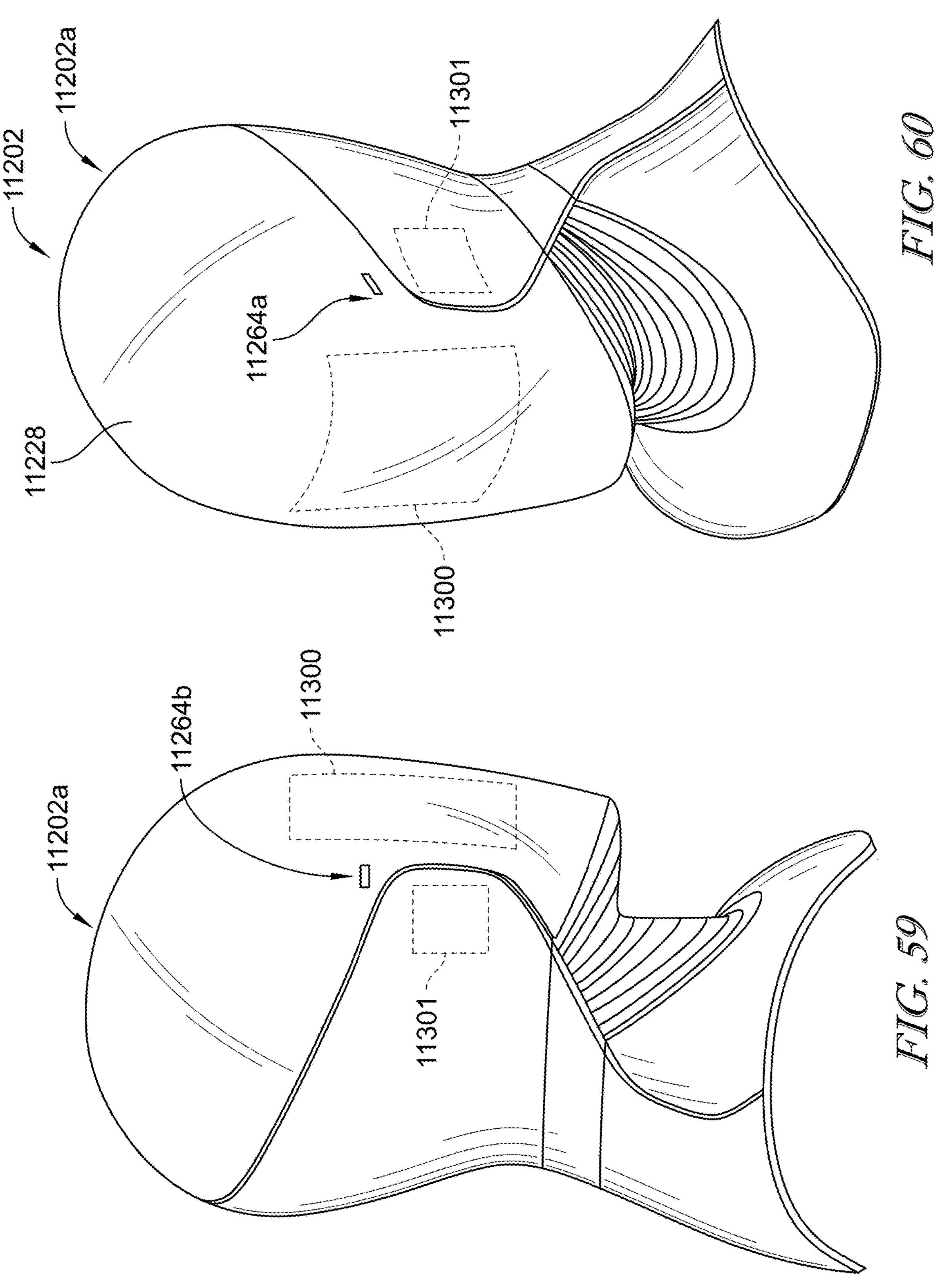
FIG. 59 is a side view of a tenth embodiment of a head and neck assembly including a frontal shell extending over a majority of the head and a display located in a parotid region and/or a buccal region of the head.
FIG. 60 is a perspective view of the head and neck assembly of FIG. 59.
Figures 61, 62:
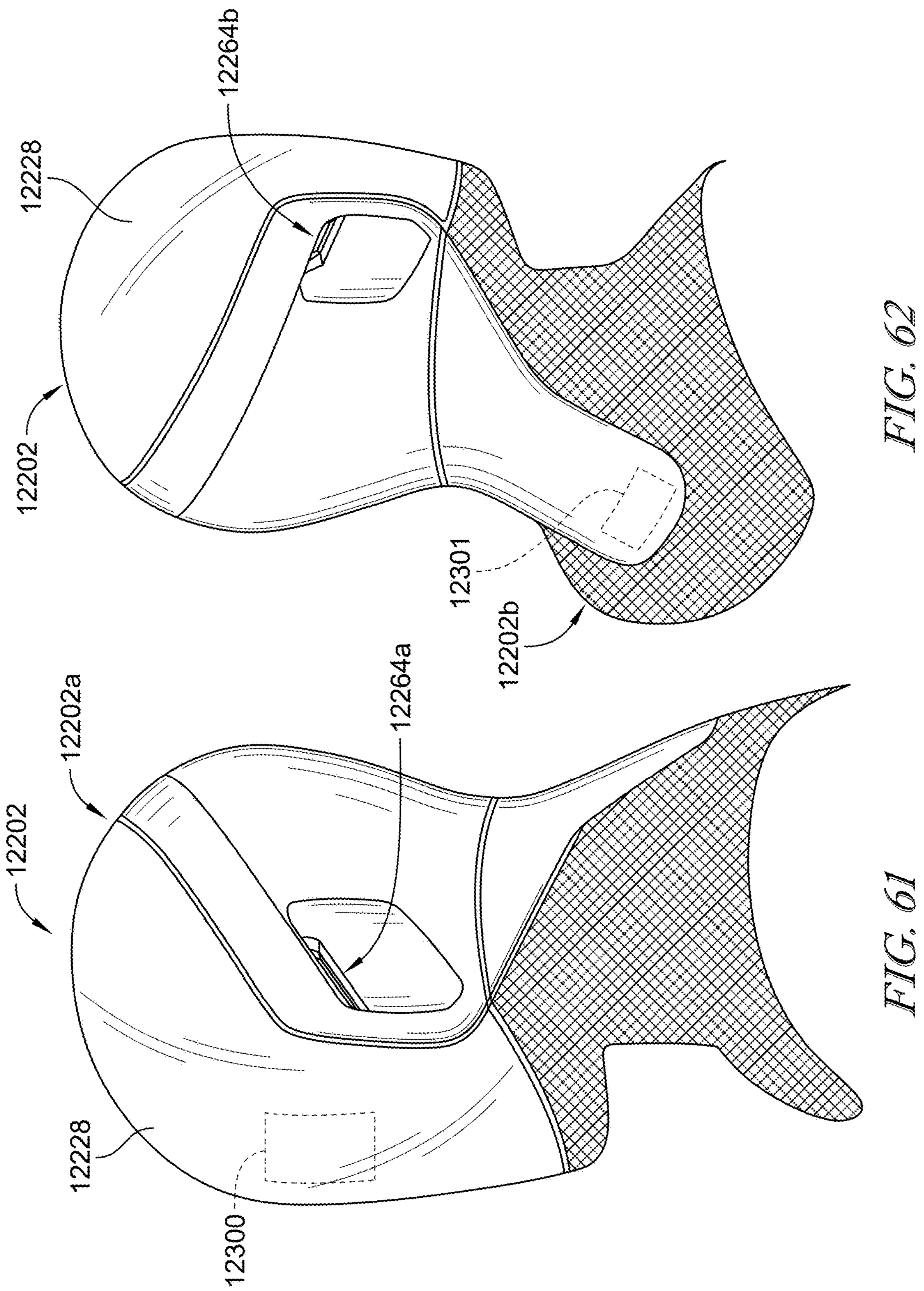
FIG. 61 is a side view of an eleventh embodiment of a head and neck assembly including an illumination assembly in a parotid and/or buccal region of the head.
FIG. 62 is a rear perspective view of the head and neck assembly of FIG. 61.
Figures 63, 64:
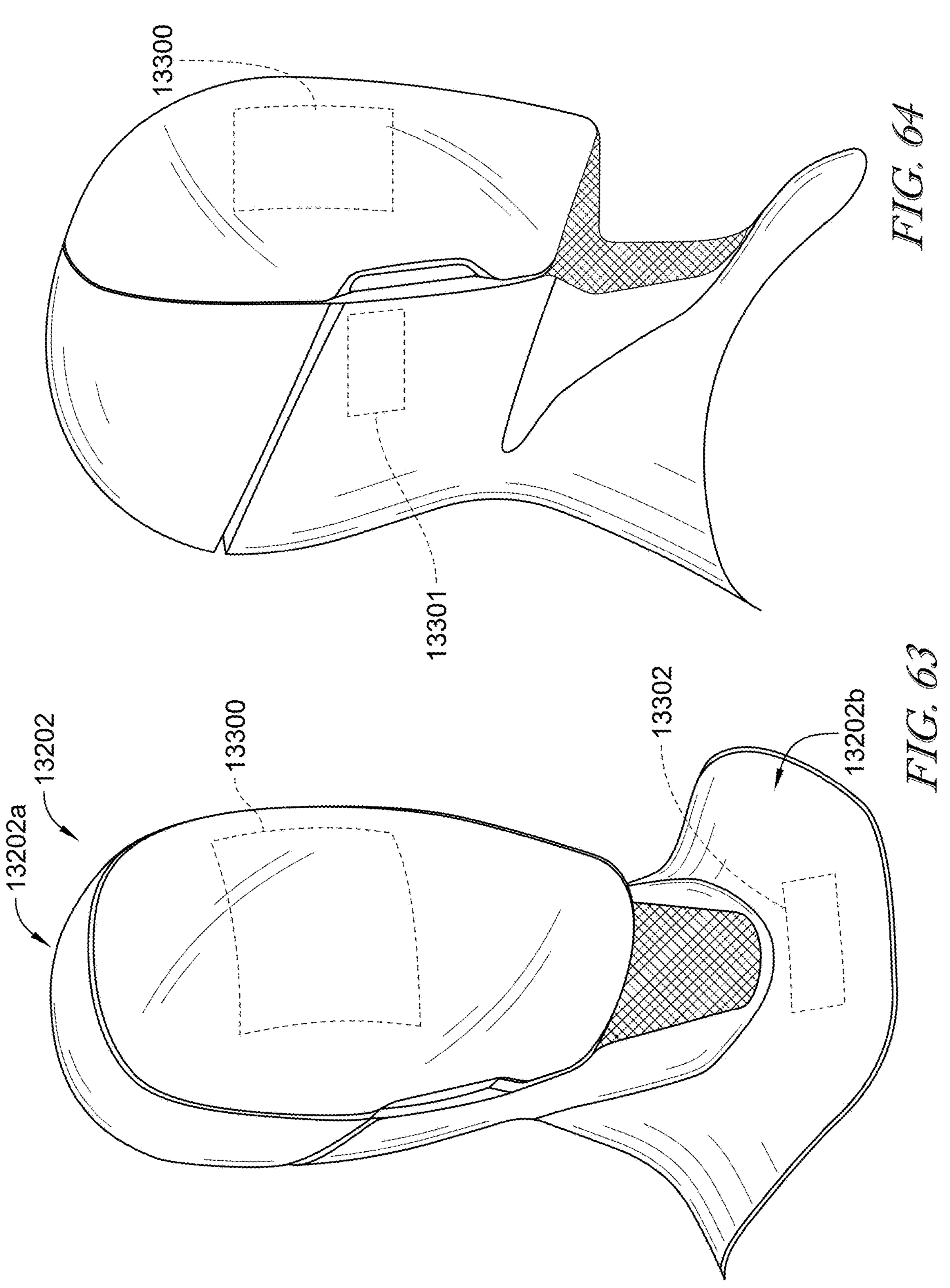
FIG. 63 is a perspective view of a twelfth embodiment of a head and neck assembly including a frontal shell, a rear shell having a side display, and a flexible top shell coupled to a rear end of the frontal shell and an upper end of the rear shell.
FIG. 64 is a side view of the head and neck assembly of FIG. 63.
Figures 65A, 65B, 65C:
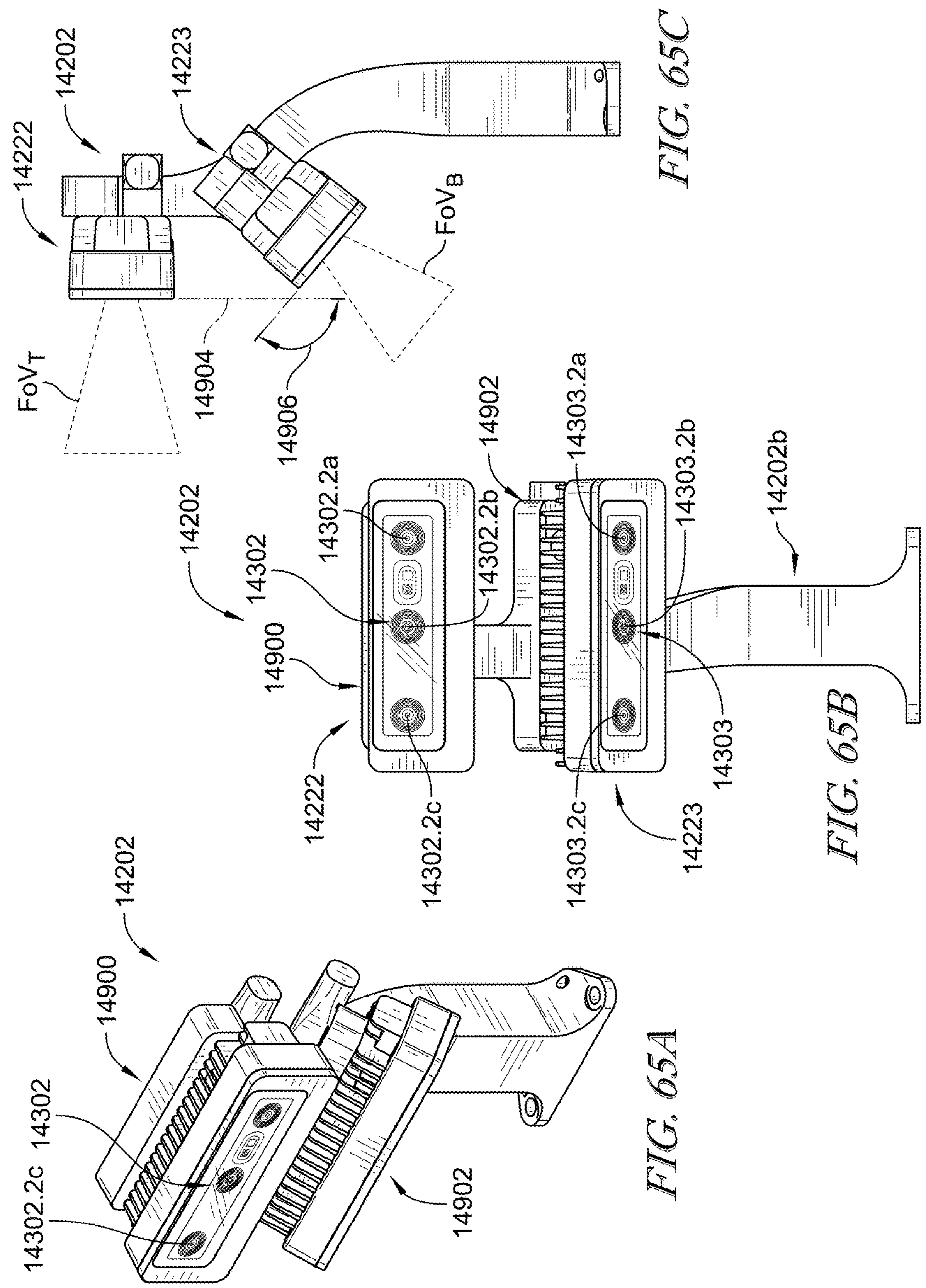
FIG. 65A is a perspective view of a thirteenth embodiment of a head and neck assembly including an upper electronics assembly and a lower electronics assembly.
FIG. 65B is a front view of the head and neck assembly of FIG. 65A showing the upper and lower electronic assemblies including cameras.
FIG. 65C is a side view of the head and neck assembly of FIG. 65A showing the cameras of the upper electronic assembly facing in a forward direction and showing the cameras of the lower electronic assembly facing in a downward direction.

The primary differences between head and neck assembly 3202 and head and neck assembly 4202 are the fact that the shielded portion 4288 is ribbed and the head 4202*a* lacks a lower recessed sensor region in the chin area. As shown in FIGS. 58 and 59, the shielded portion 4288 can include a plurality of ribs 4372, 4374 that define one or more recessed areas 4370. The ribs 4372, 4374 can provide additional structural reinforcement to areas adjacent the electronics assembly 4222. The recessed areas 4370 can be a part of the shielded portion 4288 or can be additional displays and/or lights that are used to convey information and indications to users. Although not shown in FIGS. 58 and 59, the head 4202*a* can include or omit a frontal shell.

4. Fifth Embodiment

Similar to the head and neck assemblies 202, 2202, 3202, 4202 described above in connection with FIGS. 1-50, FIG. 51 illustrates a fifth embodiment of a head and neck assembly 5202. For the sake of brevity, the above disclosure in connection with the head and neck assemblies 202, 2202, 3202, 4202 will not be repeated below, but it should be understood that like numerals generally represent generally similar or like structures in the various embodiments. For example, the disclosure regarding display 300 applies equally to display 5300. Further, it should be understood that the functionality and operation of the head and neck assembly 5202 is similar or identical to the features and functionality disclosed with respect to the head and neck assemblies 202, 2202, 3202, 4202. It should be understood that any one or more features of the head and neck assemblies 202, 2202, 3202, 4202 may be used in combination with those disclosed with respect to the head and neck assembly 5202, and that any one or more features of the head and neck assembly 5202 may be used in combination with those disclosed with respect to the head and neck assemblies 202, 2202, 3202, 4202.

The primary differences between head and neck assembly 3202 and head and neck assembly 5202 are the fact that the head 5202*a* includes only one light emitting assembly 5264 and the head 5202*a* lacks a lower recessed sensor region in the chin area. As shown in FIG. 60, the light emitting assembly 5264 is a band and extends along the interface 5320 between the frontal shell 5228 and the rear shell 5234. The light emitting assembly 5264 extends along the entire interface 5320 in the illustrative embodiment but may extend only partway along the interface 5320 in some embodiments. In other words, the light emitting assembly 5264 may extend completely around the frontal shell 5228. The outer surface of the light emitting assembly 5264 may be flush with the outer surfaces of the front and rear shells or may be recessed relative to one or both of the front and/or rear shells.

5. Sixth Embodiment

Similar to the head and neck assemblies 202, 2202, 3202, 4202, 5202 described above in connection with FIGS. 1-51, FIG. 52 illustrates a sixth embodiment of a head and neck assembly 6202. For the sake of brevity, the above disclosure in connection with the head and neck assemblies 202, 2202, 3202, 4202, 5202 will not be repeated below, but it should be understood that like numerals generally represent generally similar or like structures in the various embodiments. For example, the disclosure regarding display 300 applies equally to display 6300. Further, it should be understood that the functionality and operation of the head and neck assembly 6202 is similar or identical to the features and functionality disclosed with respect to the head and neck assemblies 202, 2202, 3202, 4202, 5202. It should be understood that any one or more features of the head and neck assemblies 202, 2202, 3202, 4202, 5202 may be used in combination with those disclosed with respect to the head and neck assembly 6202, and that any one or more features of the head and neck assembly 6202 may be used in combination with those disclosed with respect to the head and neck assemblies 202, 2202, 3202, 4202, 5202. The primary difference distinguishing the head and neck assembly 6202 from certain preceding embodiments, such as embodiments 2-5, is that the head 6202*a* lacks a front recessed sensor region, a rear recessed sensor region, and a lower recessed sensor region. Like the fifth embodiment, the head 6202*a* includes only one light emitting assembly 6264 that extends along the interface 6320 between the frontal shell 6228 and the rear shell 6234.

E. Seventh Embodiment

Figures 53, 54:
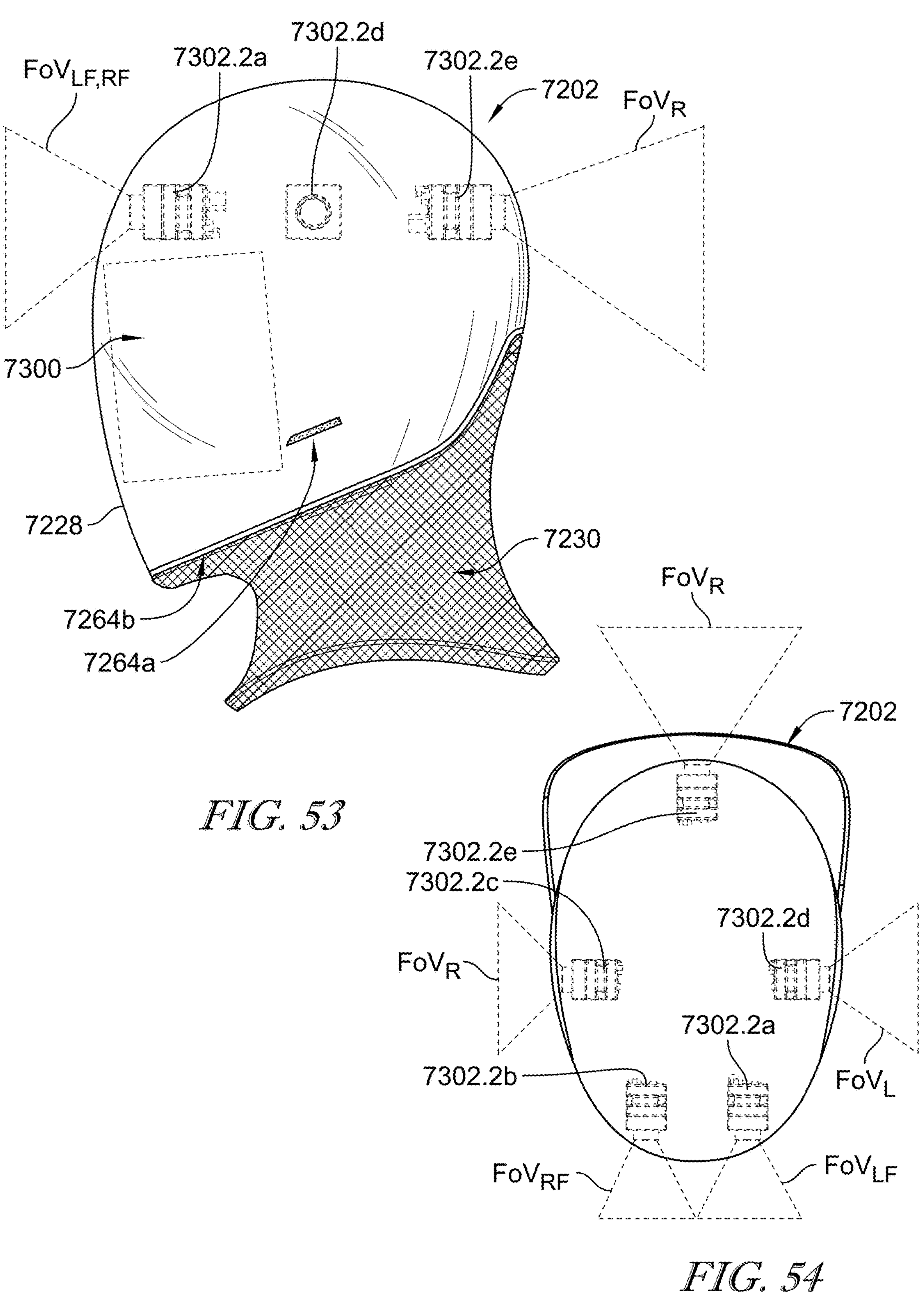
FIG. 53 is a side view of a sixth embodiment of a head and neck assembly wherein the rear shell has been omitted and the frontal shell encases a majority of the head, the head and neck assembly including a plurality of cameras contained within the head and facing outwardly through the frontal shell.
FIG. 54 is a top view of the head and neck assembly of FIG. 53 showing the cameras oriented relative to the head and showing a field of view of each camera.

Similar to the head and neck assemblies 202, 2202, 3202, 4202, 5202, 6202 described above in connection with FIGS. 1-52, FIGS. 53 and 54 illustrate a seventh embodiment of a head and neck assembly 7202. For the sake of brevity, the above disclosure in connection with the head and neck assemblies 202, 2202, 3202, 4202, 5202, 6202 will not be repeated below, but it should be understood that like numerals generally represent generally similar or like structures in the various embodiments. For example, the disclosure regarding display 300 applies equally to display 7300. Further, it should be understood that the functionality and operation of the head and neck assembly 7202 is similar or identical to the features and functionality disclosed with respect to the head and neck assemblies 202, 2202, 3202, 4202, 5202, 6202. It should be understood that any one or more features of the head and neck assemblies 202, 2202, 3202, 4202, 5202, 6202 may be used in combination with those disclosed with respect to the head and neck assembly 7202, and that any one or more features of the head and neck assembly 7202 may be used in combination with those disclosed with respect to the head and neck assemblies 202, 2202, 3202, 4202, 5202, 6202. The primary difference between head and neck assembly 6202 and head and neck assembly 7202 is the fact that the frontal shell 7228 provides substantially all of an exterior surface of the head 7202*a*. As shown in FIG. 53, the head 7202*a* further includes a light emitting assembly 7264.2*a* coupled to the frontal shell 7228. The neck shell 7230 can also include a second light emitting assembly 7264.2*b* located adjacent to an edge of the frontal shell 7228 at a junction between the frontal shell 7228 and the deformable neck cover 7230.

As shown in FIG. 54, the head and neck assembly 7202 further includes an electronics assembly 7222 including a plurality of cameras 7302 configured to provide a field of view around all or a majority of the robot (i.e., 360 degrees). For example, the plurality of cameras 7302 includes a pair of frontal cameras 7302*a*, 7302*b* facing in a forward direction of the robot, a pair of side cameras 7302*c*, 7302*d* facing in opposed lateral directions of the robot, and a rear camera 7302*e* facing in a rearward direction of the robot.

F. Eighth Embodiment

Similar to the head and neck assemblies 202, 2202, 3202, 4202, 5202, 6202, 7202 described above in connection with FIGS. 1-54, FIGS. 55 and 56 illustrate an eighth embodiment of a head and neck assembly 8202. For the sake of brevity, the above disclosure in connection with the head and neck assemblies 202, 2202, 3202, 4202, 5202, 6202, 7202 will not be repeated below, but it should be understood that like numerals generally represent generally similar or like structures in the various embodiments. For example, the disclosure regarding display 300 applies equally to display 8300. Further, it should be understood that the functionality and operation of the head and neck assembly 8202 is similar or identical to the features and functionality disclosed with respect to the head and neck assemblies 202, 2202, 3202, 4202, 5202, 6202, 7202. It should be understood that any one or more features of the head and neck assemblies 202, 2202, 3202, 4202, 5202, 6202, 7202 may be used in combination with those disclosed with respect to the head and neck assembly 8202, and that any one or more features of the head and neck assembly 8202 may be used in combination with those disclosed with respect to the head and neck assemblies 202, 2202, 3202, 4202, 5202, 6202, 7202.

The primary difference between previously described head and neck assemblies and head and neck assembly 8202 is the fact that the intermediate cover 8252 is thicker and provides a channel 8253 extending around or substantially around a perimeter of the frontal shell 8228. The head 8202*a* further includes light emitting assemblies 8264.2*a*, 8264.2*b*, 8264.2*c*, 8264.2*d* coupled to the intermediate cover 8252 and spaced apart from one another along the channel 8253. Each of the light emitting assemblies 8264.2*a*, 8264.2*b*, 8264.2*c*, 8264.2*d* is substantially rectangular in shape and elongated in a direction that is perpendicular to the rear-facing edge of the frontal shell 8228. The head 8202*a* further includes one or more light emitting assemblies 8264.2*e* located in the channel 8253 of the intermediate cover 8252.

G. Ninth Embodiment

Similar to the head and neck assemblies 202, 2202, 3202, 4202, 5202, 6202, 7202, 8202 described above in connection with FIGS. 1-56, FIG. 57 illustrates a ninth embodiment of a head and neck assembly 9202. For the sake of brevity, the above disclosure in connection with the head and neck assemblies 202, 2202, 3202, 4202, 5202, 6202, 7202, 8202 will not be repeated below, but it should be understood that like numerals generally represent generally similar or like structures in the various embodiments. For example, the disclosure regarding display 300 applies equally to display 9300. Further, it should be understood that the functionality and operation of the head and neck assembly 9202 is similar or identical to the features and functionality disclosed with respect to the head and neck assemblies 202, 2202, 3202, 4202, 5202, 6202, 7202, 8202. It should be understood that any one or more features of the head and neck assemblies 202, 2202, 3202, 4202, 5202, 6202, 7202, 8202 may be used in combination with those disclosed with respect to the head and neck assembly 9202, and that any one or more features of the head and neck assembly 9202 may be used in combination with those disclosed with respect to the head and neck assemblies 202, 2202, 3202, 4202, 5202, 6202, 7202, 8202.

The primary difference between previously described head and neck assemblies and head and neck assembly 9202 is the fact that the frontal shell 9228 has a substantially constant width and extends from a chin region of the head 9202*a* all the way up to provide a crown region of the head 9202*a*. The head 9202*a* further includes only a first light emitter assembly 9264.2*a* on a first lateral side of the frontal shell 9228 and a second light emitter assembly 9264.2*b* on an opposed second lateral side of the frontal shell 9228. The light emitter assemblies 9264.2*a*, 9264.2*b* have a larger length compared to other light emitter assemblies described herein.

H. Tenth Embodiment

Similar to the head and neck assemblies 202, 2202, 3202, 4202, 5202, 6202, 7202, 8202, 9202 described above in connection with FIGS. 1-57, FIG. 58 illustrates a tenth embodiment of a head and neck assembly 10202. For the sake of brevity, the above disclosure in connection with the head and neck assemblies 202, 2202, 3202, 4202, 5202, 6202, 7202, 8202, 9202 will not be repeated below, but it should be understood that like numerals generally represent generally similar or like structures in the various embodiments. For example, the disclosure regarding display 300 applies equally to display 10300. Further, it should be understood that the functionality and operation of the head and neck assembly 10202 is similar or identical to the features and functionality disclosed with respect to the head and neck assemblies 202, 2202, 3202, 4202, 5202, 6202, 7202, 8202, 9202. It should be understood that any one or more features of the head and neck assemblies 202, 2202, 3202, 4202, 5202, 6202, 7202, 8202, 9202 may be used in combination with those disclosed with respect to the head and neck assembly 10202, and that any one or more features of the head and neck assembly 10202 may be used in combination with those disclosed with respect to the head and neck assemblies 202, 2202, 3202, 4202, 5202, 6202, 7202, 8202, 9202.

The primary difference between previously described head and neck assemblies and head and neck assembly 10202 is the fact that the head 10202*a* includes a secondary display 10301 located on each lateral side of the head 10202*a*. The secondary display 10301 is located specifically in an occipital region of the head 10202*a*. The head 10202*a* further includes light emitting assemblies 10264.2*a*, 10264.2*b* coupled to a lateral panel of the head 10202*a*, as opposed to the intermediate cover in previous embodiments.

I. Eleventh Embodiment

Similar to the head and neck assemblies 202, 2202, 3202, 4202, 5202, 6202, 7202, 8202, 9202, 10202 described above in connection with FIGS. 1-58, FIGS. 59-60 illustrate an eleventh embodiment of a head and neck assembly 11202. For the sake of brevity, the above disclosure in connection with the head and neck assemblies 202, 2202, 3202, 4202, 5202, 6202, 7202, 8202, 9202, 10202 will not be repeated below, but it should be understood that like numerals generally represent generally similar or like structures in the various embodiments. For example, the disclosure regarding display 300 applies equally to display 11300. Further, it should be understood that the functionality and operation of the head and neck assembly 11202 is similar or identical to the features and functionality disclosed with respect to the head and neck assemblies 202, 2202, 3202, 4202, 5202, 6202, 7202, 8202, 9202, 10202. It should be understood that any one or more features of the head and neck assemblies 202, 2202, 3202, 4202, 5202, 6202, 7202, 8202, 9202, 10202 may be used in combination with those disclosed with respect to the head and neck assembly 11202, and that any one or more features of the head and neck assembly 11202 may be used in combination with those disclosed with respect to the head and neck assemblies 202, 2202, 3202, 4202, 5202, 6202, 7202, 8202, 9202, 10202.

The primary difference between previously described head and neck assemblies and head and neck assembly 11202 is the fact that the head 11202*a* includes a secondary display 11301 located on each lateral side of the head 11202*a*. The secondary display 11301 is located specifically in a parotid region and/or auricular region of the head 11202*a*. The head 11202*a* further includes light emitting assemblies 11264.2*a*, 11264.2*b* coupled to opposed sides of the frontal shell 11228.

J. Twelfth Embodiment

Similar to the head and neck assemblies 202, 2202, 3202, 4202, 5202, 6202, 7202, 8202, 9202, 10202, 11202 described above in connection with FIGS. 1-60, FIGS. 61-62 illustrate a twelfth embodiment of a head and neck assembly 12202. For the sake of brevity, the above disclosure in connection with the head and neck assemblies 202, 2202, 3202, 4202, 5202, 6202, 7202, 8202, 9202, 10202, 11202 will not be repeated below, but it should be understood that like numerals generally represent generally similar or like structures in the various embodiments. For example, the disclosure regarding display 300 applies equally to display 12300. Further, it should be understood that the functionality and operation of the head and neck assembly 12202 is similar or identical to the features and functionality disclosed with respect to the head and neck assemblies 202, 2202, 3202, 4202, 5202, 6202, 7202, 8202, 9202, 10202, 11202. It should be understood that any one or more features of the head and neck assemblies 202, 2202, 3202, 4202, 5202, 6202, 7202, 8202, 9202, 10202, 11202 may be used in combination with those disclosed with respect to the head and neck assembly 12202, and that any one or more features of the head and neck assembly 12202 may be used in combination with those disclosed with respect to the head and neck assemblies 202, 2202, 3202, 4202, 5202, 6202, 7202, 8202, 9202, 10202, 11202.

The primary difference between previously described head and neck assemblies and head and neck assembly 12202 is the fact that the neck 12202*b* includes a secondary display 12301 coupled to a rear side of the neck 12202*b* so as to be visible from a rear side of the robot. The head 12202*a* further includes light emitting assemblies 12264.2*a*, 12264.2*b* coupled to opposed sides of the head 12202*a*, generally in an auricular region of the head 12202*a*.

K. Thirteenth Embodiment

Similar to the head and neck assemblies 202, 2202, 3202, 4202, 5202, 6202, 7202, 8202, 9202, 10202, 11202, 12202 described above in connection with FIGS. 1-62, FIGS. 63-64 illustrate a thirteenth embodiment of a head and neck assembly 13202. For the sake of brevity, the above disclosure in connection with the head and neck assemblies 202, 2202, 3202, 4202, 5202, 6202, 7202, 8202, 9202, 10202, 11202, 12202 will not be repeated below, but it should be understood that like numerals generally represent generally similar or like structures in the various embodiments. For example, the disclosure regarding display 300 applies equally to display 13300. Further, it should be understood that the functionality and operation of the head and neck assembly 13202 is similar or identical to the features and functionality disclosed with respect to the head and neck assemblies 202, 2202, 3202, 4202, 5202, 6202, 7202, 8202, 9202, 10202, 11202, 12202. It should be understood that any one or more features of the head and neck assemblies 202, 2202, 3202, 4202, 5202, 6202, 7202, 8202, 9202, 10202, 11202, 12202 may be used in combination with those disclosed with respect to the head and neck assembly 13202, and that any one or more features of the head and neck assembly 13202 may be used in combination with those disclosed with respect to the head and neck assemblies 202, 2202, 3202, 4202, 5202, 6202, 7202, 8202, 9202, 10202, 11202, 12202.

The primary difference between previously described head and neck assemblies and head and neck assembly 13202 is the fact that the head 13202*a* includes a second display 13301 coupled to a lateral side of the head 13202*a* in an auricular region thereof. The head 13202*a* further includes a third display 13302 coupled to a front side of the neck 13202*b* so as to be visible from a front side of the robot. The third display 13302 may also be coupled to a chest region of the robot (i.e., torso 204).

L. Fourteenth Embodiment

Similar to the head and neck assemblies 202, 2202, 3202, 4202, 5202, 6202, 7202, 8202, 9202, 10202, 11202, 12202, 13202 described above in connection with FIGS. 1-64, FIGS. 65A-65C illustrate a fourteenth embodiment of a head and neck assembly 14202. For the sake of brevity, the above disclosure in connection with the head and neck assemblies 202, 2202, 3202, 4202, 5202, 6202, 7202, 8202, 9202, 10202, 11202, 12202, 13202 will not be repeated below, but it should be understood that like numerals generally represent generally similar or like structures in the various embodiments. For example, the disclosure regarding display 300 applies equally to display 14300. Further, it should be understood that the functionality and operation of the head and neck assembly 14202 is similar or identical to the features and functionality disclosed with respect to the head and neck assemblies 202, 2202, 3202, 4202, 5202, 6202, 7202, 8202, 9202, 10202, 11202, 12202, 13202. It should be understood that any one or more features of the head and neck assemblies 202, 2202, 3202, 4202, 5202, 6202, 7202, 8202, 9202, 10202, 11202, 12202, 13202 may be used in combination with those disclosed with respect to the head and neck assembly 14202, and that any one or more features of the head and neck assembly 14202 may be used in combination with those disclosed with respect to the head and neck assemblies 202, 2202, 3202, 4202, 5202, 6202, 7202, 8202, 9202, 10202, 11202, 12202, 13202.

The primary difference between previously described head and neck assemblies and head and neck assembly 14202 is the fact that the head 14202*a* does not substantially mimic the shape of a human head and instead includes an upper electronics assembly 14222, a lower electronics assembly 14223, and a neck 14202*b* supporting the upper and lower electronics assemblies 14222, 14223. Each of the upper and lower electronics assemblies includes a housing 14900, 14902 and a plurality of cameras 14302, 14303 located in each respective housing 14900, 14902. The upper cameras 14302 are oriented substantially horizontally and perpendicular to a vertical plane 14904 (i.e., a frontal plane of the humanoid robot). The lower cameras 14303, and thus the line of sight LoS of these cameras, are angled downwardly at an angle 14906 relative to the frontal or vertical plane 14904, wherein said frontal or vertical plane 14904 is parallel with the coronal plane of the robot 14100. The angle 14906 is, for example, within a range of about 120 degrees to about 140 degrees, and preferably 130 degrees. In the illustrative embodiment, each plurality of cameras 14302, 14303 includes three cameras having overlapping fields of view $FoV_T$, $FoV_B$, although in other embodiments any number of cameras can be used. Furthermore, other sensors or devices can be included in the housings 14900, 14902.

M. Body Illumination Assembly

As previously described, the head portion 202*a* includes light emitting assembly 264 located at the shield interface 320. The robot 100 can further include additional illumination assemblies in other areas of the robot 100 such as a torso illumination assembly 330, a thigh illumination assembly 332, a neck illumination assembly 334, a shoulder illumination assembly 336, a hand/wrist illumination assembly 338, a knee illumination assembly 340, and a hip illumination assembly 342. The illumination assemblies disclosed herein meets the standards described in FDA CFR Title 21 part 1040.10, titled Performance standards for Light-Emitting Products, and ANSI LIA Z136.1, titled Safe Use of Lasers, at the time of filing this application and are fully incorporated herein by reference.

1. Torso Illumination Assembly

Figures 66A, 66B, 66C:
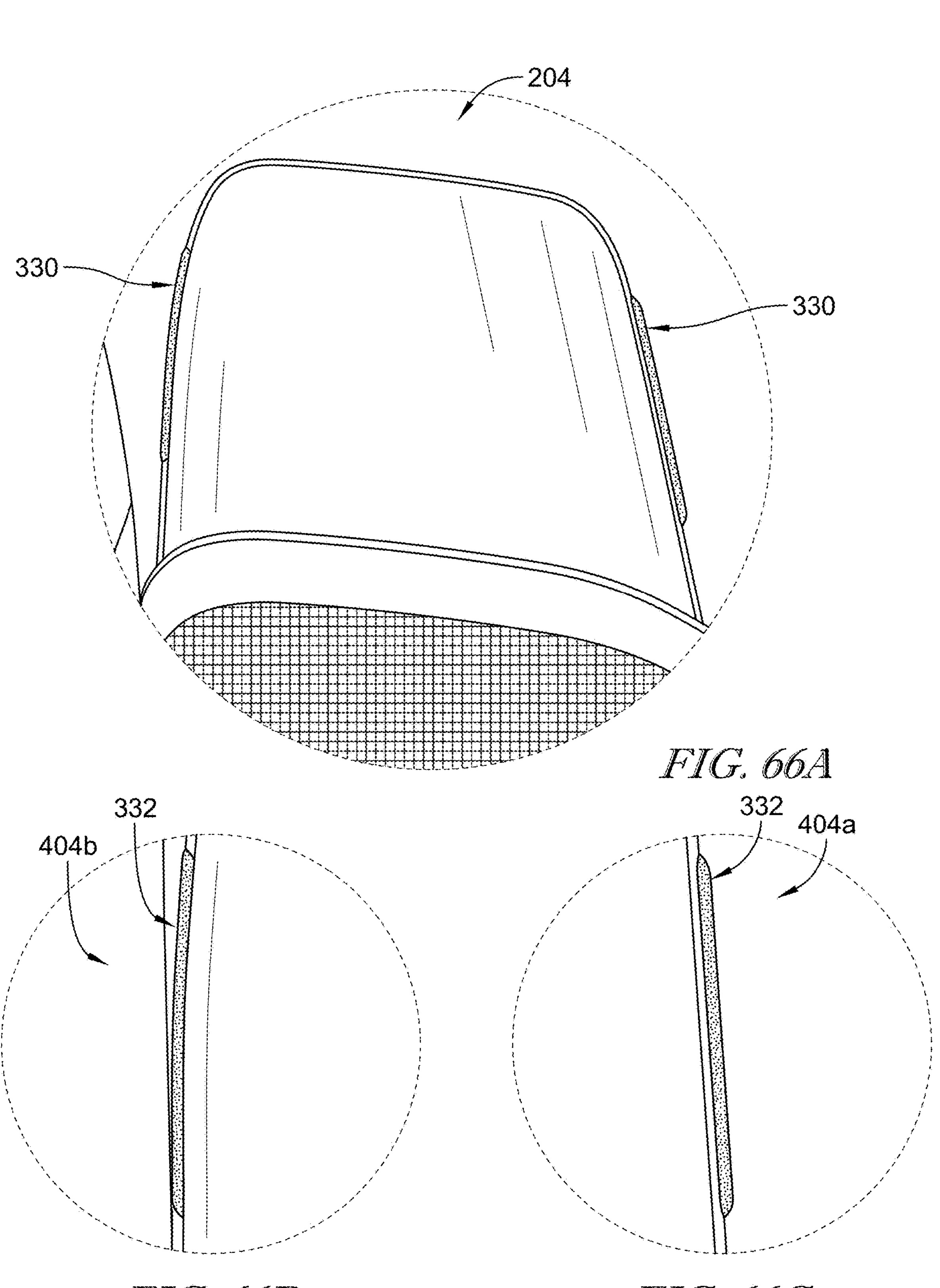
FIG. 66A is an enlarged view of a portion of a torso region of the humanoid robot of FIG. 1, wherein said torso includes a plurality of light emitters.
FIG. 66B is an enlarged view of a portion of a right thigh region of the humanoid robot of FIG. 1, wherein said thigh region includes at least one light emitter.
FIG. 66C is an enlarged view of a portion of a left thigh region of the humanoid robot of FIG. 1, wherein said thigh region includes at least one light emitter.

The torso illumination assembly includes at least one, and preferably a plurality of, light emitters 330 are located along a front surface of the torso 204 generally corresponding to a chest region of the robot 100 as shown in FIG. 66A. The torso light emitters 330 are illustratively embodied as elongated light strips; however, the lights 330 can have any suitable shape or structure. The torso light emitters 330 can be operated in the same way as the light emitting assembly 264 described above. The torso light emitters 330 can include one or more of the following: LCD, LED, OLED, LPD, IMOD, QDLED, mLED, AMOLED, SED, FED, plasma, electronic paper or EPD, MicroLED, quantum dot display, LED backlit LEC, WLCD, OLCD, transparent OLED, PMOLED, capacitive touchdisplay, resistive touchdisplay, monochrome, color, or any combination of the above, or any other known technology or light feature.

2. Thigh Illumination Assembly

The thigh illumination assembly includes at least one, and preferably a plurality of, light emitters 332 are located along a front surface of each thigh 404*a*, 404*b* generally corresponding to a quadriceps region of the robot 100 as shown in FIGS. 66B and 66C. The thigh light emitters 332 are illustratively embodied as elongated light strips; however, the light emitters 332 can have any suitable shape or structure. The thigh light emitters 332 can be operated in the same way as the light emitting assembly 264 described above. The thigh light emitters 332 can include one or more of the following: LCD, LED, OLED, LPD, IMOD, QDLED, mLED, AMOLED, SED, FED, plasma, electronic paper or EPD, MicroLED, quantum dot display, LED backlit LEC, WLCD, OLCD, transparent OLED, PMOLED, capacitive touchdisplay, resistive touchdisplay, monochrome, color, or any combination of the above, or any other known technology or light feature.

3. Neck Illumination Assembly

Figure 67:
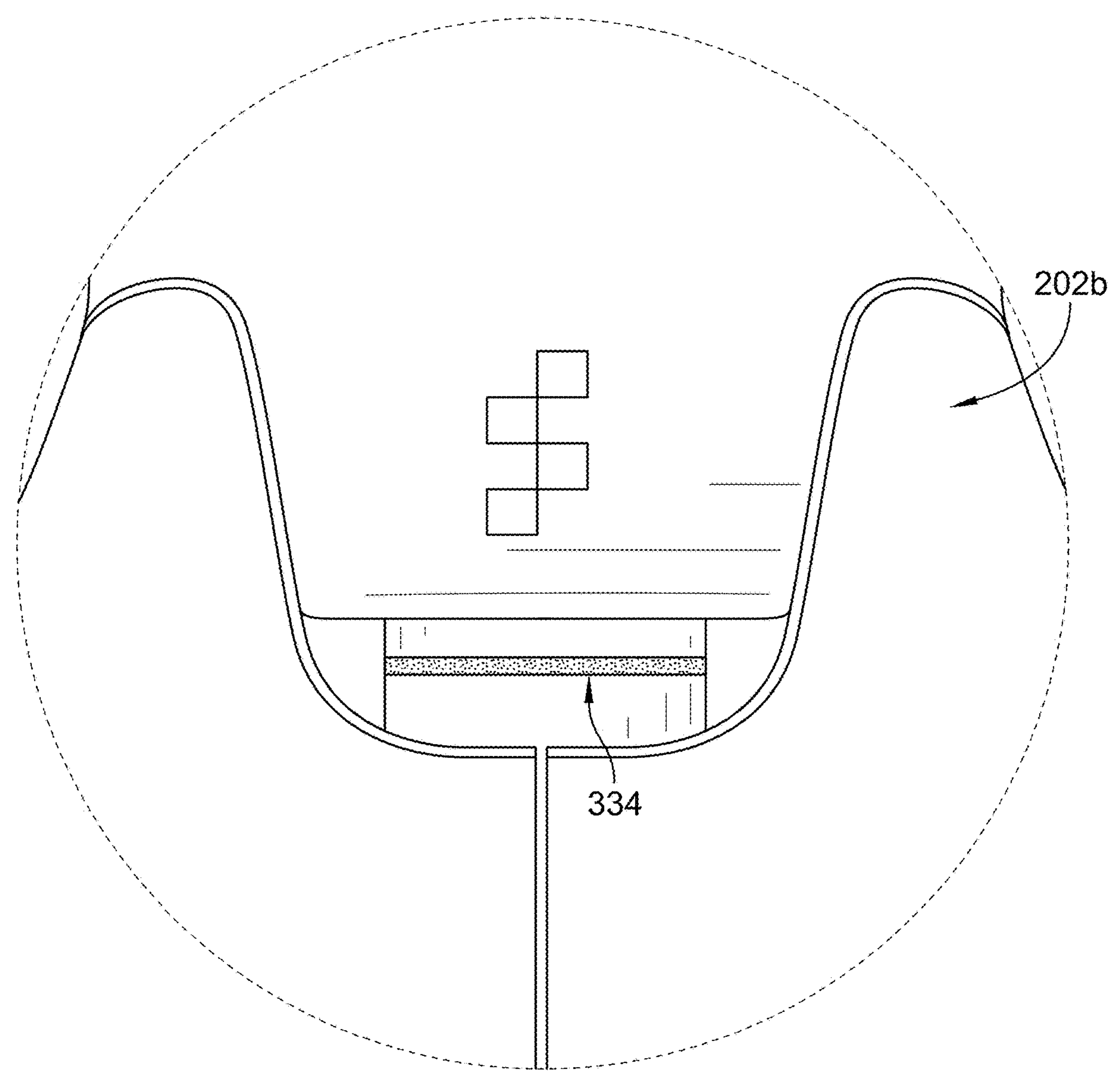
FIG. 67 is an enlarged view of a portion of the head and neck region of the humanoid robot of FIG. 6, wherein said neck portion includes at least one light emitter.

The neck illumination assembly includes at least one, and preferably a plurality of, light emitters 334 is located along a rear surface of the neck portion 202*b* at the base of the head portion 202*a* as shown in FIG. 67. The neck light emitters 334 is illustratively embodied as an elongated light strip; however the light emitters 334 can have any suitable shape or structure. The neck light emitters 334 can be operated in the same way as the light emitting assembly 264 described above. The neck light emitters 334 can include one or more of the following: LCD, LED, OLED, LPD, IMOD, QDLED, mLED, AMOLED, SED, FED, plasma, electronic paper or EPD, MicroLED, quantum dot display, LED backlit LEC, WLCD, OLCD, transparent OLED, PMOLED, capacitive touchdisplay, resistive touchdisplay, monochrome, color, or any combination of the above, or any other known technology or light feature.

4. Shoulder Illumination Assembly

Figure 68A:
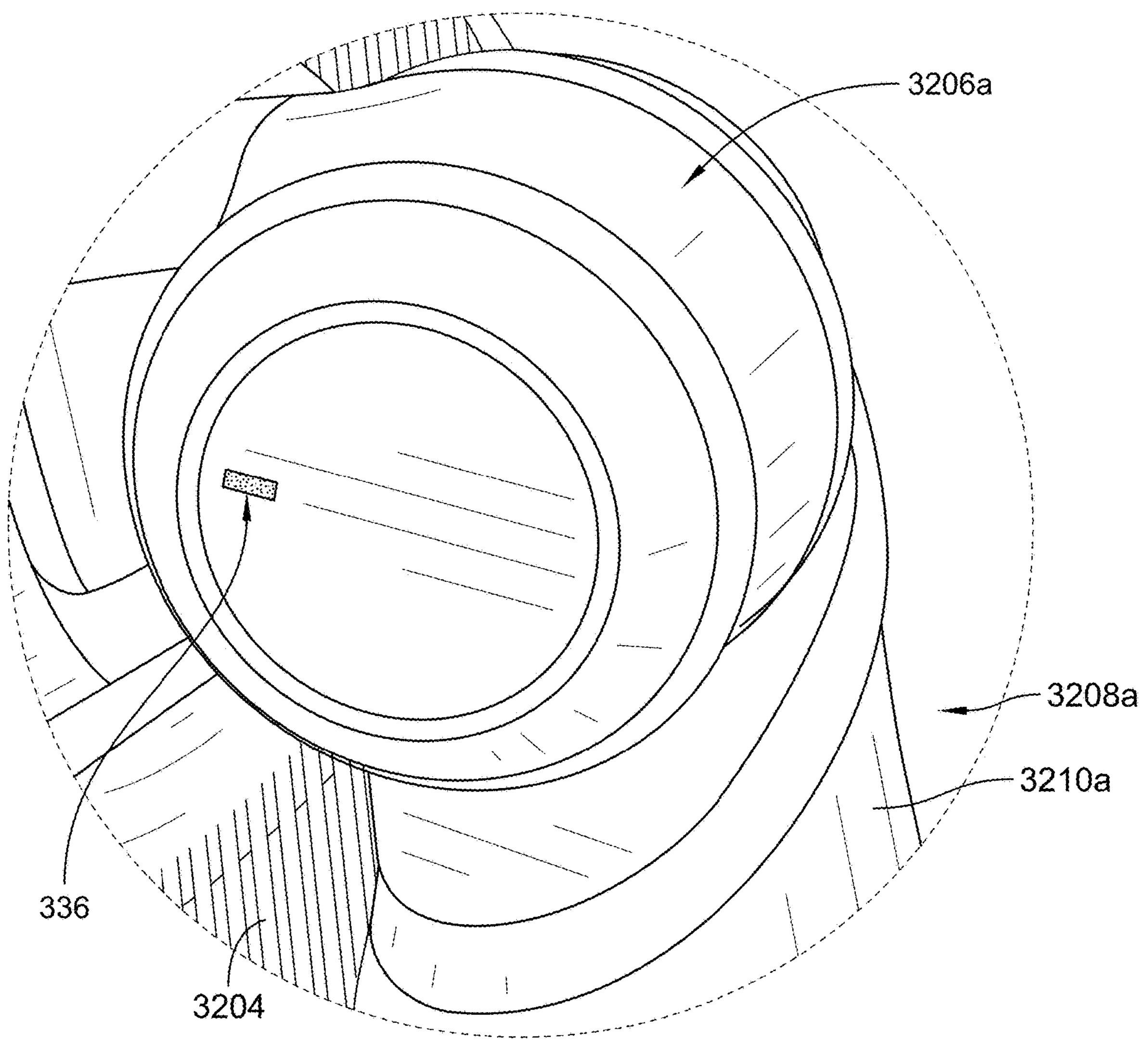
FIG. 68A is an enlarged view of a portion of a shoulder region of the humanoid robot of FIG. 22, wherein said shoulder region includes at least one light emitter.

The shoulder illumination assembly includes at least one, and preferably a plurality of, light emitters 336 are located along a front surface of each shoulder 206*a*, 206*b* as shown in FIG. 68A. The shoulder light emitters 336 are illustratively embodied as elongated light strips; however, the lights 336 can have any suitable shape or structure. The shoulder light emitters 336 can be operated in the same way as the light emitting assembly 264 described above. The shoulder light emitters 336 can include one or more of the following: LCD, LED, OLED, LPD, IMOD, QDLED, mLED, AMOLED, SED, FED, plasma, electronic paper or EPD, MicroLED, quantum dot display, LED backlit LEC, WLCD, OLCD, transparent OLED, PMOLED, capacitive touchdisplay, resistive touchdisplay, monochrome, color, or any combination of the above, or any other known technology or light feature.

5. Hip Illumination Assembly

Figure 68B:
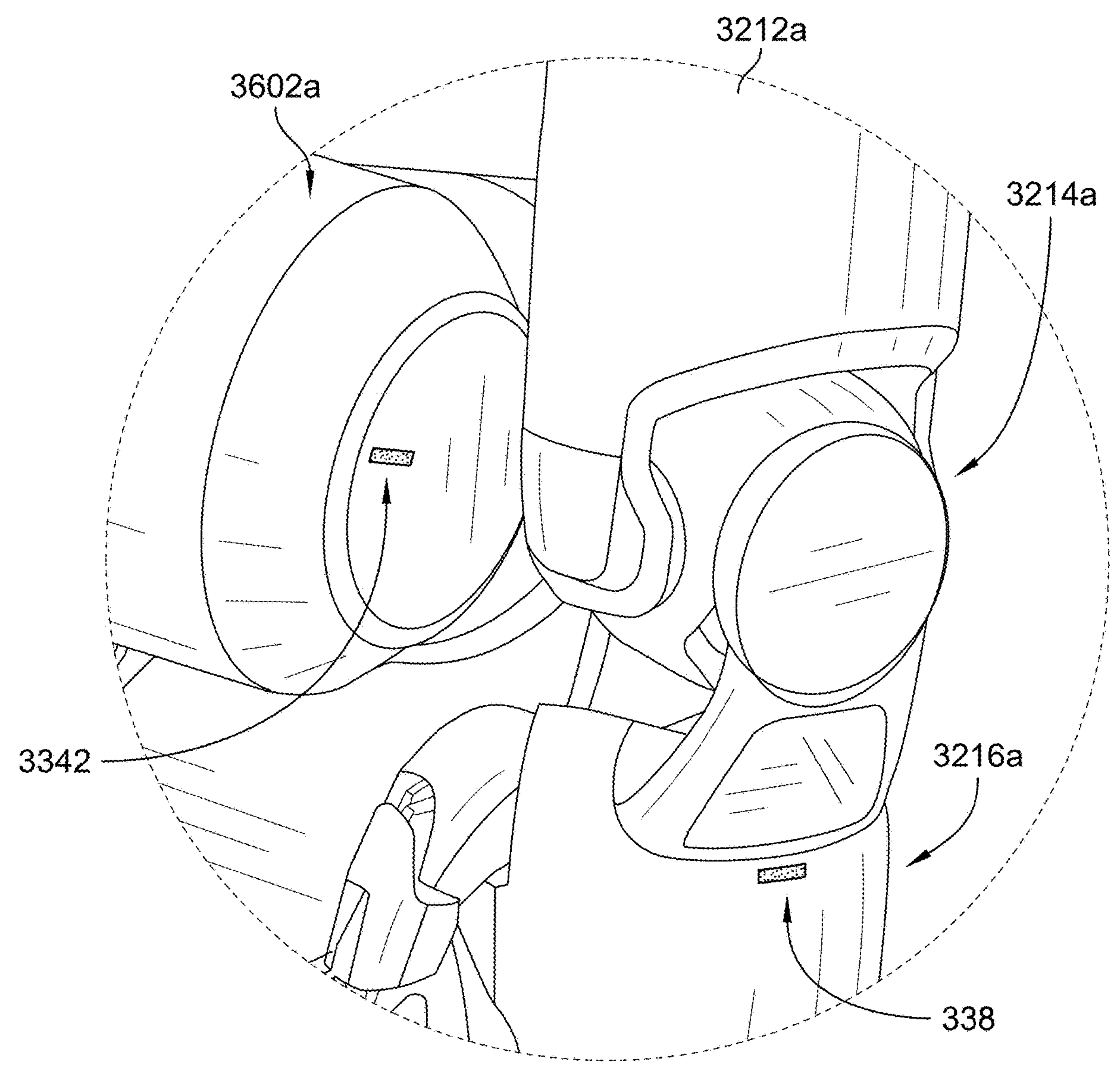
FIG. 68B is an enlarged view of a portion of a wrist region of the humanoid robot of FIG. 22, wherein said wrist region includes at least one light emitter.

The hip illumination assembly includes at least one, and preferably a plurality of, light emitters 342 are located along a surface of each hip 602*a*, 602*b* as shown in FIG. 68B. The hip light emitters 342 are illustratively embodied as elongated light strips; however, the lights 342 can have any suitable shape or structure. The hip light emitters 342 can be operated in the same way as the light emitting assembly 264 described above. The hip light emitters 342 can include one or more of the following: LCD, LED, OLED, LPD, IMOD, QDLED, mLED, AMOLED, SED, FED, plasma, electronic paper or EPD, MicroLED, quantum dot display, LED backlit LEC, WLCD, OLCD, transparent OLED, PMOLED, capacitive touchdisplay, resistive touchdisplay, monochrome, color, or any combination of the above, or any other known technology or light feature.

6. Hand Illumination Assembly

The hand illumination assembly includes at least one, and preferably a plurality of, light emitters 338 are located along a surface of each hand 216*a*, 216*b* as shown in FIG. 68B. The hand light emitters 338 are illustratively embodied as elongated light strips, however the lights 338 can have any suitable shape or structure. The hand light emitters 338 can be operated in the same way as the light emitting assembly 264 described above. The hand light emitters 338 can include one or more of the following: LCD, LED, OLED, LPD, IMOD, QDLED, mLED, AMOLED, SED, FED, plasma, electronic paper or EPD, MicroLED, quantum dot display, LED backlit LEC, WLCD, OLCD, transparent OLED, PMOLED, capacitive touchdisplay, resistive touchdisplay, monochrome, color, or any combination of the above, or any other known technology or light feature.

7. Knee Illumination Assembly

Figure 68C:
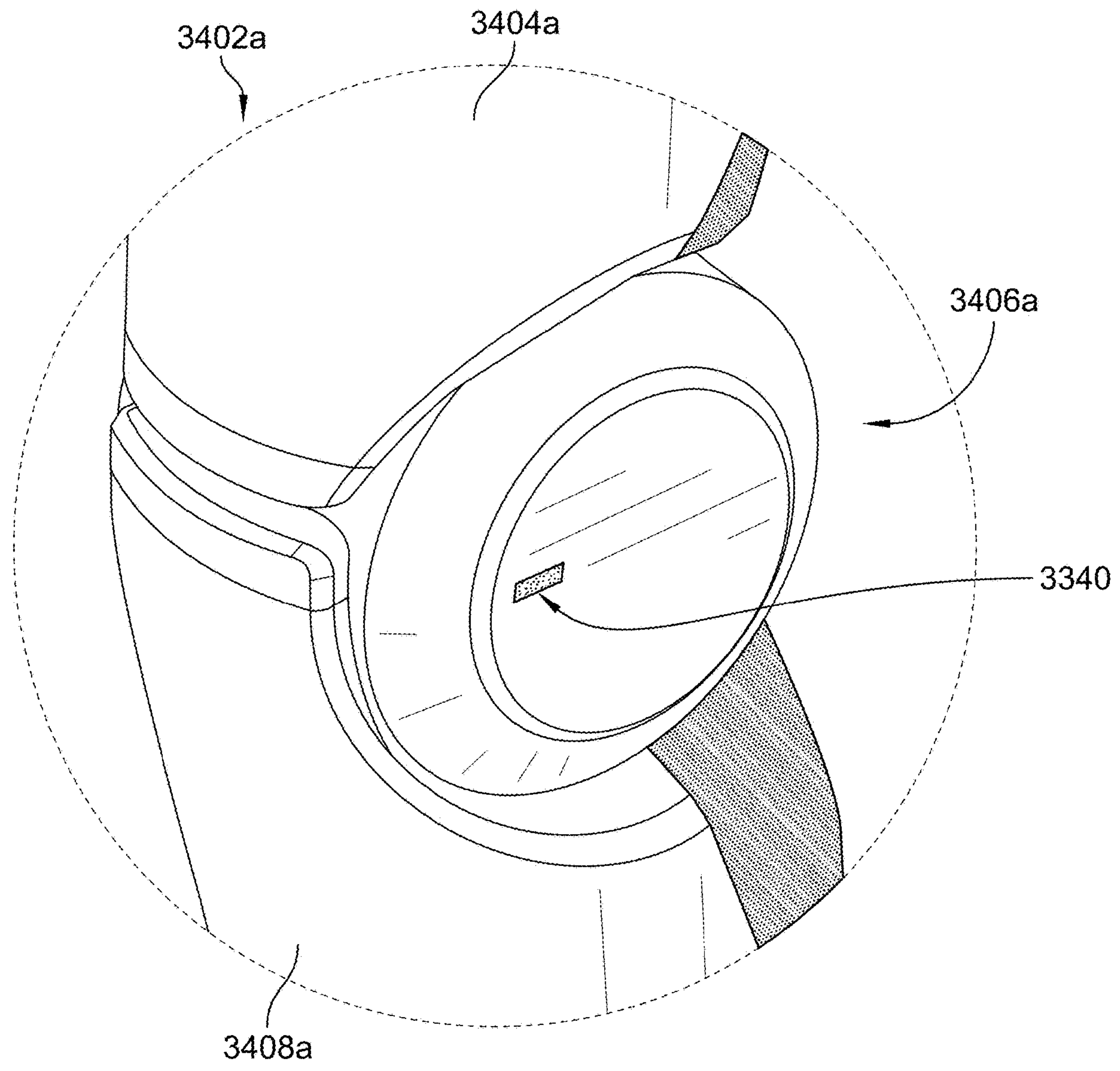
FIG. 68C is an enlarged view of a portion of a knee region of the humanoid robot of FIG. 22, wherein said knee region includes at least one light emitter.

The knee illumination assembly includes at least one, and preferably a plurality of, light emitters 340 are located along a surface of each knee 406*a*, 406*b* as shown in FIG. 68C. The knee light emitters 340 are illustratively embodied as elongated light strips, however the lights 340 can have any suitable shape or structure. The knee light emitters 340 can be operated in the same way as the light emitting assembly 264 described above. The knee light emitters 340 can include one or more of the following: LCD, LED, OLED, LPD, IMOD, QDLED, mLED, AMOLED, SED, FED, plasma, electronic paper or EPD, MicroLED, quantum dot display, LED backlit LEC, WLCD, OLCD, transparent OLED, PMOLED, capacitive touchdisplay, resistive touchdisplay, monochrome, color, or any combination of the above, or any other known technology or light feature.

N. Industrial Application

While the disclosure shows illustrative embodiments of a robot (in particular, a humanoid robot), it should be understood that embodiments are designed to be examples of the principles of the disclosed assemblies, methods and systems, and are not intended to limit the broad aspects of the disclosed concepts to the embodiments illustrated. As will be realized, the disclosed robot, and its functionality and methods of operation, are capable of other and different configurations and several details are capable of being modified all without departing from the scope of the disclosed methods and systems. For example, one or more of the disclosed embodiments, in part or whole, may be combined with a disclosed assembly, method and system. As such, one or more steps from the diagrams or components in the FIGURES may be selectively omitted and/or combined consistent with the disclosed assemblies, methods and systems. Additionally, those skilled in the art would recognize that many features of the implementation can be grouped together, split apart, reorganized, removed, or duplicated. Further, one or more steps from the arrangement of components may be omitted or performed in a different order. Accordingly, the drawings, diagrams, and detailed description are to be regarded as illustrative in nature, not restrictive or limiting, of the said humanoid robot.

While the above-described robot is designed as a head for use with a general-purpose humanoid robot, it should be understood that its assemblies, components, learning capabilities, and/or kinematic capabilities disclosed herein may be used with other robots. Examples of other robots include: articulated robot (e.g., an arm having two, six, or ten degrees of freedom, etc.), a cartesian robot (e.g., rectilinear or gantry robots, robots having three prismatic joints, etc.), Selective Compliance Assembly Robot Arm (SCARA) robots (e.g., with a donut shaped work envelope, with two parallel joints that provide compliance in one selected plane, with rotary shafts positioned vertically, with an end effector attached to an arm, etc.), delta robots (e.g., parallel link robots with parallel joint linkages connected with a common base, having direct control of each joint over the end effector, which may be used for pick-and-place or product transfer applications, etc.), polar robots (e.g., with a twisting joint connecting the arm with the base and a combination of two rotary joints and one linear joint connecting the links, having a centrally pivoting shaft and an extendable rotating arm, spherical robots, etc.), cylindrical robots (e.g., with at least one rotary joint at the base and at least one prismatic joint connecting the links, with a pivoting shaft and extendable arm that moves vertically and by sliding, with a cylindrical configuration that offers vertical and horizontal linear movement along with rotary movement about the vertical axis, etc.), self-driving car, a kitchen appliance, construction equipment, or a variety of other types of robot systems. The robot system may include one or more sensors (e.g., cameras, temperature, pressure, force, inductive or capacitive touch), motors (e.g., servo motors and stepper motors), actuators, biasing members, encoders, housing, or any other component known in the art that is used in connection with robot systems. Likewise, the robot 100 may omit one or more sensors (e.g., cameras, temperature, pressure, force, inductive or capacitive touch), motors (e.g., servo motors and stepper motors), actuators, biasing members, encoders, housing, or any other component known in the art that is used in connection with robot systems.

In other embodiments, other configurations and/or components may be utilized. As is known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data. The software code is executable by the general-purpose computer. In operation, the code is stored within the general-purpose computer platform. At other times, however, the software may be stored at other locations and/or transported for loading into the appropriate general-purpose computer system.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. The server functions may be implemented in a distributed fashion on a number of similar platforms, to distribute the processing load.

Hence, aspects of the disclosed methods and systems outlined above may be embodied in programming. Program aspects of the technology may be thought of as "products" or "articles of manufacture" typically in the form of executable code and/or associated data that is carried on or embodied in a type of machine-readable medium. "Storage" type media includes any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

A machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the disclosed methods and systems. Volatile storage media include dynamic memory, such as the main memory of such a computer platform. Tangible transmission media include coaxial cables, copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards, paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

It is to be understood that the invention is not limited to the exact details of construction, operation, exact materials or embodiments shown and described, as obvious modifications and equivalents will be apparent to one skilled in the art. While the specific embodiments have been illustrated and described, numerous modifications come to mind without significantly departing from the spirit of the invention, and the scope of protection is only limited by the scope of the accompanying Claims. It should also be understood that substantially utilized herein means a deviation less than 15% and preferably less than 5%. It should also be understood that other configuration or arrangements of the above-described components is contemplated by this Application. Moreover, the description provided in the background section should not be assumed to be prior art merely because it is mentioned in or associated with the background section. The background section may include information that describes one or more aspects of the subject of the technology. Finally, the mere fact that something is described as conventional does not mean that the Applicant admits it is prior art.

In this Application, to the extent any U.S. patents, U.S. patent applications, or other materials (e.g., articles) have been incorporated by reference, the text of such materials is only incorporated by reference to the extent that they do not conflict with materials, statements and drawings set forth herein. In the event of such conflict, the text of the present document controls, and terms in this document should not be given a narrower reading in virtue of the way in which those terms are used in other materials incorporated by reference. It should also be understood that structures and/or features not directly associated with a robot cannot be adopted or implemented into the disclosed humanoid robot without careful analysis and verification of the complex realities of designing, testing, manufacturing, and certifying a robot for completion of usable work nearby and/or around humans. Theoretical designs that attempt to implement such modifications from non-robotic structures and/or features are insufficient (and in some instances, woefully insufficient) because they amount to mere design exercises that are not tethered to the complex realities of successfully designing, manufacturing and testing a robot.

The invention claimed is:

1. A robot comprising:

an upper region including: (i) a torso, (ii) a pair of arm assemblies coupled to the torso, and (iii) a head and neck assembly coupled to the torso and having a neck portion and a head portion coupled to the neck portion, and wherein the head portion includes:

a front shell having an outer surface that has a first curvature in a first plane and a second curvature in a second plane, wherein the first and second planes are perpendicular to one another; and a microphone positioned within the head portion and configured to capture sound information to provide the sound information to a processing unit positioned within the upper region of said robot.

2. The robot of claim 1, wherein the head portion further includes at least three sensors that provide a combined field of view that is at least 270 degrees.

3. The robot of claim 1, wherein the head portion further includes at least one antenna that is concealed within said head portion.

4. The robot of claim 1, wherein the head portion further includes an illumination assembly configured to illuminate a region positioned adjacent to a rear edge of the front shell.

5. The robot of claim 1, wherein the head portion further includes a display having a width, and wherein the front shell has a width that extends between two opposed points located in a chin region of the head portion, and said width of the front shell is less than the width of the display.

6. The robot of claim 1, wherein the front shell has: (i) a height that extends from a first point located in a chin region of the head portion to a second point located rearward of a frontal region of the front shell, and (ii) a width that extends from a third point located on a rear edge of the front shell to a fourth point located on an opposite rear edge of the front shell, and wherein the height of the front shell is greater than the width of the front shell.

7. The robot of claim 1, wherein an upper recessed sensor region is formed in the head portion, and a plurality of sensors are configured to obtain data through at least a portion of said upper recessed sensor region.

8. The robot of claim 1, wherein the first curvature is greater than the second curvature, and wherein the first curvature is located in a plane that is parallel to a support surface for the robot.

9. The robot of claim 1, wherein the head portion further includes a light emitter configured to emit light to indicate a state or operating status of the robot.

10. The robot of claim 1, further comprising a pair of legs.

11. The robot of claim 1, wherein the head and neck assembly includes a speaker.

12. A robot comprising:

an upper region including: (i) a torso, (ii) a pair of arm assemblies coupled to the torso, and (iii) a head and neck assembly coupled to the torso and having a neck portion and a head portion coupled to the neck portion, and wherein the head portion includes:

an upper recessed sensor region; and at least one sensor positioned within the head portion and configured to obtain data through the upper recessed sensor region.

13. The robot of claim 12, wherein the head portion further comprises a first shell with: (i) a first projection that flanks a first side of the upper recessed sensor region, and (ii) a second projection that flanks a second side of the upper recessed sensor region.

14. The robot of claim 13, wherein the first shell includes a side portion that does not extend rearward of an auricular region of the head portion.

15. The robot of claim 12, wherein at least one arm assembly of the pair of arm assemblies includes a light emitter configured to illuminate an extent of said at least one arm assembly.

16. The robot of claim 12, wherein the head and neck assembly includes a fan that is configured to draw air into said head and neck assembly.

17. The robot of claim 12, wherein the head and neck assembly includes a light emitter configured to emit light either through a front shell or adjacent to a front shell.

18. The robot of claim 12, further comprising a light emitter configured to indicate a state or operating status of the robot.

19. The robot of claim 18, wherein the light emitter is configured to indicate the state or operating status of the robot by emitting light of a selected color or pattern.

20. The robot of claim 12, further comprising a pair of legs.

21. The robot of claim 12, wherein the head and neck assembly includes a speaker.

22. A robot comprising:

an upper region including: (i) a torso, (ii) a pair of arm assemblies coupled to the torso, and (iii) a head and neck assembly coupled to the torso and having a neck portion and a head portion coupled to the neck portion, and wherein the head portion includes:

a front shell having an outer surface that has a first curvature in a first plane and a second curvature in a second plane, wherein the first and second planes are perpendicular to one another; and an antenna positioned within the head portion and configured to send or receive data.

23. The robot of claim 22, wherein the head portion includes a curvilinear display that is configured to display icons that indicate an operating status of the robot.

24. The robot of claim 23, wherein the curvilinear display is not configured to display human-like facial features.

25. The robot of claim 22, wherein the head portion further includes a rear shell having an outer surface that has a first curvature in a first plane and a second curvature in a second plane, wherein the first and second planes are perpendicular to one another.

26. The robot of claim 25, wherein the head portion further includes a gap that is formed between at least an extent of the front shell and the rear shell.

27. The robot of claim 26, further including a light emitter configured to emit light into the gap.

28. The robot of claim 27, wherein the light emitter is configured to indicate a state or operating status of the robot.

29. The robot of claim 22, further including a light emitter configured to emit light through the front shell.

30. The robot of claim 22, wherein the front shell includes an outer surface having a nasal region and an orbital region that is not recessed in comparison to said nasal region.

* * * * *